(12) United States Patent
Ikemori et al.

(10) Patent No.: US 12,174,343 B2
(45) Date of Patent: Dec. 24, 2024

(54) IMAGING OPTICAL SYSTEM

(71) Applicants: Keiji Ikemori, Yokohama (JP); NALUX CO., LTD., Yokohama (JP)

(72) Inventors: Keiji Ikemori, Yokohama (JP); Chang Shih-Yuan, Zhubei (TW); Tetsuya Zenko, Osaka (JP); Kenta Ishii, Osaka (JP); Daisuke Seki, Osaka (JP)

(73) Assignees: Keiji Ikemori, Yokohama (JP); NALUX CO., LTD., Osaka (JP)

( * ) Notice: Subject to any disclaimer, the term of this patent is extended or adjusted under 35 U.S.C. 154(b) by 504 days.

(21) Appl. No.: 17/708,843

(22) Filed: Mar. 30, 2022

(65) Prior Publication Data

US 2022/0326485 A1    Oct. 13, 2022

(30) Foreign Application Priority Data

Mar. 31, 2021    (JP) ................................. 2021-060102

(51) Int. Cl.
  *G02B 9/34*  (2006.01)
  *G02B 9/60*  (2006.01)
  (Continued)

(52) U.S. Cl.
  CPC ............ *G02B 13/002* (2013.01); *G02B 9/34* (2013.01); *G02B 9/60* (2013.01); *G02B 9/62* (2013.01); *G02B 9/64* (2013.01)

(58) Field of Classification Search
  CPC ...... G02B 13/002; G02B 13/06; G02B 13/18; G02B 9/34; G02B 9/60; G02B 9/62; G02B 9/64
  (Continued)

(56) References Cited

U.S. PATENT DOCUMENTS 8,902,513 B2    12/2014    Ishizaka et al.
2010/0328787 A1    12/2010    Fukuta et al.
(Continued)

FOREIGN PATENT DOCUMENTS

JP    2013218353 A    10/2013
JP    2014044354 A    3/2014
(Continued)

OTHER PUBLICATIONS

Japanese Office Action dated Oct. 15, 2021 corresponding to Japanese Patent Application No. 2021-060102.
(Continued)

*Primary Examiner* — William R Alexander
(74) *Attorney, Agent, or Firm* — SQUIRE PATTON BOGGS (US) LLP

(57) ABSTRACT

An imaging optical system wherein the number of lenses is three to seven, one to four lenses, each of which is an aspheric lens in which radius of curvature of each of both surfaces is infinity in the paraxial region and which has a power of the third-order aberration region in the peripheral area are provided, the first lens from the object side is a negative lens or the aspheric lens, the relationship $$0.18 < \left( \sum_{i=1}^{i=n} \left| \frac{1}{f_i} \right| \right) \cdot \frac{f}{n} < 0.9$$

is satisfied where i represents a natural number, fi represents focal length of the i-th lens from the object side, f represents focal length of the whole system and n represents the number of the lenses, and the relationship $40° < \text{HFOV} < 80°$ (Continued)

is satisfied where HFOV represents angle that the principal ray of bundle of rays that enters the imaging optical system and reaches the maximum value of image height forms with the optical axis.

13 Claims, 60 Drawing Sheets

(51) Int. Cl.
    *G02B 9/62*     (2006.01)
    *G02B 9/64*     (2006.01)
    *G02B 13/00*     (2006.01)

(58) Field of Classification Search
    USPC ............... 359/708, 751, 752, 753, 755, 756
    See application file for complete search history.

(56) References Cited

U.S. PATENT DOCUMENTS

| | | |
|---|---|---|
| 2011/0195746 A1 | 8/2011 | Fukuta et al. |
| 2014/0063623 A1 | 3/2014 | Ishizaka et al. |
| 2015/0277084 A1 | 10/2015 | Hashimoto |
| 2016/0352984 A1* | 12/2016 | Huang ................. G02B 13/004 |
| 2017/0212331 A1* | 7/2017 | Huang .................. G02B 13/06 |
| 2017/0293108 A1* | 10/2017 | Liao ......................... G02B 9/34 |
| 2017/0322390 A1* | 11/2017 | Huang ..................... G02B 9/34 |
| 2018/0003924 A1* | 1/2018 | Liao ..................... G02B 13/004 |
| 2018/0059377 A1 | 3/2018 | Fukaya et al. |
| 2019/0011672 A1 | 1/2019 | Nitta |
| 2020/0301113 A1 | 9/2020 | Nitta |
| 2020/0301114 A1 | 9/2020 | Nitta |
| 2020/0400922 A1 | 12/2020 | Hirano |
| 2021/0048633 A1 | 2/2021 | Hirano |
| 2021/0157096 A1 | 5/2021 | Hirano |
| 2021/0191086 A1 | 6/2021 | Nitta et al. |
| 2021/0364761 A1 | 11/2021 | Nitta et al. |

FOREIGN PATENT DOCUMENTS

| | | |
|---|---|---|
| JP | 2015187675 A | 10/2015 |
| JP | 2017187565 A | 10/2017 |
| JP | 2018-116240 A | 7/2018 |
| JP | 2020-201382 A | 12/2020 |
| JP | 2021-001938 A | 1/2021 |
| JP | 2021-018291 A | 2/2021 |
| JP | 2021-021900 A | 2/2021 |
| JP | 2021063955 A | 4/2021 |

OTHER PUBLICATIONS

International Search Report and Written Opinion dated Nov. 7, 2023, corresponding to International Patent Application No. PCT/JP2023/034440.

* cited by examiner

IMAGING OPTICAL SYSTEM

TECHNICAL FIELD

The present invention relates to an imaging optical system, particular to a wide-angle imaging optical system.

BACKGROUND ART

In a wide-angle imaging optical system using spherical lenses, lenses each of which has a great power in the paraxial region are used to reduce aberrations. Similarly in a wide-angle imaging optical system using aspheric lenses, many lenses each of which has a great power in the paraxial region are used.

The use of lenses each of which has a great power in the paraxial region makes the manufacturing process relatively difficult because of a required higher accuracy of assembling and further makes the size and the weight of the wide-angle imaging optical system greater.

Imaging optical systems each of which includes an aspheric lens in which radius of curvature of each of both surfaces is infinity in the paraxial region have been developed (for example patent documents 1 to 4). However, a compact wide-angle imaging optical system with sufficiently small aberrations has not been realized.

Patent document 1: JP2020-201382A
Patent document 2: JP2021-001938A
Patent document 3: JP2021-018291A
Patent document 4: JP2021-021900A Accordingly, there is a need for a compact wide-angle imaging optical system with sufficiently small aberrations, the optical system including an aspheric lens in which radius of curvature of each of both surfaces is infinity in the paraxial region. The object of the present invention is to provide a compact wide-angle imaging optical system with sufficiently small aberrations, the optical system including an aspheric lens in which radius of curvature of each of both surfaces is infinity in the paraxial region. The both surfaces mean the object-side surface and the image-side surface of a lens.

SUMMARY OF THE INVENTION

In an imaging optical system according to the present invention, the number of lenses is three to seven, an aperture stop is located within the imaging optical system, one to four lenses each of which is an aspheric lens in which radius of curvature of each of both surfaces is infinity in the paraxial region and which has a power of the third-order aberration region in the peripheral area are provided, the first lens from the object side is a negative lens or an aspheric lens in which radius of curvature of each of both surfaces is infinity in the paraxial region and which has a negative power of the third-order aberration region in the peripheral area, the lens adjacent to the aperture stop on the image side is a positive lens, the relationship $$0.18 < \left( \sum_{i=1}^{i=n} \left| \frac{1}{f_i} \right| \right) \cdot \frac{f}{n} < 0.9$$

is satisfied where i represents a natural number, fi represents focal length of the i-th lens from the object side, f represents focal length of the whole system and n represents the number of the lenses, a bundle of rays that enters the imaging optical system and reaches the maximum value of image height and a bundle of rays that enters the imaging optical system and has the principal ray parallel to the optical axis do not intersect with each other within the first lens from the object side, and the relationship $$40° < HFOV < 80°$$

is satisfied where HFOV represents angle that the principal ray of bundle of rays that enters the imaging optical system and reaches the maximum value of image height forms with the optical axis.

According to the present invention, a compact wide-angle imaging optical system with sufficiently small aberrations, the optical system including an aspheric lens in which radius of curvature of each of both surfaces is infinity in the paraxial region can be realized.

In the imaging optical system according to a first embodiment of the present invention, the number of lenses is four to seven, the aperture stop is located between the second lens and the fourth lens from the object side, at least one aspheric lens in which radius of curvature of each of both surfaces is infinity in the paraxial region and which has a power of the third-order aberration region in the peripheral area is provided respectively on the object side and on the image side of the aperture stop, each of the first lens and/or the second lens from the object side and the lens closest to the image is an aspheric lens in which radius of curvature of each of both surfaces is infinity in the paraxial region and which has a power of the third-order aberration region in the peripheral area, the relationship $$0.18 < \left( \sum_{i=1}^{i=n} \left| \frac{1}{f_i} \right| \right) \cdot \frac{f}{n} < 0.82$$

is satisfied, and the bundle of rays that enters the imaging optical system and reaches the maximum value of image height and the bundle of rays that enters the imaging optical system and has the principal ray parallel to the optical axis do not intersect with each other within the lens closest to the image.

The imaging optical system according to the present embodiment is configured such that the bundle of rays that enters the imaging optical system and reaches the maximum value of image height and the bundle of rays that enters the imaging optical system and has the principal ray parallel to the optical axis do not intersect with each other within the first lens from the object side and within the lens closest to the image. When an aspheric lens in which radius of curvature of each of both surfaces is infinity in the paraxial region and which has a power of the third-order aberration region in the peripheral area is used as each of the first lens and/or the second lens from the object side and the lens closest to the image in the layout described above, a compact wide-angle imaging optical system with sufficiently small aberrations can be realized. Further, in particular, off-axis aberrations can be effectively reduced by locating at least one aspheric lens in which radius of curvature of each of both surfaces is infinity in the paraxial region and which has a power of the third-order aberration region in the peripheral area respectively on the object side and on the image side of the aperture stop.

The imaging optical system according to a second embodiment of the present invention has the features of the first embodiment. Further, in the second embodiment, the number of lenses is four, the aperture stop is located between the second lens and the third lens from the object side, and each of the first lens and the fourth lens from the object side is an aspheric lens in which radius of curvature of each of both surfaces is infinity in the paraxial region and which has a power of the third-order aberration region in the peripheral area.

The present embodiment relates to an imaging optical system in which the number of lenses is four, and the number of lenses each of which is an aspheric lens in which radius of curvature of each of both surfaces is infinity in the paraxial region and which has a power of the third-order aberration region in the peripheral area is two.

The imaging optical system according to a third embodiment of the present invention has the features of the first embodiment. Further, in the third embodiment, the number of lenses is five, the aperture stop is located between the second lens and the fourth lens from the object side, each of the first lens or the second lens from the object side and the fifth lens from the object side is an aspheric lens in which radius of curvature of each of both surfaces is infinity in the paraxial region and which has a power of the third-order aberration region in the peripheral area, and the relationship $$0.18 < \left( \sum_{i=1}^{i=n} \left| \frac{1}{f_i} \right| \right) \cdot \frac{f}{n} < 0.65$$

is satisfied.

The present embodiment relates to an imaging optical system in which the number of lenses is five, and the number of lenses each of which is an aspheric lens in which radius of curvature of each of both surfaces is infinity in the paraxial region and which has a power of the third-order aberration region in the peripheral area is two.

The imaging optical system according to a fourth embodiment of the present invention has the features of the first embodiment. Further, in the fourth embodiment, the number of lenses is five, the aperture stop is located between the second lens and the third lens from the object side, each of the first lens, the second lens and the fifth lens from the object side or each of the second lens, the fourth lens and the fifth from the object is an aspheric lens in which radius of curvature of each of both surfaces is infinity in the paraxial region and which has a power of the third-order aberration region in the peripheral area, and the relationship $$0.25 < \left( \sum_{i=1}^{i=n} \left| \frac{1}{f_i} \right| \right) \cdot \frac{f}{n} < 0.82$$

is satisfied.

The present embodiment relates to an imaging optical system in which the number of lenses is five, and the number of lenses each of which is an aspheric lens in which radius of curvature of each of both surfaces is infinity in the paraxial region and which has a power of the third-order aberration region in the peripheral area is three.

The imaging optical system according to a fifth embodiment of the present invention has the features of the first embodiment. Further, in the fifth embodiment, the number of lenses is six, the aperture stop is located between the second lens and the fourth lens from the object side, each of the first lens or the second lens from the object side and the sixth lens from the object side is an aspheric lens in which radius of curvature of each of both surfaces is infinity in the paraxial region and which has a power of the third-order aberration region in the peripheral area, and the relationship $$0.18 < \left( \sum_{i=1}^{i=n} \left| \frac{1}{f_i} \right| \right) \cdot \frac{f}{n} < 0.6$$

is satisfied.

The present embodiment relates to an imaging optical system in which the number of lenses is six, and the number of lenses each of which is an aspheric lens in which radius of curvature of each of both surfaces is infinity in the paraxial region and which has a power of the third-order aberration region in the peripheral area is two.

The imaging optical system according to a sixth embodiment of the present invention has the features of the first embodiment. Further, in the sixth embodiment, the number of lenses is six, the aperture stop is located between the second lens and the third lens from the object side, and each of the second lens, the fourth lens, the fifth lens and the sixth lens from the object side is an aspheric lens in which radius of curvature of each of both surfaces is infinity in the paraxial region and which has a power of the third-order aberration region in the peripheral area.

The present embodiment relates to an imaging optical system in which the number of lenses is six, and the number of lenses each of which is an aspheric lens in which radius of curvature of each of both surfaces is infinity in the paraxial region and which has a power of the third-order aberration region in the peripheral area is four.

The imaging optical system according to a seventh embodiment of the present invention has the features of the first embodiment. Further, in the seventh embodiment, the number of lenses is seven, the aperture stop is located between the second lens and the third lens from the object side, and each of the second lens, the fifth lens and the seventh lens from the object side is an aspheric lens in which radius of curvature of each of both surfaces is infinity in the paraxial region and which has a power of the third-order aberration region in the peripheral area.

The present embodiment relates to an imaging optical system in which the number of lenses is seven, and the number of lenses each of which is an aspheric lens in which radius of curvature of each of both surfaces is infinity in the paraxial region and which has a power of the third-order aberration region in the peripheral is three.

In the imaging optical system according to an eighth embodiment of the present invention, the number of lenses is three to five, and any one of the lenses is an aspheric lens in which radius of curvature of each of both surfaces is infinity in the paraxial region and which has a power of the third-order aberration region in the peripheral area.

The present embodiment relates to an imaging optical system in which the number of lenses is three to five, and one aspheric lens in which radius of curvature of each of both surfaces is infinity in the paraxial region and which has a power of the third-order aberration region in the peripheral area is provided.

The imaging optical system according to a ninth embodiment of the present invention has the features of the eighth embodiment. Further, in the ninth embodiment, the first lens from the object side is an aspheric lens in which radius of curvature of each of both surfaces is infinity in the paraxial region and which has a power of the third-order aberration region in the peripheral area.

According to the present embodiment, a compact wide-angle imaging optical system with sufficiently small aberrations can be realized by locating an aspheric lens in which radius of curvature of each of both surfaces is infinity in the paraxial region and which has a power of the third-order aberration region in the peripheral area in a position where the off-axis bundle of rays and the axial bundle of rays do not intersect with each other instead of a lens that has a great power in the paraxial region.

The imaging optical system according to a tenth embodiment of the present invention has the features of the eighth embodiment. Further, in the tenth embodiment, the lens closest to the image is an aspheric lens in which radius of curvature of each of both surfaces is infinity in the paraxial region and which has a power of the third-order aberration region in the peripheral area, and the bundle of rays that enters the imaging optical system and reaches the maximum value of image height and the bundle of rays that enters the imaging optical system and has the principal ray parallel to the optical axis do not intersect with each other within the lens closest to the image.

According to the present embodiment, a compact wide-angle imaging optical system with sufficiently small aberrations can be realized by locating an aspheric lens in which radius of curvature of each of both surfaces is infinity in the paraxial region and which has a power of the third-order aberration region in the peripheral area in a position where the off-axis bundle of rays and the axial bundle of rays do not intersect with each other instead of a lens that has a great power in the paraxial region.

The imaging optical system according to an eleventh embodiment of the present invention has the features of the eighth embodiment. Further, in the eleventh embodiment, the number of lenses is three, and any one of the lenses is an aspheric lens in which radius of curvature of each of both surfaces is infinity in the paraxial region and which has a negative power of the third-order aberration region in the peripheral area.

The imaging optical system according to a twelfth embodiment of the present invention has the features of the first embodiment. Further, in the twelfth embodiment, the number of lenses is five, each of the first lens, the second lens and the fifth lens from the object side is an aspheric lens in which radius of curvature of each of both surfaces is infinity in the paraxial region and which has a power of the third-order aberration region in the peripheral area, and the second lens is an aspheric lens in which radius of curvature of each of both surfaces is infinity in the paraxial region and which has a positive power of the third-order aberration region in the peripheral area.

DESCRIPTION OF EMBODIMENTS

Figure 1:
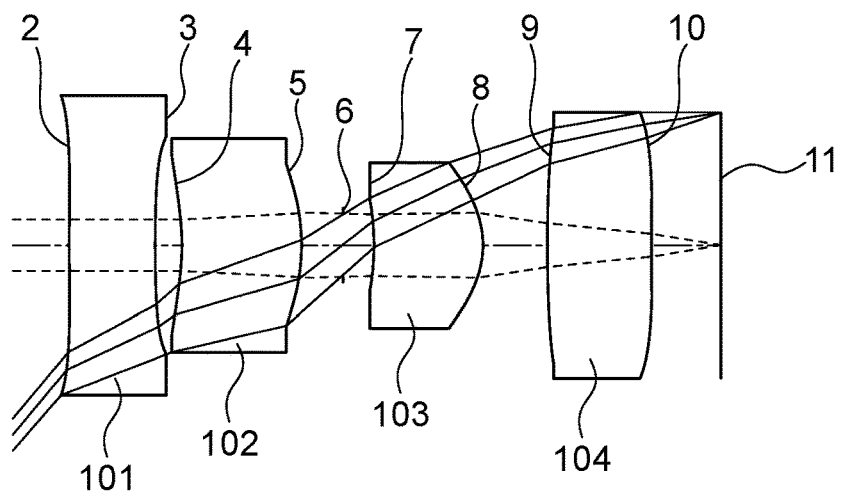
FIG. 1 shows a layout of an imaging optical system of Example 1.

In the text of specification and the claims, a positive lens refers to a lens having a positive power in the paraxial region, and a negative lens refers to a lens having a negative power in the paraxial region. An optical axis means the straight line connecting the centers of radius of curvature of all the surfaces of the lenses. In an imaging optical system, the lens closest to the object is referred to as a first lens, and the m-th lens from the object side is referred to as a m-th lens where m represents a natural number. Image height means a value of distance of an image position from the optical axis on an evaluating surface of the optical system. Distortion is a ratio of a displacement of an actual image height to an ideal image height. In the text of specification, "an aspheric lens in which radius of curvature of each of both surfaces is infinity in the paraxial region and which has a power of the third-order aberration region in the peripheral area" is also referred to as "an aspheric lens in which radius of curvature of each of both surfaces is infinity in the paraxial region and which has a power in the peripheral area".

Examples of the present invention will be described below. The features of the present invention will be described after the examples have been described. Each surface of each lens of the examples can be expressed by the following expression.

$$z = \frac{\frac{r^2}{R}}{1 + \sqrt{1 - (k+1)\frac{r^2}{R^2}}} + A_4 r^4 + A_6 r^6 + A_8 r^8 + A_{10} r^{10} + A_{12} r^{12} + A_{14} r^{14} \quad (1)$$

z represents coordinate in the direction of the optical axis with respect to the point of intersection of each surface and the optical axis. The coordinate system is determined such that coordinates of points on the image side are positive. r represents distance from the optical axis. R represents radius of curvature at the center of a surface. k represents a cornic constant. $A_4$-$A_{14}$ represent aspheric coefficients. The sign of R is positive when a surface is convex toward the object in the paraxial region and negative when a surface is convex toward the image in the paraxial region. In the text of specification, the unit of length is millimeter unless otherwise specified.

In the following tables, "radius of curvature" represents radius of curvature R at the center of each surface. "∞" in the column of "radius of curvature" represents that the radius of curvature at the center of each surface is infinity. "Thickness or distance" represents object distance, thickness of an optical element, distance between optical elements or distance between an optical element and an image plane. "∞" in the column of "Thickness or distance" represents distance is infinity. "Material,", "Refractive index" and "Abbe's number" respectively represent material, refractive index and Abbe's number of a lens or another optical element. "Focal length" represents focal length of each lens. "∞" in the column of "Focal length" represents that the focal length is infinity.

In the description given below, "HOFV" represents a half value of angle of view (a half angle of view). Angle of view is twice as great as the angle that the principal ray travelling before entering the system forms with the optical axis when the principal ray finally reaches the maximum image height.

Example 1

FIG. 1 shows a layout of an imaging optical system of Example 1. The imaging optical system includes four lenses arranged from the object side to the image side. Each of the first lens 101 and the fourth lens 104 is an aspheric lens in which radius of curvature of each of both surfaces is infinity in the paraxial region and which has a power in the peripheral area. Each of the second lens 102 and the third lens 103 is a positive meniscus lens which is convex toward the image. The aperture stop 6 is located between the second lens 102 and the third lens 103.

Table 1 shows positions of the optical elements and properties and values of focal length of the lenses of the imaging optical system of Example 1. The focal length f of the whole imaging optical system is given by f=0.2808. The F-number Fno is given by Fno=3.348. HFOV representing a half value of angle of view is given by HFOV=50 (degrees). In Table 1, each of the four lenses is represented respectively by lens 1 to lens 4 from the object side.

In the present example, the object distance from the object to the first lens is 5.242(=5.142+0.100) millimeters. Surface 1 does not correspond to a physical object.

TABLE 1

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.144 | Plastic | 1.5311 | 55.634 | ∞ |
| 3 | | ∞ | 0.046 | | | | |
| 4 | Lens 2 | −0.33579 | 0.203 | Plastic | 1.6349 | 23.945 | 1.040 |
| 5 | | −0.28002 | 0.070 | | | | |
| 6 | Ape. Stop | Plano | 0.053 | | | | |
| 7 | Lens 3 | −0.49457 | 0.185 | Plastic | 1.5311 | 55.634 | 0.376 |
| 8 | | −0.16093 | 0.111 | | | | |
| 9 | Lens 4 | ∞ | 0.176 | Plastic | 1.5311 | 55.634 | ∞ |
| 10 | | ∞ | 0.116 | | | | |
| 11 | Image | Plano | | | | | |

Table 2 shows conic constants and aspheric coefficients of each surface of each lens of Example 1.

TABLE 2

| Surface | K | A4 | A6 | A8 | A10 | A12 | A14 |
|---|---|---|---|---|---|---|---|
| 2 | 0.0000 | −2.43674E+00 | −2.13003E+01 | −2.48685E+00 | 3.86041E+01 | 2.76661E+03 | −7.06615E+03 |
| 3 | 0.0000 | 1.84834E+01 | −1.97477E+01 | −3.70357E+02 | −1.39695E+04 | −6.27055E+05 | −1.08268E+07 |
| 4 | −16.2586 | 1.53447E+01 | −8.58627E+01 | −3.06982E+02 | 2.26629E+03 | 1.24907E+05 | −2.62890E+07 |
| 5 | −13.5509 | −1.02304E+01 | 9.39372E+01 | −2.00689E+03 | −1.61422E+05 | −4.69604E+05 | 3.56687E+08 |
| 7 | 3.8564 | −1.45168E+01 | 1.13766E+03 | 2.71982E+05 | 4.18620E+07 | 1.93196E+09 | −7.84278E+11 |
| 8 | −1.2098 | −1.20784E+00 | −1.80294E+02 | 1.13552E+04 | 3.01146E+05 | 9.84373E+06 | 6.57357E+08 |
| 9 | 0.0000 | 7.77500E+00 | −5.02889E+01 | −2.59485E+02 | 6.21297E+03 | −3.13298E+04 | −3.69696E+05 |
| 10 | 0.0000 | −3.93886E+00 | −9.16322E+01 | −1.60468E+01 | 4.91985E+03 | 7.24647E+04 | −1.16865E+06 |

Figure 2:
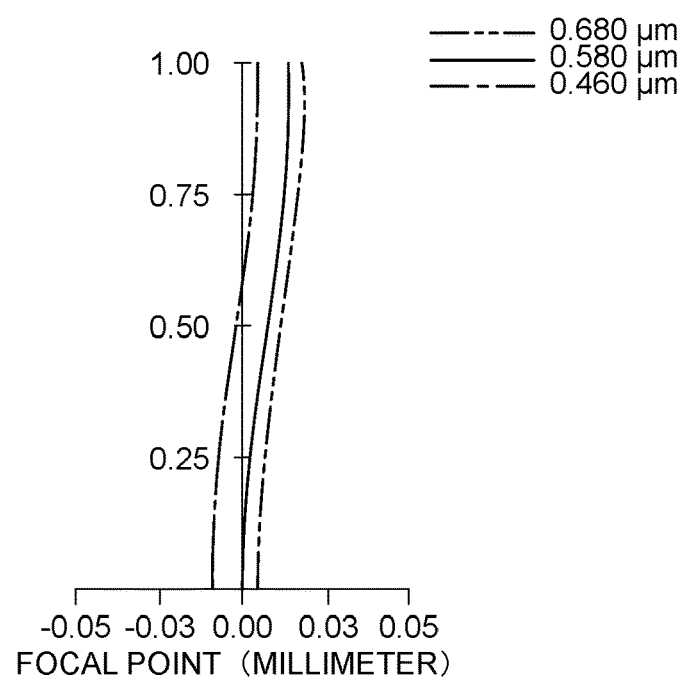
FIG. 2 shows spherical aberrations.

FIG. 2 shows spherical aberrations. The horizontal axis of FIG. 2 represents a position at which a ray that travels parallel to the optical axis and enters the imaging optical system intersects with the optical axis. The vertical axis of FIG. 2 represents distance of the above-described ray from the optical axis. The value of distance is normalized by the radius of the aperture. In other words, the value 1 on the vertical axis represents the radius of the aperture. In FIG. 2, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 3:
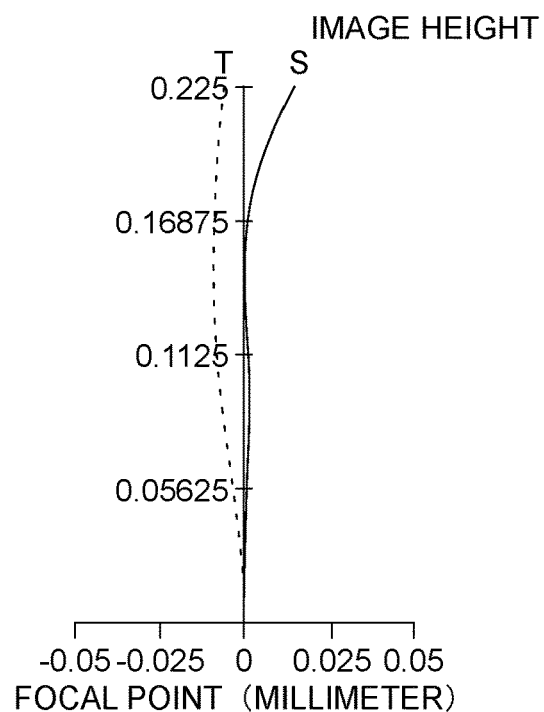
FIG. 3 shows astigmatism of the ray of wavelength of 0.580 micrometers.

FIG. 3 shows astigmatism of the ray of wavelength of 0.580 micrometers. The horizontal axis of FIG. 3 represents a position in the optical axis direction of the focal point. The vertical axis of FIG. 3 represents image height. The solid line in FIG. 3 represents the graph of the sagittal plane, and the broken line in FIG. 3 represents the graph of the tangential plane.

Figure 4:
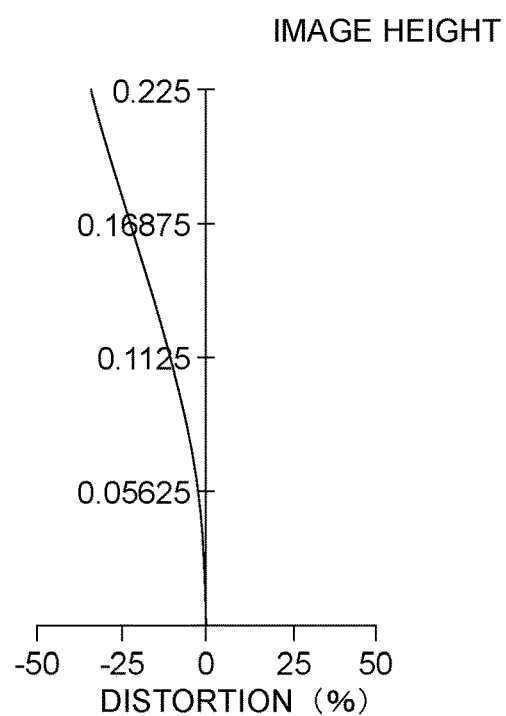
FIG. 4 shows distortion of the ray of wavelength of 0.580 micrometers.

FIG. 4 shows distortion of the ray of wavelength of 0.580 micrometers. The horizontal axis of FIG. 4 represents distortion expressed as a percent. The vertical axis of FIG. 4 represents image height.

Example 2

Figure 5:
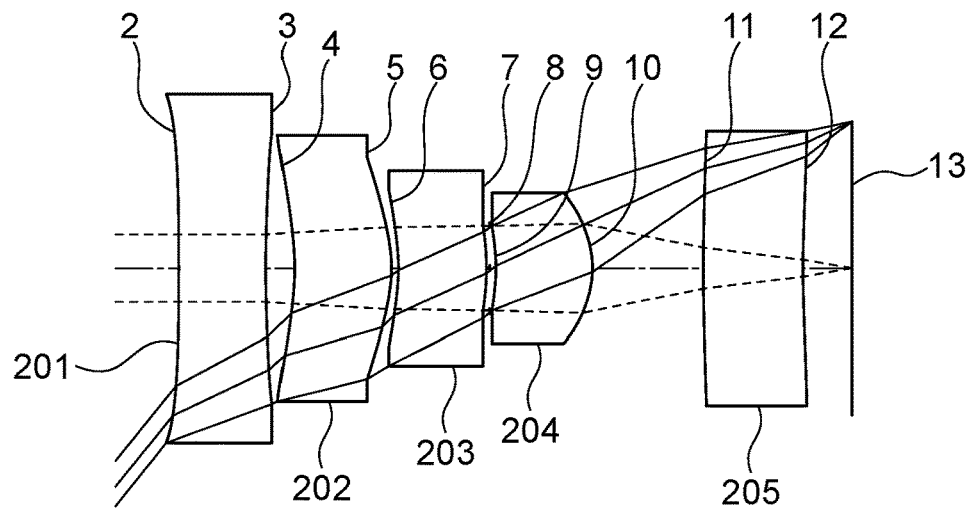
FIG. 5 shows a layout of an imaging optical system of Example 2.

FIG. 5 shows a layout of an imaging optical system of Example 2. The imaging optical system includes five lenses arranged from the object side to the image side. Each of the first lens 201 and the fifth lens 205 is an aspheric lens in which radius of curvature of each of both surfaces is infinity in the paraxial region and which has a power in the peripheral area. Each of the second lens 202 and the fourth lens 204 is a positive meniscus lens which is convex toward the image. The third lens 203 is a negative meniscus lens which is convex toward the image. The aperture stop 8 is located between the third lens 203 and the fourth lens 204.

Table 3 shows positions of the optical elements and properties and values of focal length of the lenses of the imaging optical system of Example 2. The focal length f of the whole imaging optical system is given by f=0.264. The F-number Fno is given by Fno=2.563. HFOV representing a half value of angle of view is given by HFOV=50 (degrees). In Table 3, each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 3

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.133 | Plastic | 1.5311 | 55.634 | ∞ |
| 3 | | ∞ | 0.042 | | | | |
| 4 | Lens 2 | −0.36348 | 0.145 | Plastic | 1.6611 | 20.345 | 0.586 |
| 5 | | −0.21762 | 0.010 | | | | |
| 6 | Lens 3 | −0.34322 | 0.132 | Plastic | 1.5311 | 55.634 | −19.968 |
| 7 | | −0.40213 | 0.008 | | | | |
| 8 | Ape. Stop | Plano | 0.007 | | | | |
| 9 | Lens 4 | −0.36953 | 0.143 | Plastic | 1.5311 | 55.634 | 0.401 |
| 10 | | −0.15338 | 0.168 | | | | |
| 11 | Lens 5 | ∞ | 0.150 | Plastic | 1.6349 | 23.945 | ∞ |
| 12 | | ∞ | 0.075 | | | | |
| 13 | Image | Plano | 0.000 | | | | |

Table 4 shows conic constants and aspheric coefficients of each surface of each lens of Example 2.

TABLE 4

| Surface | K | A4 | A6 | A8 | A10 | A12 | A14 |
|---|---|---|---|---|---|---|---|
| 2 | 0.0000 | −2.48625E+00 | −1.61898E+01 | −5.28562E−01 | −2.58118E+01 | −7.01444E+02 | −2.22102E+04 |
| 3 | 0.0000 | 9.72235E+00 | −1.43670E+02 | −3.71674E+01 | −7.94067E+02 | 1.98862E+04 | 4.45518E+06 |
| 4 | −18.9467 | 3.04819E+00 | 1.10826E+01 | 7.06025E+01 | 4.16271E+03 | 6.42811E+04 | −6.42767E+06 |
| 5 | −9.1593 | −5.09734E+00 | 2.09622E+02 | −8.34782E+01 | −4.18328E+04 | −9.19975E+05 | 9.95135E+07 |
| 6 | −14.8131 | −1.15629E+00 | 5.41799E+02 | 1.05968E+03 | 4.00113E+05 | 2.41626E+07 | −2.47386E+06 |
| 7 | −20.0001 | −1.74824E+01 | 9.76638E+03 | −4.50886E+04 | 2.92259E+07 | 1.06499E+10 | 2.73318E+12 |
| 9 | 19.3006 | −7.87671E+01 | 3.26574E+04 | 4.48948E+05 | 5.36148E+07 | 4.06847E+09 | −1.08009E+11 |
| 10 | −0.9639 | −3.17651E+00 | −8.17271E+02 | −1.78120E+04 | −3.34517E+05 | 1.38921E+08 | 1.83222E+10 |
| 11 | 0.0000 | 3.35479E+00 | −1.94424E+01 | 4.37366E+01 | 2.84821E+03 | 1.61086E+05 | 8.39285E+06 |
| 12 | 0.0000 | 1.02364E+01 | −1.84203E+02 | 8.84081E+00 | 1.78818E+02 | 2.27298E+03 | −2.72024E+04 |

Figure 6:
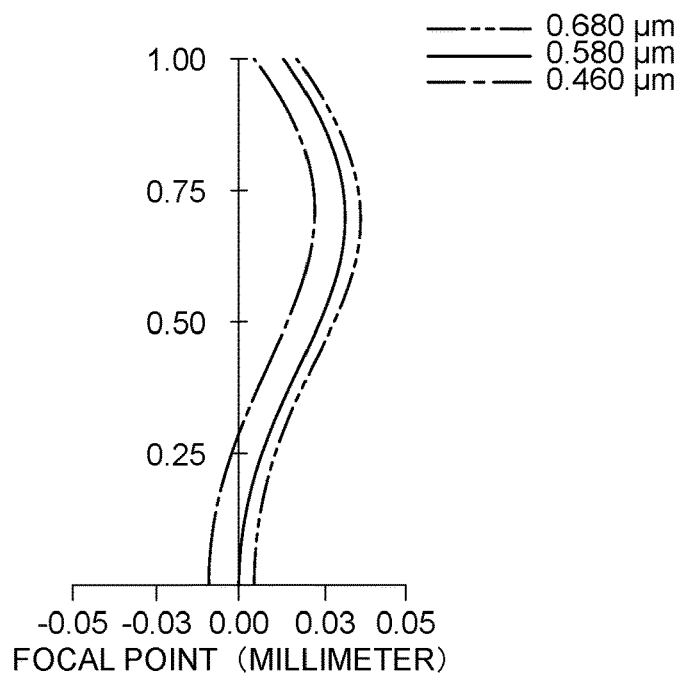
FIG. 6 shows spherical aberrations.

FIG. 6 shows spherical aberrations. The horizontal axis of FIG. 6 represents a position at which a ray that travels parallel to the optical axis and enters the imaging optical system intersects with the optical axis. The vertical axis of FIG. 6 represents distance of the above-described ray from the optical axis. The value of distance is normalized by the radius of the aperture. In other words, the value 1 on the vertical axis represents the radius of the aperture. In FIG. 6, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 7:
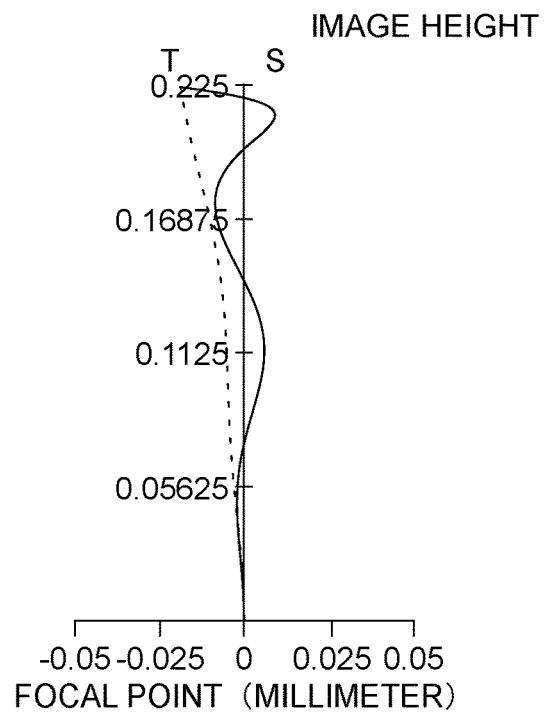
FIG. 7 shows astigmatism of the ray of wavelength of 0.580 micrometers.

FIG. 7 shows astigmatism of the ray of wavelength of 0.580 micrometers. The horizontal axis of FIG. 7 represents a position in the optical axis direction of the focal point. The vertical axis of FIG. 7 represents image height. The solid line in FIG. 7 represents the graph of the sagittal plane, and the broken line in FIG. 7 represents the graph of the tangential plane.

Figure 8:
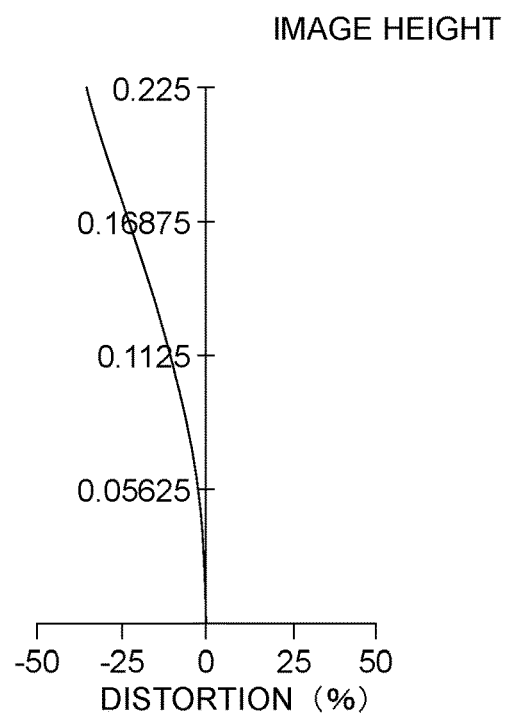
FIG. 8 shows distortion of the ray of wavelength of 0.580 micrometers.

FIG. 8 shows distortion of the ray of wavelength of 0.580 micrometers. The horizontal axis of FIG. 8 represents distortion expressed as a percent. The vertical axis of FIG. 8 represents image height.

Example 3

Figure 9:
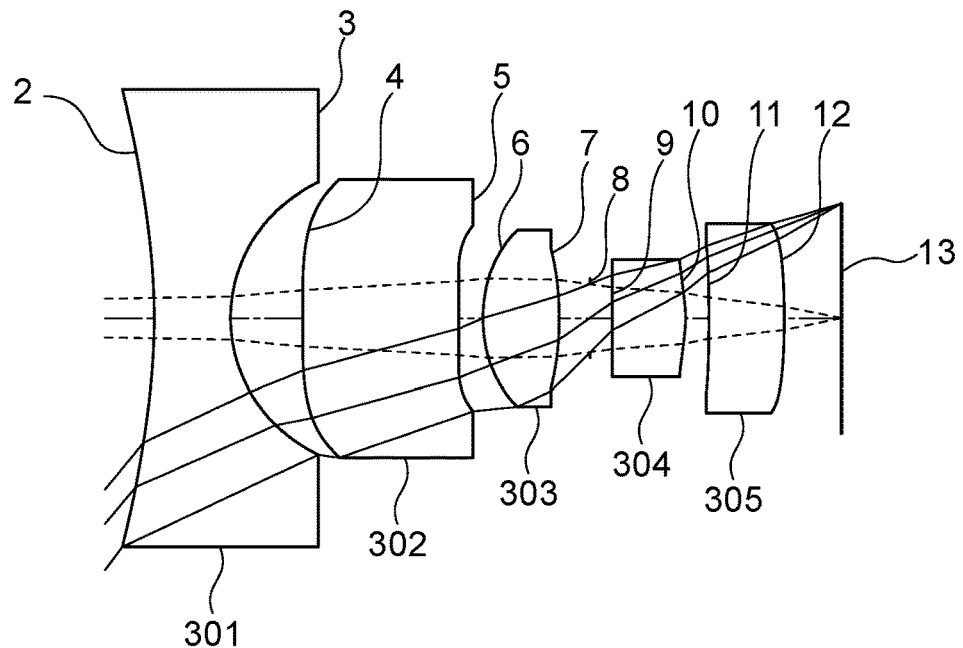
FIG. 9 shows a layout of an imaging optical system of Example 3.

FIG. 9 shows a layout of an imaging optical system of Example 3. The imaging optical system includes five lenses arranged from the object side to the image side. Each of the second 302 and the fifth lens 305 is an aspheric lens in which radius of curvature of each of both surfaces is infinity in the paraxial region and which has a power in the peripheral area. The first lens 301 is a biconcave lens. The third lens 303 is a biconvex lens. The fourth lens 304 is a positive meniscus lens which is convex toward the image. The aperture stop 8 is located between the third lens 303 and the fourth lens 304.

Table 5 shows positions of the optical elements and properties and values of focal length of the lenses of the imaging optical system of Example 3. The focal length f of the whole imaging optical system is given by f=0.206. The F-number Fno is given by Fno=2.5814. HFOV representing a half value of angle of view is given by HFOV=50 (degrees). In Table 5, each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 5

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | −1.30771 | 0.149 | Plastic | 1.5311 | 55.634 | −0.458 |
| 3 | | 0.31113 | 0.136 | | | | |
| 4 | Lens 2 | ∞ | 0.302 | Plastic | 1.6611 | 20.345 | ∞ |
| 5 | | ∞ | 0.048 | | | | |
| 6 | Lens 3 | 0.28005 | 0.149 | Plastic | 1.5311 | 55.634 | 0.358 |
| 7 | | −0.48565 | 0.056 | | | | |
| 8 | Ape. Stop | Plano | 0.045 | | | | |
| 9 | Lens 4 | −3.28093 | 0.142 | Plastic | 1.5311 | 55.634 | 0.638 |
| 10 | | −0.31214 | 0.046 | | | | |
| 11 | Lens 5 | ∞ | 0.145 | Plastic | 1.5311 | 55.634 | ∞ |
| 12 | | ∞ | 0.110 | | | | |
| 13 | Image | Plano | 0.000 | | | | |

Table 6 shows conic constants and aspheric coefficients of each surface of each lens of Example 3.

TABLE 6

| Surface | K | A4 | A6 | A8 | A10 | A12 | A14 |
|---|---|---|---|---|---|---|---|
| 2 | 0.2358 | 8.97055E−02 | 2.05945E+00 | 2.28013E+00 | −5.92569E+00 | −7.88691E+00 | −1.20083E+02 |
| 3 | −0.2904 | 2.92021E+00 | 4.89258E+01 | 7.09962E+01 | −3.69790E+02 | −3.93137E+03 | −5.30014E+04 |
| 4 | 0.0000 | 1.35282E+01 | 6.41788E+00 | 3.82500E+01 | −3.91264E+02 | −3.44150E+03 | −6.51800E+04 |
| 5 | 0.0000 | 1.71478E+01 | 1.57780E+02 | 1.31788E+03 | 8.67973E+04 | −2.82118E+05 | −1.33039E+07 |
| 6 | 0.9663 | −6.15991E+00 | 9.69170E+00 | −6.66520E+02 | 1.56915E+04 | 2.13249E+06 | 8.92628E+07 |
| 7 | −7.3671 | −3.92952E+00 | 2.96576E+02 | −5.63422E+02 | 4.77411E+04 | −6.84236E+06 | 6.54762E+08 |
| 9 | 20.0000 | −4.62589E+01 | 9.27979E+03 | 4.27717E+05 | −5.88393E+07 | −4.25630E+09 | 4.39014E+11 |
| 10 | −20.0001 | −9.39582E+00 | 1.31135E+03 | 5.60221E+04 | 4.20679E+06 | 7.23435E+07 | −8.35774E+08 |
| 11 | 0.0000 | −1.11370E+01 | 1.83148E+02 | −2.03333E+04 | −9.48800E+05 | 3.07399E+07 | 2.02091E+09 |
| 12 | 0.0000 | −1.11004E+01 | −4.60382E+02 | 2.43743E+03 | 1.16359E+04 | 1.72735E+06 | 2.57523E+07 |

Figure 10:
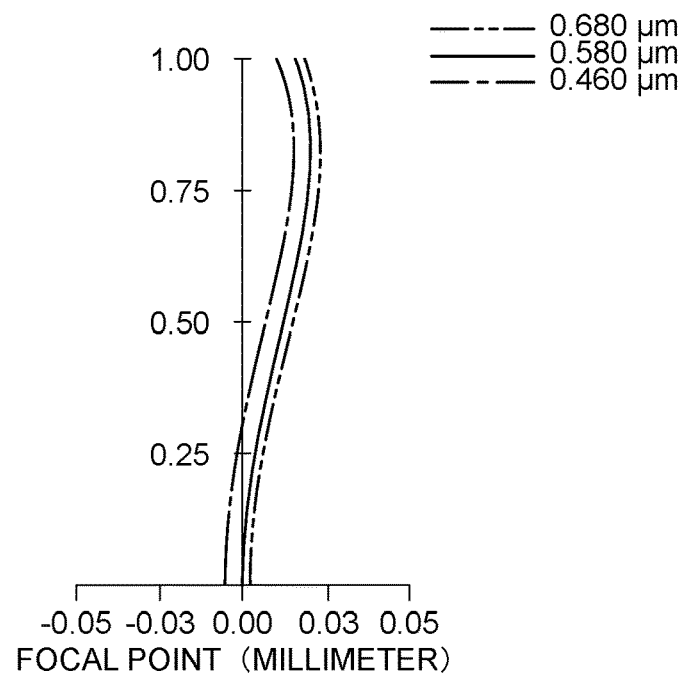
FIG. 10 shows spherical aberrations.

FIG. 10 shows spherical aberrations. The horizontal axis of FIG. 10 represents a position at which a ray that travels parallel to the optical axis and enters the imaging optical system intersects with the optical axis. The vertical axis of FIG. 10 represents distance of the above-described ray from the optical axis. The value of distance is normalized by the radius of the aperture. In other words, the value 1 on the vertical axis represents the radius of the aperture. In FIG. 10, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 11:
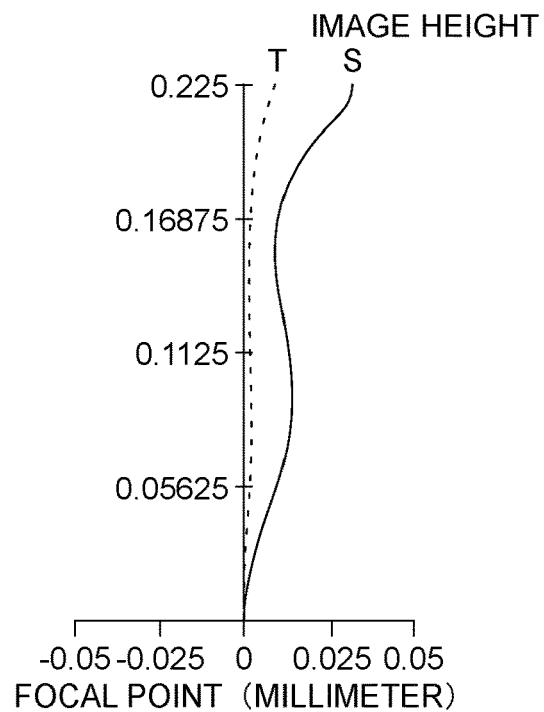
FIG. 11 shows astigmatism of the ray of wavelength of 0.580 micrometers.

FIG. 11 shows astigmatism of the ray of wavelength of 0.580 micrometers. The horizontal axis of FIG. 11 represents a position in the optical axis direction of the focal point. The vertical axis of FIG. 11 represents image height. The solid line in FIG. 11 represents the graph of the sagittal plane, and the broken line in FIG. 11 represents the graph of the tangential plane.

Figure 12:
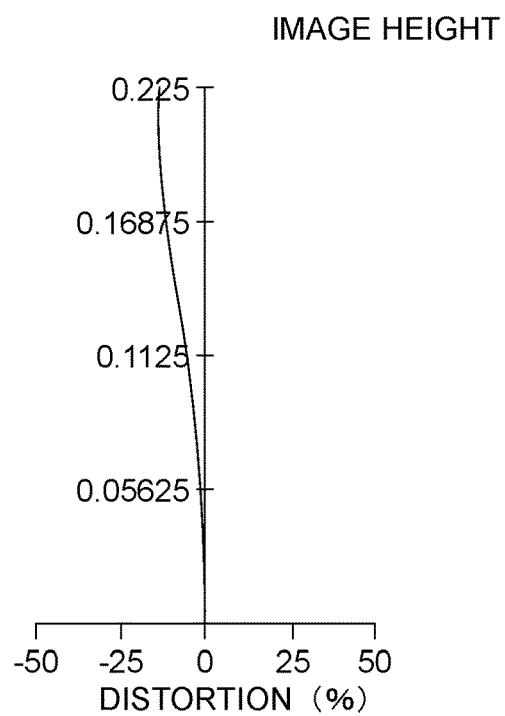
FIG. 12 shows distortion of the ray of wavelength of 0.580 micrometers.

FIG. 12 shows distortion of the ray of wavelength of 0.580 micrometers. The horizontal axis of FIG. 12 represents distortion expressed as a percent. The vertical axis of FIG. 12 represents image height.

Example 4

Figures 13, 14:
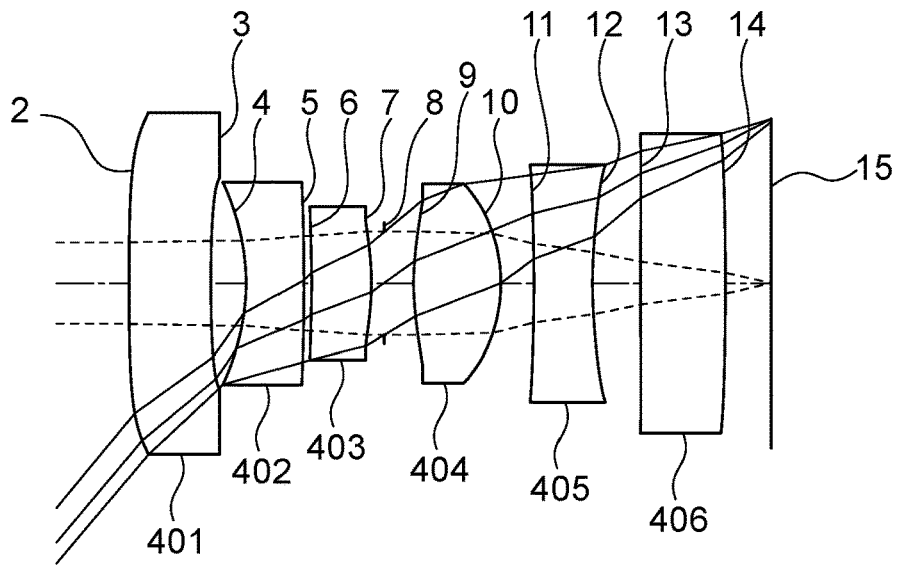
FIG. 13 shows a layout of an imaging optical system of Example 4.
FIG. 14 shows spherical aberrations.

FIG. 13 shows a layout of an imaging optical system of Example 4. The imaging optical system includes six lenses arranged from the object side to the image side. Each of the first lens 401 and the sixth lens 406 is an aspheric lens in which radius of curvature of each of both surfaces is infinity in the paraxial region and which has a power in the peripheral area. The second lens 402 is a negative meniscus lens which is convex toward the image. The third lens 403 is a positive meniscus lens which is convex toward the image. The fourth lens 404 is a biconvex lens. The fifth lens 405 is a biconcave lens. The aperture stop 8 is located between the third lens 403 and the fourth lens 404.

Table 7 shows positions of the optical elements and properties and values of focal length of the lenses of the imaging optical system of Example 4. The focal length f of the whole imaging optical system is given by f=0.275. The F-number Fno is given by Fno=2.544. HFOV representing a half value of angle of view is given by HFOV=50 (degrees). In Table 7, each of the six lenses is represented respectively by lens 1 to lens 6 from the object side.

In the present example, the object distance from the object to the first lens is 5.242(=5.142+0.100) millimeters. Surface 1 does not correspond to a physical object.

TABLE 7

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.112 | Plastic | 1.5311 | 55.634 | ∞ |
| 3 | | ∞ | 0.047 | | | | |
| 4 | Lens 2 | −0.29643 | 0.077 | Plastic | 1.5311 | 55.634 | −0.644 |
| 5 | | −2.40671 | 0.010 | | | | |
| 6 | Lens 3 | −2.75290 | 0.081 | Plastic | 1.6611 | 20.345 | 0.780 |
| 7 | | −0.44004 | 0.018 | | | | |
| 8 | Ape. Stop | Plano | 0.040 | | | | |
| 9 | Lens 4 | 0.40704 | 0.116 | Plastic | 1.5311 | 55.634 | 0.273 |
| 10 | | −0.20387 | 0.045 | | | | |
| 11 | Lens 5 | −10.22819 | 0.078 | Plastic | 1.6611 | 20.345 | −0.962 |
| 12 | | 0.68133 | 0.066 | | | | |
| 13 | Lens 6 | ∞ | 0.114 | Plastic | 1.5311 | 55.634 | ∞ |
| 14 | | ∞ | 0.061 | | | | |
| 15 | Image | Plano | 0.000 | | | | |

Table 8 shows conic constants and aspheric coefficients of each surface of each lens of Example 4.

TABLE 8

| Surface | K | A4 | A6 | A8 | A10 | A12 | A14 |
|---|---|---|---|---|---|---|---|
| 2 | 0.0000 | 5.26870E+00 | 7.94316E+01 | −1.86390E+01 | −1.76274E+02 | 5.04110E+01 | 1.91128E+03 |
| 3 | 0.0000 | 1.55903E+01 | 5.23558E+02 | 9.10010E+02 | 5.07800E+04 | 2.99562E+03 | −2.12961E+05 |
| 4 | 0.0097 | 3.20211E+00 | 6.14040E+01 | −6.30737E+02 | −2.98238E+04 | 5.62184E+04 | 2.52284E+06 |
| 5 | 19.9985 | −8.24434E+01 | 5.49172E+02 | −5.43859E+03 | 7.12278E+05 | −7.57177E+05 | −8.11571E+07 |
| 6 | −19.9977 | −3.91846E−03 | 1.02732E+02 | 9.45055E+03 | −1.65321E+06 | 7.41081E+05 | 9.54264E+07 |
| 7 | −0.0901 | 1.51403E+01 | −8.75027E+02 | 3.62818E+04 | −6.99495E+05 | −1.15353E+07 | −2.54107E+09 |
| 9 | −0.1889 | −3.27748E+01 | 6.36777E+02 | 2.26284E+03 | −7.32953E+05 | −6.98261E+05 | −5.07637E+07 |
| 10 | −0.0202 | 1.09900E+01 | −4.65013E+02 | −3.71961E+03 | −3.68685E+05 | 1.89958E+06 | 4.04369E+06 |
| 11 | −19.3048 | −1.25764E+00 | −1.95064E+02 | −7.63774E+02 | −5.75577E+04 | 1.67282E+04 | 1.05260E+06 |
| 12 | −0.1231 | −1.81716E+00 | 9.73124E+00 | 3.18416E+01 | −1.25492E+04 | −7.66376E+03 | −5.71097E+05 |
| 13 | 0.0000 | −6.57616E+00 | 2.01815E+02 | 6.14193E+00 | −1.10002E+03 | 2.34908E+02 | 2.22437E+04 |
| 14 | 0.0000 | −3.68517E+00 | −4.64187E+00 | −1.99922E+02 | 6.62494E+03 | 1.78419E+03 | 1.90864E+04 |

FIG. 14 shows spherical aberrations. The horizontal axis of FIG. 14 represents a position at which a ray that travels parallel to the optical axis and enters the imaging optical system intersects with the optical axis. The vertical axis of FIG. 14 represents distance of the above-described ray from the optical axis. The value of distance is normalized by the radius of the aperture. In other words, the value 1 on the vertical axis represents the radius of the aperture. In FIG. 14, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 15:
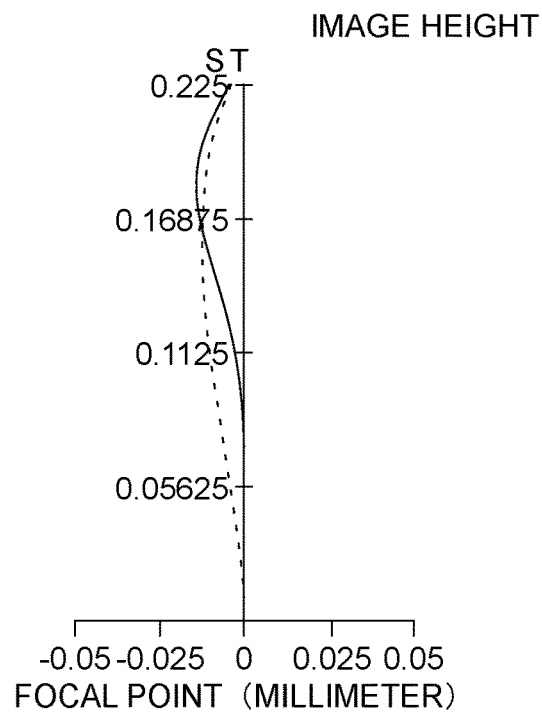
FIG. 15 shows astigmatism of the ray of wavelength of 0.580 micrometers.

FIG. 15 shows astigmatism of the ray of wavelength of 0.580 micrometers. The horizontal axis of FIG. 15 represents a position in the optical axis direction of the focal point. The vertical axis of FIG. 15 represents image height. The solid line in FIG. 15 represents the graph of the sagittal plane, and the broken line in FIG. 15 represents the graph of the tangential plane.

Figure 16:
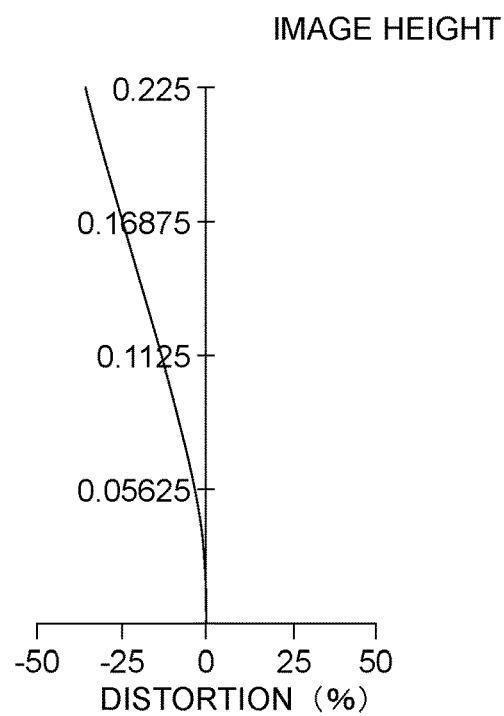
FIG. 16 shows distortion of the ray of wavelength of 0.580 micrometers.

FIG. 16 shows distortion of the ray of wavelength of 0.580 micrometers. The horizontal axis of FIG. 16 represents distortion expressed as a percent. The vertical axis of FIG. 16 represents image height.

Example 5

Figure 17:
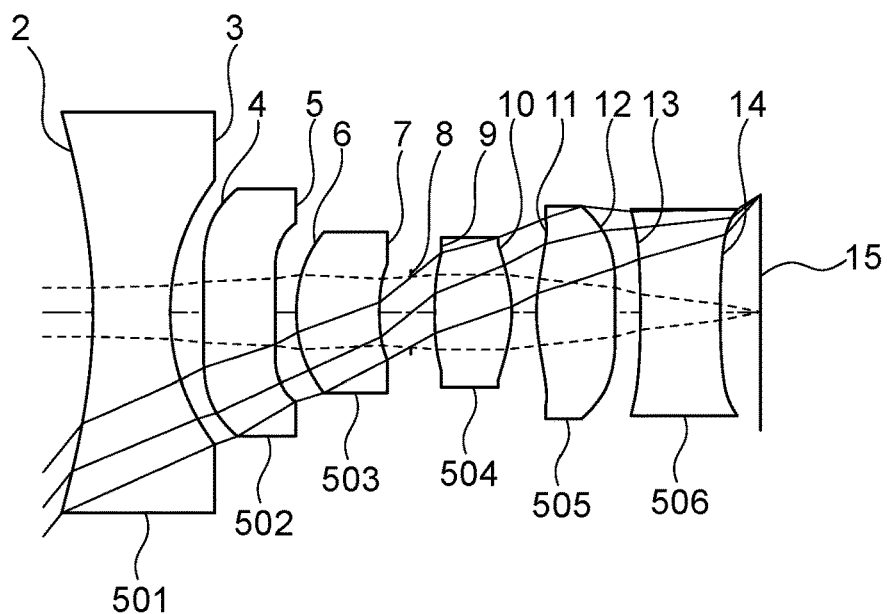
FIG. 17 shows a layout of an imaging optical system of Example 5.

FIG. 17 shows a layout of an imaging optical system of Example 5. The imaging optical system includes six lenses arranged from the object side to the image side. Each of the second lens 502 and the sixth lens 506 is an aspheric lens in which radius of curvature of each of both surfaces is infinity in the paraxial region and which has a power in the peripheral area. The first lens 501 is a biconcave lens. The third lens 503 is a positive meniscus lens which is convex toward the object. The fourth lens 504 is a biconvex lens. The fifth lens 505 is a positive meniscus lens which is convex toward the object. The aperture stop 8 is located between the third lens 503 and the fourth lens 504.

Table 9 shows positions of the optical elements and properties and values of focal length of the lenses of the imaging optical system of Example 5. The focal length f of the whole imaging optical system is given by f=0.242. The F-number Fno is given by Fno=2.459. HFOV representing a half value of angle of view is given by HFOV=50 (degrees). In Table 9, each of the six lenses is represented respectively by lens 1 to lens 6 from the object side.

In the present example, the object distance from the object to the first lens is 5.242(=5.142+0.100) millimeters. Surface 1 does not correspond to a physical object.

TABLE 9

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | −1.22661 | 0.147 | Plastic | 1.5311 | 55.634 | −0.519 |
| 3 | | 0.37137 | 0.062 | | | | |
| 4 | Lens 2 | ∞ | 0.137 | Plastic | 1.5311 | 55.634 | ∞ |
| 5 | | ∞ | 0.040 | | | | |
| 6 | Lens 3 | 0.27940 | 0.158 | Plastic | 1.6611 | 20.345 | 0.999 |
| 7 | | 0.37475 | 0.060 | | | | |
| 8 | Ape. Stop | Plano | 0.046 | | | | |
| 9 | Lens 4 | 1.14758 | 0.146 | Plastic | 1.5311 | 55.634 | 0.428 |
| 10 | | −0.27186 | 0.048 | | | | |
| 11 | Lens 5 | 0.39494 | 0.149 | Plastic | 1.5311 | 55.634 | 0.788 |
| 12 | | 5.98279 | 0.049 | | | | |
| 13 | Lens 6 | ∞ | 0.151 | Plastic | 1.6611 | 20.345 | ∞ |
| 14 | | ∞ | 0.079 | | | | |
| 15 | Image | Plano | 0.000 | | | | |

Table 10 shows conic constants and aspheric coefficients of each surface of each lens of Example 5.

TABLE 10

| Surface | K | A4 | A6 | A8 | A10 | A12 | A14 |
|---|---|---|---|---|---|---|---|
| 2 | −0.9900 | −1.62940E+00 | 1.12972E+01 | 5.43189E+00 | 6.86194E+01 | 2.21917E+02 | −6.08558E+03 |
| 3 | 0.5366 | −6.78796E+00 | 2.80887E+01 | −2.40459E+02 | −1.10497E+03 | −2.99893E+04 | −7.29764E+05 |
| 4 | 0.0000 | 4.29449E+00 | 5.30574E+02 | −3.23164E+03 | −7.93811E+03 | −6.80736E+04 | −4.83186E+05 |
| 5 | 0.0000 | −6.52892E+00 | 1.83585E+03 | −4.87563E+03 | −4.64971E+03 | 1.49093E+06 | 1.18558E+08 |
| 6 | −9.4817 | 3.76692E+01 | 3.67306E+02 | −6.56686E+03 | −5.01531E+01 | −1.96459E+05 | −1.44873E+08 |
| 7 | −8.9543 | 4.84743E+01 | 2.18838E+03 | −9.84270E+04 | 7.68443E+05 | −1.33403E+08 | −6.44867E+09 |
| 9 | 20.0000 | 3.76336E+01 | −8.04224E+01 | 2.98932E+04 | −1.22666E+06 | −3.99035E+07 | 4.49075E+08 |
| 10 | −12.5801 | −4.24427E+01 | 1.82266E+03 | 1.19186E+04 | 6.50614E+04 | −1.21271E+05 | −1.58567E+08 |
| 11 | 2.9093 | −1.33567E+01 | −7.36738E+02 | 6.99419E+02 | −1.17459E+04 | −3.12315E+05 | −1.60979E+07 |
| 12 | 20.0000 | −4.58007E+01 | 7.15245E+01 | 1.47842E+03 | −1.93900E+03 | −8.00120E+04 | −2.54268E+06 |
| 13 | 0.0000 | −2.79585E+01 | 5.14219E+02 | −1.92222E+03 | −2.24391E+04 | 8.96512E+03 | 5.55373E+06 |
| 14 | 0.0000 | 2.13393E+01 | 8.42973E+01 | −1.24751E+03 | −1.60032E+04 | −1.88648E+04 | −3.33566E+06 |

Figure 18:
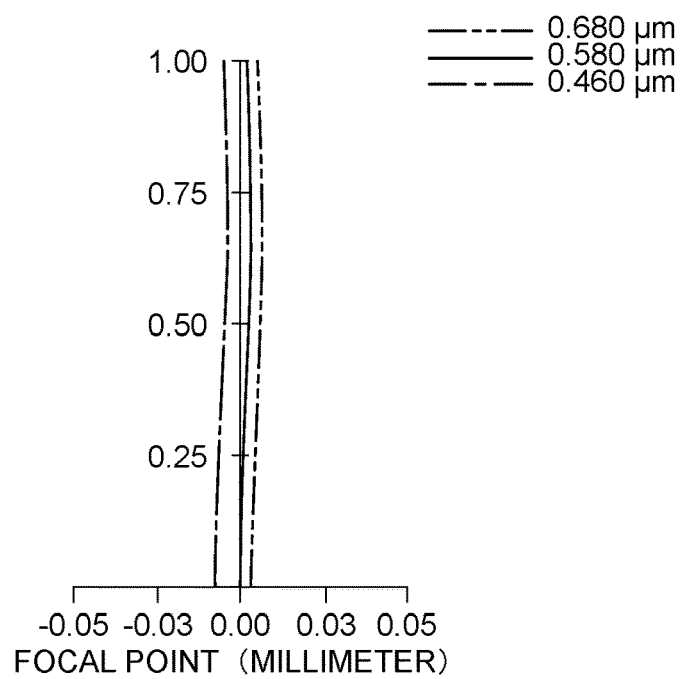
FIG. 18 shows spherical aberrations.

FIG. 18 shows spherical aberrations. The horizontal axis of FIG. 18 represents a position at which a ray that travels parallel to the optical axis and enters the imaging optical system intersects with the optical axis. The vertical axis of FIG. 18 represents distance of the above-described ray from the optical axis. The value of distance is normalized by the radius of the aperture. In other words, the value 1 on the vertical axis represents the radius of the aperture. In FIG. 18, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 19:
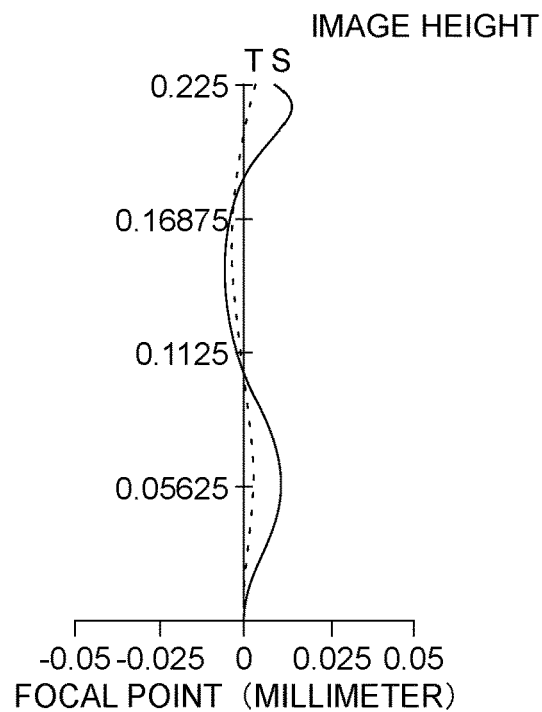
FIG. 19 shows astigmatism of the ray of wavelength of 0.580 micrometers.

FIG. 19 shows astigmatism of the ray of wavelength of 0.580 micrometers. The horizontal axis of FIG. 19 represents a position in the optical axis direction of the focal point. The vertical axis of FIG. 19 represents image height. The solid line in FIG. 19 represents the graph of the sagittal plane, and the broken line in FIG. 19 represents the graph of the tangential plane.

Figure 20:
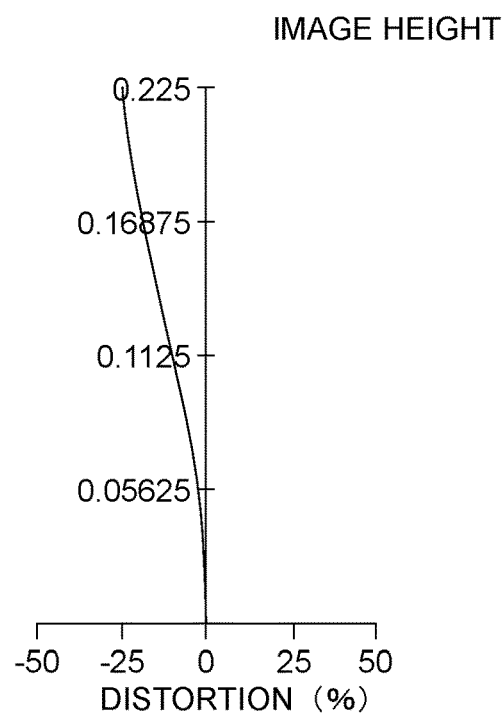
FIG. 20 shows distortion of the ray of wavelength of 0.580 micrometers.

FIG. 20 shows distortion of the ray of wavelength of 0.580 micrometers. The horizontal axis of FIG. 20 represents distortion expressed as a percent. The vertical axis of FIG. 20 represents image height.

Example 6

Figure 21:
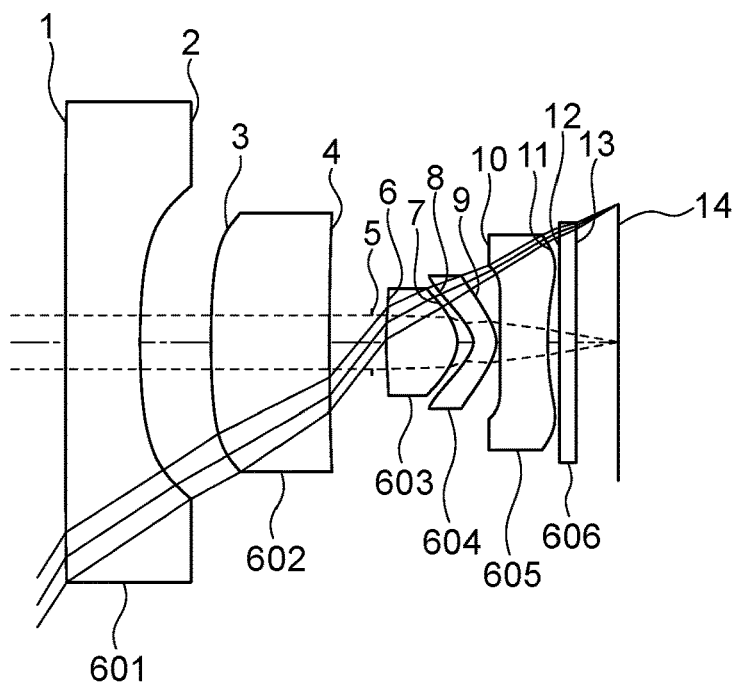
FIG. 21 shows a layout of an imaging optical system of Example 6.

FIG. 21 shows a layout of an imaging optical system of Example 6. The imaging optical system includes five lenses and an infrared cut filter arranged from the object side to the image side. Each of the first lens 601 and the fifth lens 605 is an aspheric lens in which radius of curvature of each of both surfaces is infinity in the paraxial region and which has a power in the peripheral area. The second lens 602 is a positive meniscus lens which is convex toward the image. The third lens 603 is a biconvex lens. The fourth lens 604 is a positive meniscus lens which is convex toward the image. The aperture stop 5 is located between the second lens 602 and the third lens 603.

Table 11 shows positions of the optical elements and properties and values of focal length of the lenses of the imaging optical system of Example 6. The focal length f of the whole imaging optical system is given by f=1.68. The F-number Fno is given by Fno=2.4. HFOV representing a half value of angle of view is given by HFOV=60 (degrees). In Table 11, each of the five lenses is represented respectively by lens 1 to lens 5 from the object side.

In the present example, the object distance from the object to the first lens is infinity.

TABLE 11

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | ∞ | 0.969 | Plastic | 1.535 | 56 | ∞ |
| 2 | | ∞ | 0.907 | | | | |
| 3 | Lens 2 | −13.5368 | 1.500 | Plastic | 1.645 | 23 | 31.281 |
| 4 | | −8.4534 | 0.537 | | | | |
| 5 | Ape. Stop | Plano | 0.184 | | | | |
| 6 | Lens 3 | 2.9766 | 0.901 | Plastic | 1.545 | 56 | 0.927 |
| 7 | | −0.5432 | 0.209 | | | | |
| 8 | Lens 4 | −0.2916 | 0.300 | Plastic | 1.645 | 23 | −2.584 |
| 9 | | −0.4961 | 0.030 | | | | |
| 10 | Lens 5 | ∞ | 0.633 | Plastic | 1.645 | 23 | ∞ |
| 11 | | ∞ | 0.125 | | | | |
| 12 | IR cut filter | Plano | 0.500 | Glass | 1.517 | 64.2 | |
| 13 | | Plano | 0.550 | | | | |
| 14 | Image | Plano | | | | | |

Table 12 shows conic constants and aspheric coefficients of each surface of each lens of Example 6.

TABLE 12

| Surface | K | A4 | A6 | A8 | A10 | A12 | A14 |
|---|---|---|---|---|---|---|---|
| 1 | 90.0000 | −1.5303E−04 | 2.3334E−05 | 7.3498E−08 | 3.8255E−09 | 4.4162E−10 | 2.5073E−11 |
| 2 | 90.0000 | 3.6977E−02 | −7.4427E−04 | −1.4973E−04 | −1.6181E−06 | 1.1173E−07 | 1.7654E−08 |
| 3 | −74.9365 | 7.9875E−02 | −2.5245E−02 | 7.1781E−03 | −7.4100E−04 | −1.4753E−06 | −4.1539E−07 |
| 4 | 41.9571 | 1.0468E−01 | −4.0504E−03 | −3.3757E−03 | −3.7648E−05 | 4.4846E−07 | 2.0721E−11 |
| 6 | 4.8351 | −2.1381E−01 | −4.6331E−03 | 1.9591E−01 | −6.8003E−01 | 0.0000E+00 | 0.0000E+00 |
| 7 | −3.0495 | −6.5777E−01 | 1.1836E+00 | −1.0772E+00 | 5.2918E−02 | 3.7859E−10 | −3.1189E−11 |
| 8 | −1.5229 | 4.3333E−01 | 3.2376E−01 | −8.4899E−01 | 4.3482E−01 | −7.9761E−09 | −3.8638E−11 |
| 9 | −0.8285 | 1.0269E+00 | −3.0959E−01 | −1.4370E−01 | 2.5245E−01 | 1.0129E−05 | 1.5627E−11 |
| 10 | 90.0000 | 2.5915E−01 | −4.9768E−01 | 1.8165E−01 | 2.4883E−01 | −5.2312E−01 | 2.4268E−01 |
| 11 | 90.0000 | 3.2968E−01 | −3.9242E−01 | 1.8421E−01 | −4.8284E−02 | 5.7318E−03 | 1.8582E−07 |

Figure 22:
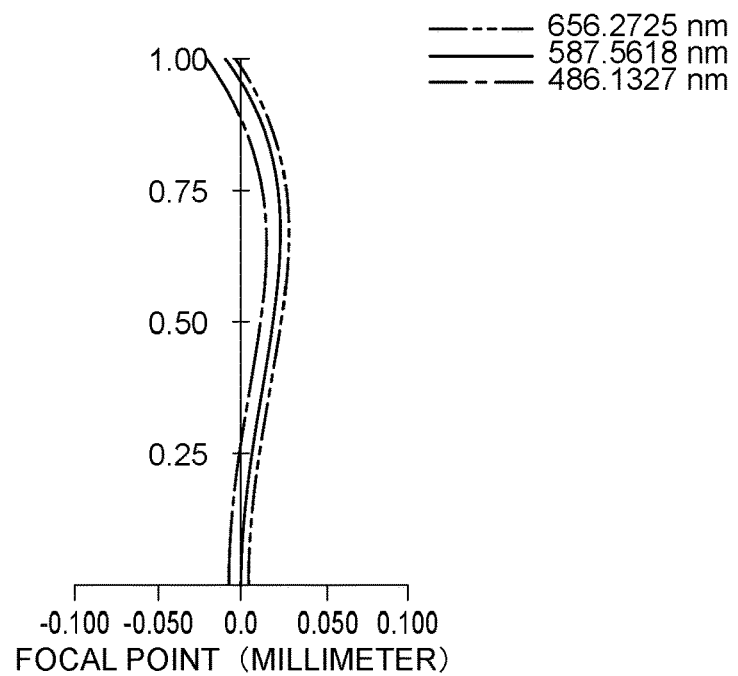
FIG. 22 shows spherical aberrations.

FIG. 22 shows spherical aberrations. The horizontal axis of FIG. 22 represents a position at which a ray that travels parallel to the optical axis and enters the imaging optical system intersects with the optical axis. The vertical axis of FIG. 22 represents distance of the above-described ray from the optical axis. The value of distance is normalized by the radius of the aperture. In other words, the value 1 on the vertical axis represents the radius of the aperture. In FIG. 22, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 23:
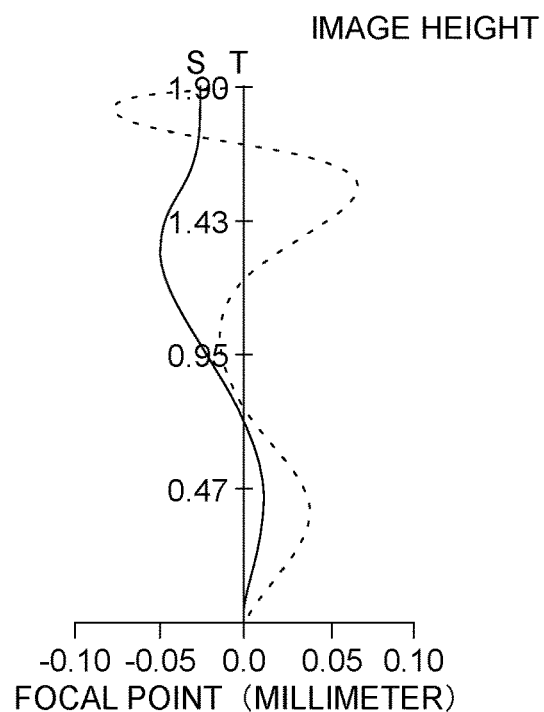
FIG. 23 shows astigmatism of the ray of wavelength of 587.5618 nanometers.

FIG. 23 shows astigmatism of the ray of wavelength of 587.5618 nanometers. The horizontal axis of FIG. 23 represents a position in the optical axis direction of the focal point. The vertical axis of FIG. 23 represents image height. The solid line in FIG. 23 represents the graph of the sagittal plane, and the broken line in FIG. 23 represents the graph of the tangential plane.

Figure 24:
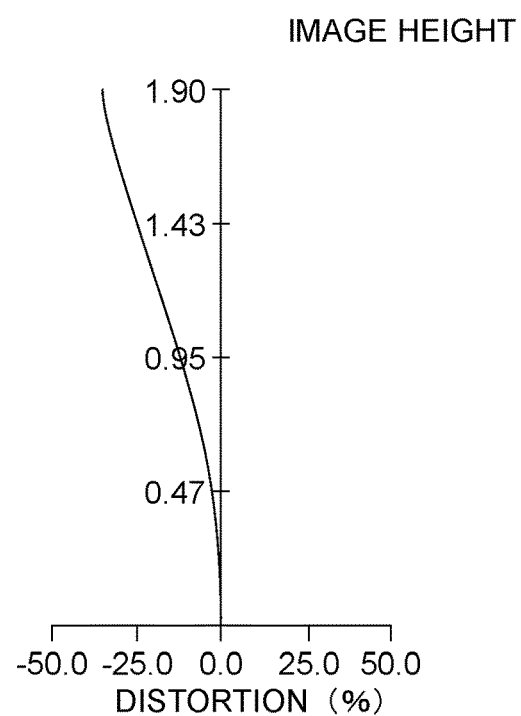
FIG. 24 shows distortion of the ray of wavelength of 587.5618 nanometers.

FIG. 24 shows distortion of the ray of wavelength of 587.5618 nanometers. The horizontal axis of FIG. 24 represents distortion expressed as a percent. The vertical axis of FIG. 24 represents image height.

Example 7

Figure 25:
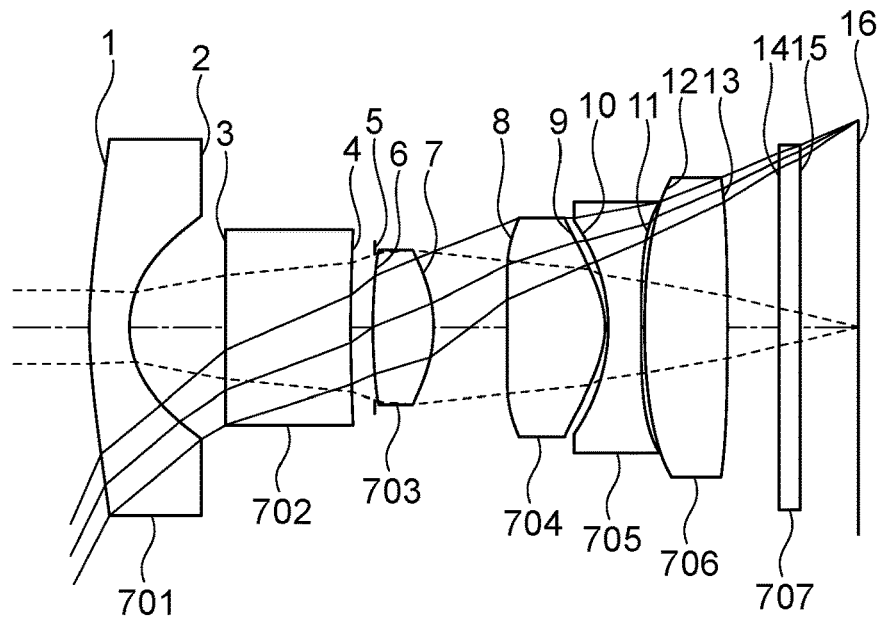
FIG. 25 shows a layout of an imaging optical system of Example 7.

FIG. 25 shows a layout of an imaging optical system of Example 7. The imaging optical system includes six lenses and an infrared cut filter arranged from the object side to the image side. Each of the second lens 702 and the sixth lens 706 is an aspheric lens in which radius of curvature of each of both surfaces is infinity in the paraxial region and which has a power in the peripheral area. The first lens 701 is a negative meniscus lens which is convex toward the object. The third lens 703 is a biconvex lens. The fourth lens 704 is a positive meniscus lens which is convex toward the image. The fifth lens 705 is a negative meniscus lens which is convex toward the image. The aperture stop 5 is located between the second lens 702 and the third lens 703.

Table 13 shows positions of the optical elements and properties and values of focal length of the lenses of the imaging optical system of Example 7. The focal length f of the whole imaging optical system is given by f=1.388. The F-number Fno is given by Fno=2. HFOV representing a half value of angle of view is given by HFOV=65 (degrees). In Table 13, each of the six lenses is represented respectively by lens 1 to lens 6 from the object side.

In the present example, the object distance from the object to the first lens is infinity.

TABLE 13

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 5.2313 | 0.383 | Plastic | 1.545 | 56 | −2.084 |
| 2 | | 0.9091 | 0.939 | | | | |
| 3 | Lens 2 | ∞ | 1.200 | Plastic | 1.645 | 23 | ∞ |
| 4 | | ∞ | 0.228 | | | | |
| 5 | Ape. Stop | Plano | −0.016 | | | | |
| 6 | Lens 3 | 8.8092 | 0.583 | Plastic | 1.545 | 56 | 2.129 |
| 7 | | −1.3049 | 0.716 | | | | |
| 8 | Lens 4 | −14.5709 | 0.935 | Plastic | 1.545 | 56 | 1.953 |
| 9 | | −1.0144 | 0.032 | | | | |
| 10 | Lens 5 | −1.9136 | 0.326 | Plastic | 1.645 | 23 | −3.036 |
| 11 | | −90.0000 | 0.030 | | | | |
| 12 | Lens 6 | ∞ | 0.788 | Plastic | 1.545 | 56 | ∞ |
| 13 | | ∞ | 0.504 | | | | |
| 14 | IR cut filter | Plano | 0.210 | Glass | 1.517 | 64.2 | |
| 15 | | Plano | 0.550 | | | | |
| 16 | Image | Plano | | | | | |

Table 14 shows conic constants and aspheric coefficients of each surface of each lens of Example 7.

TABLE 14

| Surface | K | A4 | A6 | A8 | A10 | A12 | A14 |
|---|---|---|---|---|---|---|---|
| 1 | 4.7759 | −1.3084E−02 | −1.8551E−03 | −4.7601E−04 | −1.2301E−09 | 8.3189E−05 | −1.3940E−05 |
| 2 | −0.7006 | 1.0245E−02 | 5.5859E−03 | −1.8272E−02 | −4.4704E−03 | 1.1401E−03 | 6.4795E−09 |
| 3 | −90.0000 | −1.1638E−02 | 1.3507E−02 | −9.4542E−03 | 7.7719E−03 | −1.4475E−02 | 3.3476E−08 |
| 4 | −90.0000 | 9.1993E−02 | 1.1104E−01 | −2.9264E−05 | 9.7613E−04 | 3.4860E−03 | 2.2240E−03 |
| 6 | −90.0000 | 1.2776E−02 | 1.5072E−01 | −1.4084E−01 | 1.8401E−01 | 0.0000E+00 | 0.0000E+00 |
| 7 | −0.0254 | 4.8365E−02 | 8.9969E−02 | −2.0410E−01 | 2.6327E−01 | −1.1680E−06 | −2.9400E−07 |
| 8 | −90.0000 | 1.0899E−01 | 1.9091E−03 | 1.0352E−03 | 7.2516E−03 | 9.5711E−07 | −1.3997E−07 |
| 9 | −1.5662 | 2.9946E−02 | 5.6979E−03 | 1.8164E−02 | 1.4127E−02 | 2.9611E−06 | −8.8313E−08 |
| 10 | −5.1392 | −1.6115E−01 | 7.4276E−02 | 2.5788E−02 | −2.9371E−02 | −1.0694E−06 | 9.5361E−09 |
| 11 | −90.0000 | 6.2733E−02 | 7.6365E−02 | −6.1137E−02 | 1.1897E−02 | 5.8062E−04 | −3.7639E−08 |
| 12 | −90.0000 | 1.3444E−01 | −5.1185E−02 | 3.7287E−03 | −1.2368E−03 | 9.2680E−04 | 2.6585E−04 |
| 13 | −90.0000 | −5.2649E−03 | −2.2544E−04 | −9.4824E−05 | −1.5490E−03 | 4.4799E−04 | 4.7958E−08 |

Figure 26:
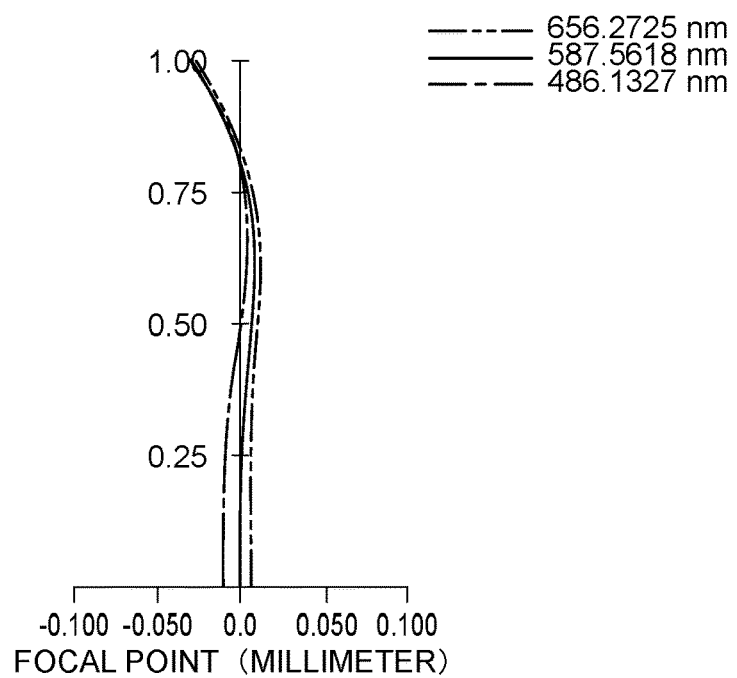
FIG. 26 shows spherical aberrations.

FIG. 26 shows spherical aberrations. The horizontal axis of FIG. 26 represents a position at which a ray that travels parallel to the optical axis and enters the imaging optical system intersects with the optical axis. The vertical axis of FIG. 26 represents distance of the above-described ray from the optical axis. The value of distance is normalized by the radius of the aperture. In other words, the value 1 on the vertical axis represents the radius of the aperture. In FIG. 26, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 27:
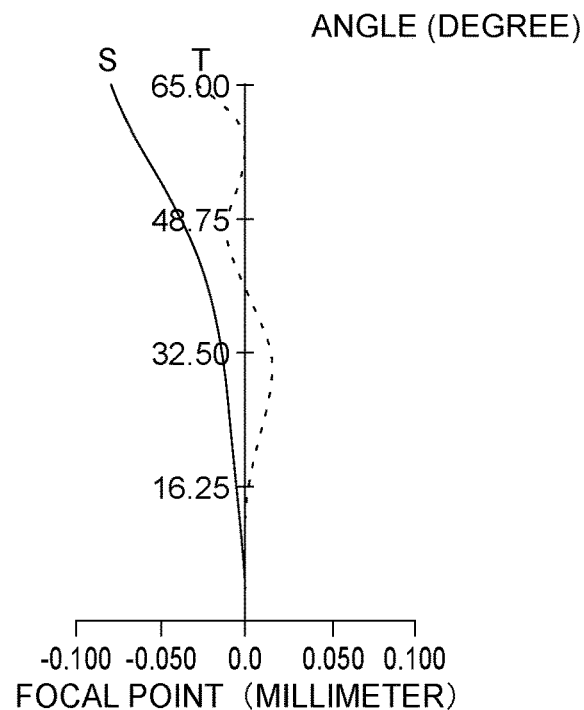
FIG. 27 shows astigmatism of the ray of wavelength of 587.5618 nanometers.

FIG. 27 shows astigmatism of the ray of wavelength of 587.5618 nanometers. The horizontal axis of FIG. 27 represents a position in the optical axis direction of the focal point. The vertical axis of FIG. 27 represents angle that a ray forms with the optical axis. The solid line in FIG. 27 represents the graph of the sagittal plane, and the broken line in FIG. 27 represents the graph of the tangential plane.

Figure 28:
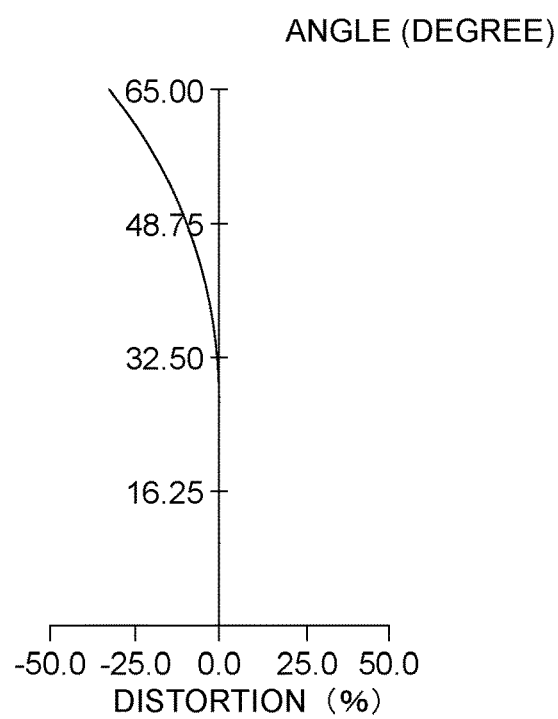
FIG. 28 shows distortion of the ray of wavelength of 587.5618 nanometers.

FIG. 28 shows distortion of the ray of wavelength of 587.5618 nanometers. The horizontal axis of FIG. 28 represents distortion expressed as a percent. The vertical axis of FIG. 28 represents angle that a ray forms with the optical axis.

Example 8

Figure 29:
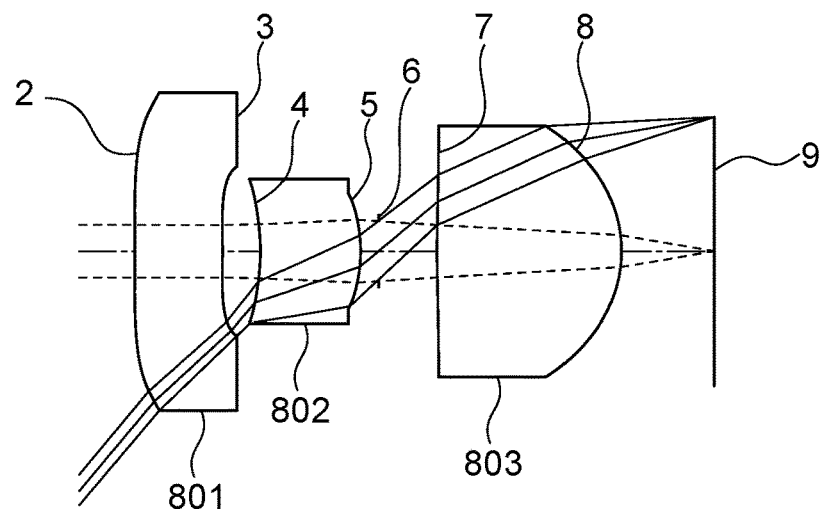
FIG. 29 shows a layout of an imaging optical system of Example 8.

FIG. 29 shows a layout of an imaging optical system of Example 8. The imaging optical system includes three lenses arranged from the object side to the image side. The first lens 801 is an aspheric lens in which radius of curvature of each of both surfaces is infinity in the paraxial region and which has a power in the peripheral area. The second lens 802 is a positive meniscus lens which is convex toward the image. The third lens 803 is a biconvex lens. The aperture stop 5 is located between the second lens 802 and the third lens 803.

Table 15 shows positions of the optical elements and properties and values of focal length of the lenses of the imaging optical system of Example 8. The focal length f of the whole imaging optical system is given by f=0.281. The F-number Fno is given by Fno=3.207. HFOV representing a half value of angle of view is given by HFOV=50 (degrees). In Table 15, each of the three lenses is represented respectively by lens 1 to lens 3 from the object side.

In the present example, the object distance from the object to the first lens is 5.242(=5.142+0.100) millimeters. Surface 1 does not correspond to a physical object.

TABLE 15

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.148 | Plastic | 1.5311 | 55.634 | ∞ |
| 3 | | ∞ | 0.064 | | | | |
| 4 | Lens 2 | −0.43552 | 0.167 | Plastic | 1.6349 | 23.945 | 0.643 |
| 5 | | −0.24944 | 0.030 | | | | |
| 6 | Ape. Stop | Plano | 0.099 | | | | |
| 7 | Lens 3 | 0.88007 | 0.308 | Plastic | 1.5311 | 55.634 | 0.332 |
| 8 | | −0.19526 | 0.156 | | | | |
| 9 | Image | Plano | | | | | |

Table 16 shows conic constants and aspheric coefficients of each surface of each lens of Example 8.

TABLE 16

| Surface | K | A4 | A6 | A8 | A10 | A12 | A14 |
|---|---|---|---|---|---|---|---|
| 2 | 0.0000 | 6.3833E+00 | 6.0877E+01 | 2.0059E+01 | 2.0564E+02 | -1.7292E+04 | -5.5077E+04 |
| 3 | 0.0000 | 3.4041E+01 | 5.7955E+02 | 1.2425E+04 | 7.7665E+05 | 4.9493E+07 | 4.1164E+09 |
| 4 | -3.3331 | 2.1316E+00 | -1.5054E+02 | -1.0588E+04 | -8.2216E+05 | -5.3972E+07 | -2.8720E+09 |
| 5 | 2.9591 | 1.7724E+01 | 2.0762E+03 | -6.0037E+04 | -2.5347E+07 | 3.1934E+09 | -5.7530E+10 |
| 7 | -17.3616 | -3.4555E+01 | 2.5214E+03 | -1.2066E+05 | -1.1444E+07 | 9.9294E+08 | -1.6919E+10 |
| 8 | -0.441331964 | 1.3219E+01 | 1.9084E+01 | -3.8121E+03 | -5.3213E+04 | 1.4105E+06 | 1.3602E+06 |

Figure 30:
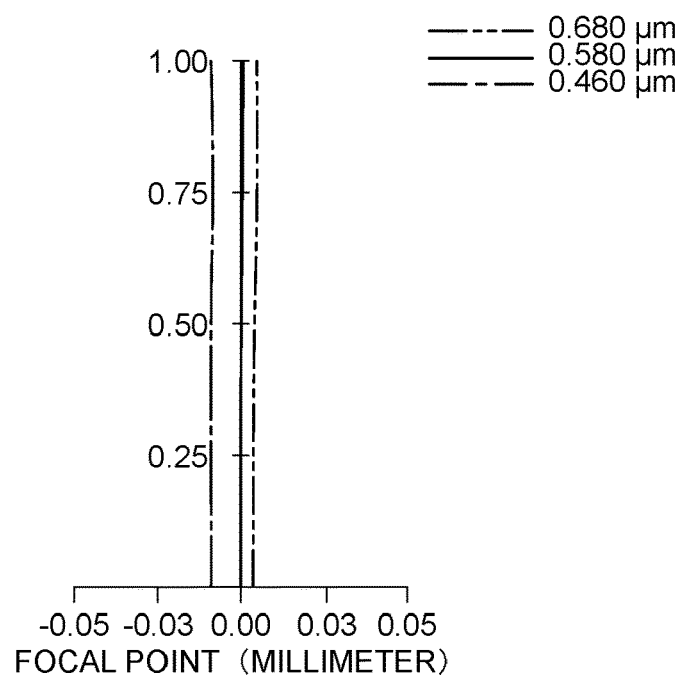
FIG. 30 shows spherical aberrations.

FIG. 30 shows spherical aberrations. The horizontal axis of FIG. 30 represents a position at which a ray that travels parallel to the optical axis and enters the imaging optical system intersects with the optical axis. The vertical axis of FIG. 30 represents distance of the above-described ray from the optical axis. The value of distance is normalized by the radius of the aperture. In other words, the value 1 on the vertical axis represents the radius of the aperture. In FIG. 30, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 31:
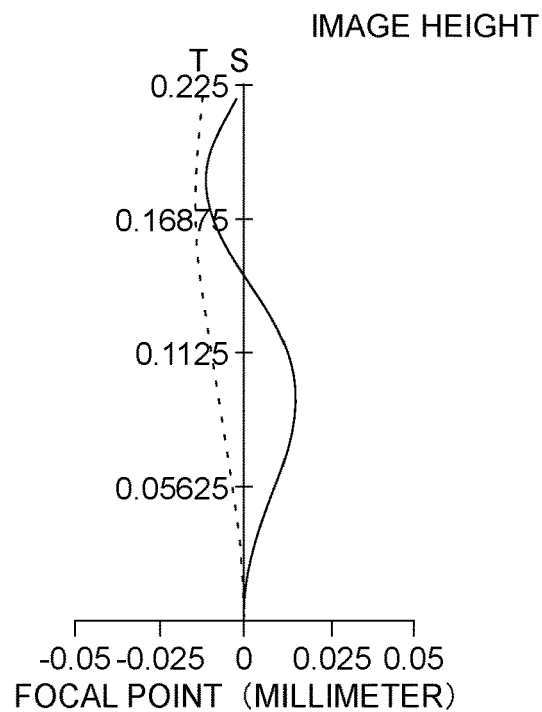
FIG. 31 shows astigmatism of the ray of wavelength of 0.580 micrometers.

FIG. 31 shows astigmatism of the ray of wavelength of 0.580 micrometers. The horizontal axis of FIG. 31 represents a position in the optical axis direction of the focal point. The vertical axis of FIG. 31 represents image height. The solid line in FIG. 31 represents the graph of the sagittal plane, and the broken line in FIG. 31 represents the graph of the tangential plane.

Figure 32:
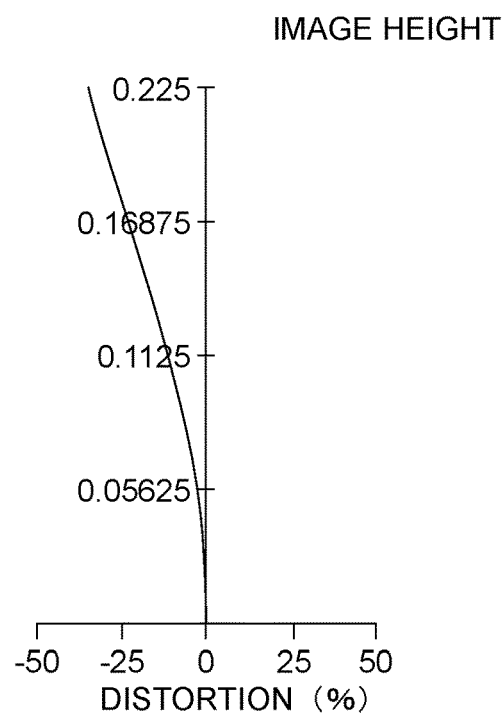
FIG. 32 shows distortion of the ray of wavelength of 0.580 micrometers.

FIG. 32 shows distortion of the ray of wavelength of 0.580 micrometers. The horizontal axis of FIG. 32 represents distortion expressed as a percent. The vertical axis of FIG. 32 represents image height.

Example 9

Figure 33:
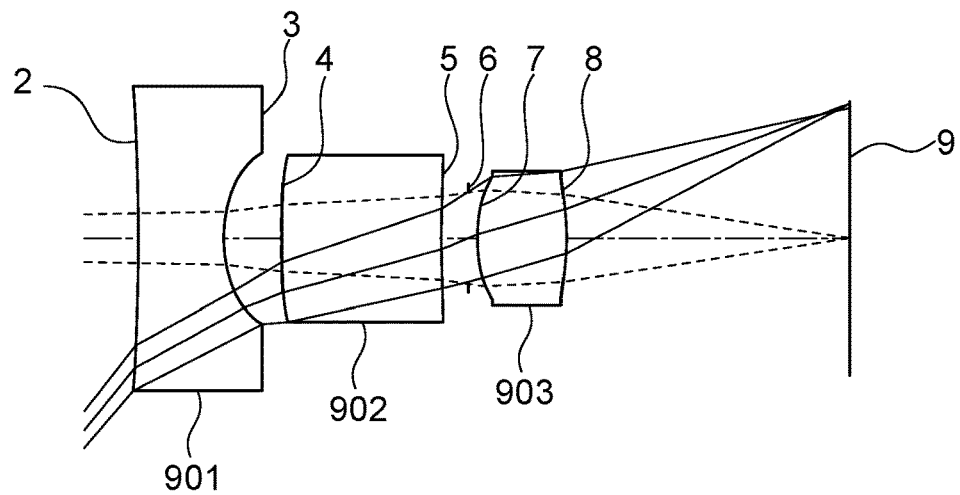
FIG. 33 shows a layout of an imaging optical system of Example 9.

FIG. 33 shows a layout of an imaging optical system of Example 9. The imaging optical system includes three lenses arranged from the object side to the image side. The second lens 902 is an aspheric lens in which radius of curvature of each of both surfaces is infinity in the paraxial region and which has a power in the peripheral area. The first lens 901 is a biconcave lens. The third lens 903 is a biconvex lens. The aperture stop 6 is located between the second lens 902 and the third lens 903.

Table 17 shows positions of the optical elements and properties and values of focal length of the lenses of the imaging optical system of Example 9. The focal length f of the whole imaging optical system is given by f=0.271. The F-number Fno is given by Fno=3.397. HFOV representing a half value of angle of view is given by HFOV=50 (degrees). In Table 15, each of the three lenses is represented respectively by lens 1 to lens 3 from the object side.

In the present example, the object distance from the object to the first lens is 7.000(=6.900+0.100) millimeters. Surface 1 does not correspond to a physical object.

TABLE 17

| Surface | | Radius of curvature | Thickness or distance | Material | Refractive index | Abbe's number | Focal length |
|---|---|---|---|---|---|---|---|
| 0 | Object | Plano | 6.900 | | | | |
| 1 | | Plano | 0.100 | | | | |
| 2 | Lens 1 | -3.62787 | 0.144 | Plastic | 1.5311 | 55.634 | -0.425 |
| 3 | | 0.24417 | 0.096 | | | | |
| 4 | Lens 2 | ∞ | 0.266 | Plastic | 1.6349 | 23.945 | ∞ |
| 5 | | ∞ | 0.044 | | | | |
| 6 | Ape. Stop | Plano | 0.016 | | | | |
| 7 | Lens 3 | 0.25304 | 0.147 | Plastic | 1.5311 | 55.634 | 0.308 |
| 8 | | -0.36938 | 0.473 | | | | |
| 9 | Image | Plano | | | | | |

Table 18 shows conic constants and aspheric coefficients of each surface of each lens of Example 9.

TABLE 18

| Surface | K | A4 | A6 | A8 | A10 | A12 | A14 |
|---|---|---|---|---|---|---|---|
| 2 | -7.2871 | 1.8844E-01 | -2.1952E+00 | -6.4879E+00 | 1.5680E+02 | 1.6163E+03 | -1.9165E+05 |
| 3 | 1.2661 | 5.1522E+00 | 2.8599E+02 | 8.0518E+03 | 2.3607E+05 | 1.0022E+07 | 2.6602E+08 |
| 4 | 0.0000 | 1.1316E+01 | 3.7463E+02 | 1.1874E+04 | -1.4492E+05 | -9.3042E+06 | 9.0840E+08 |

TABLE 18-continued

| Surface | K | A4 | A6 | A8 | A10 | A12 | A14 |
|---|---|---|---|---|---|---|---|
| 5 | 0.0000 | 4.0526E+01 | −1.7543E+03 | −3.3923E+03 | 9.9262E+06 | 9.8045E+08 | −9.6190E+10 |
| 7 | 2.8927 | −1.0603E+01 | 3.4683E+03 | −2.7418E+05 | −9.1850E+06 | 2.0587E+09 | −1.0217E+11 |
| 8 | −8.0440 | 2.5712E+01 | −2.1733E+02 | 8.4674E+04 | 8.4327E+06 | 5.4233E+07 | −1.6701E+10 |

Figure 34:
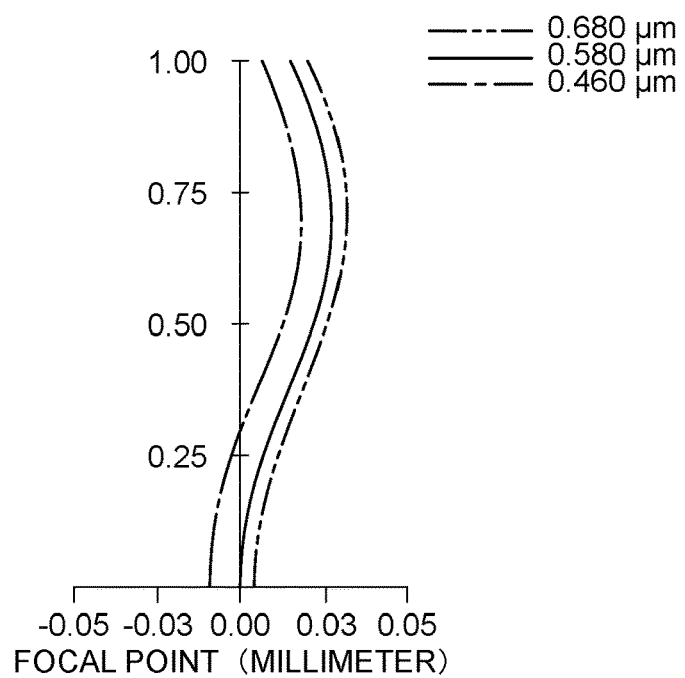
FIG. 34 shows spherical aberrations.

FIG. 34 shows spherical aberrations. The horizontal axis of FIG. 34 represents a position at which a ray that travels parallel to the optical axis and enters the imaging optical system intersects with the optical axis. The vertical axis of FIG. 34 represents distance of the above-described ray from the optical axis. The value of distance is normalized by the radius of the aperture. In other words, the value 1 on the vertical axis represents the radius of the aperture. In FIG. 34, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 35:
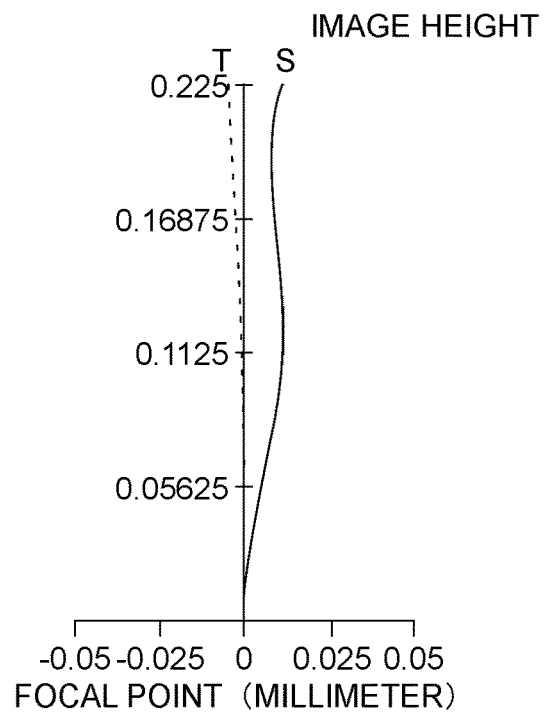
FIG. 35 shows astigmatism of the ray of wavelength of 0.580 micrometers.

FIG. 35 shows astigmatism of the ray of wavelength of 0.580 micrometers. The horizontal axis of FIG. 35 represents a position in the optical axis direction of the focal point. The vertical axis of FIG. 35 represents image height. The solid line in FIG. 35 represents the graph of the sagittal plane, and the broken line in FIG. 35 represents the graph of the tangential plane.

Figure 36:
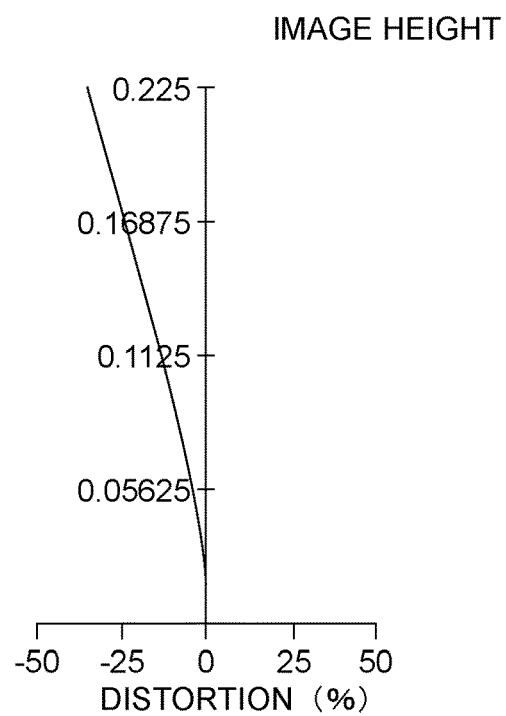
FIG. 36 shows distortion of the ray of wavelength of 0.580 micrometers.

FIG. 36 shows distortion of the ray of wavelength of 0.580 micrometers. The horizontal axis of FIG. 36 represents distortion expressed as a percent. The vertical axis of FIG. 36 represents image height.

Example 10

Figure 37:
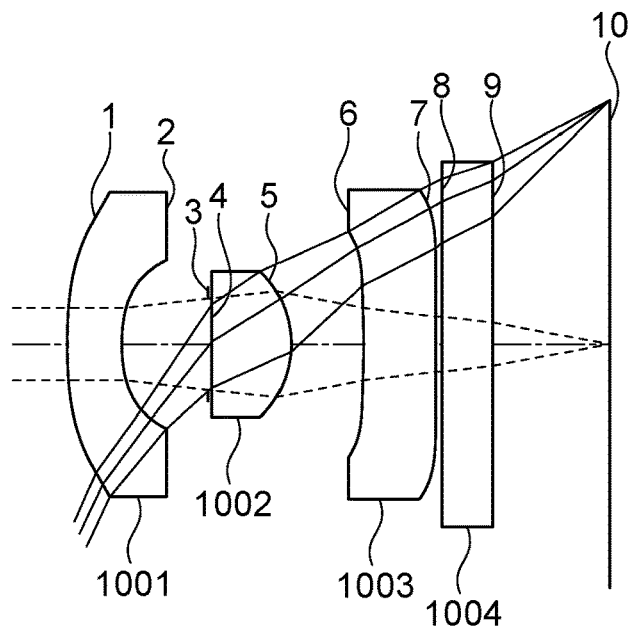
FIG. 37 shows a layout of an imaging optical system of Example 10.

FIG. 37 shows a layout of an imaging optical system of Example 10. The imaging optical system includes three lenses and an infrared cut filter arranged from the object side to the image side. The third lens 1003 is an aspheric lens in which radius of curvature of each of both surfaces is infinity in the paraxial region and which has a power in the peripheral area. The first lens 1001 is a negative meniscus lens which is convex toward the object. The second lens 1002 is a biconvex lens. The aperture stop 3 is located between the first lens 1001 and the second lens 1002.

Table 19 shows positions of the optical elements and properties and values of focal length of the lenses of the imaging optical system of Example 10. The focal length f of the whole imaging optical system is given by f=0.87. The F-number Fno is given by Fno=2.8. HFOV representing a half value of angle of view is given by HFOV=65 (degrees). In Table 19, each of the three lenses is represented respectively by lens 1 to lens 3 from the object side.

In the present example, the object distance from the object to the first lens is infinity.

TABLE 19

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 2.9021 | 0.230 | Plastic | 1.545 | 56 | −1.58 |
| 2 | | 0.6455 | 0.370 | | | | |
| 3 | Ape. Stop | Plano | 0.014 | | | | |
| 4 | Lens 2 | 6.40245 | 0.335 | Plastic | 1.545 | 56 | 0.755 |
| 5 | | −0.4316 | 0.308 | | | | |
| 6 | Lens 3 | ∞ | 0.306 | Plastic | 1.63 | 24 | ∞ |
| 7 | | ∞ | 0.033 | | | | |
| 8 | IR cut filter | Plano | 0.210 | Glass | 1.517 | 64.2 | |
| 9 | | Plano | 0.500 | | | | |
| 10 | Image | Plano | | | | | |

Table 20 shows conic constants and aspheric coefficients of each surface of each lens of Example 10.

TABLE 20

| Surface | K | A4 | A6 | A8 | A10 | A12 | A14 |
|---|---|---|---|---|---|---|---|
| 1 | 16.0050 | 1.3252E+00 | −1.4936E+00 | −2.1568E−01 | −2.5552E+00 | −1.6221E−06 | −1.4352E−06 |
| 2 | 0.0575 | 3.3222E+00 | 2.9882E+01 | −2.0762E+02 | 1.2585E+03 | 4.9403E−08 | −4.1702E−10 |
| 4 | −90.0000 | −3.4220E+00 | 2.9371E+01 | −1.1755E+03 | 5.1917E+03 | −2.0131E−07 | 4.3571E−08 |
| 5 | 0.4340 | 5.2549E−01 | −7.1656E+00 | 1.0551E+02 | −6.6880E+02 | 2.5494E−08 | −8.0269E−10 |
| 6 | 0.0000 | −5.5175E−01 | −1.8052E+00 | −9.1508E+00 | 4.0814E+00 | −2.3728E−05 | 8.3786E−09 |
| 7 | 0.0000 | 5.3875E−01 | −3.3879E+00 | 3.8628E+00 | −2.2918E+00 | −8.0836E−06 | 3.7892E−10 |

Figure 38:
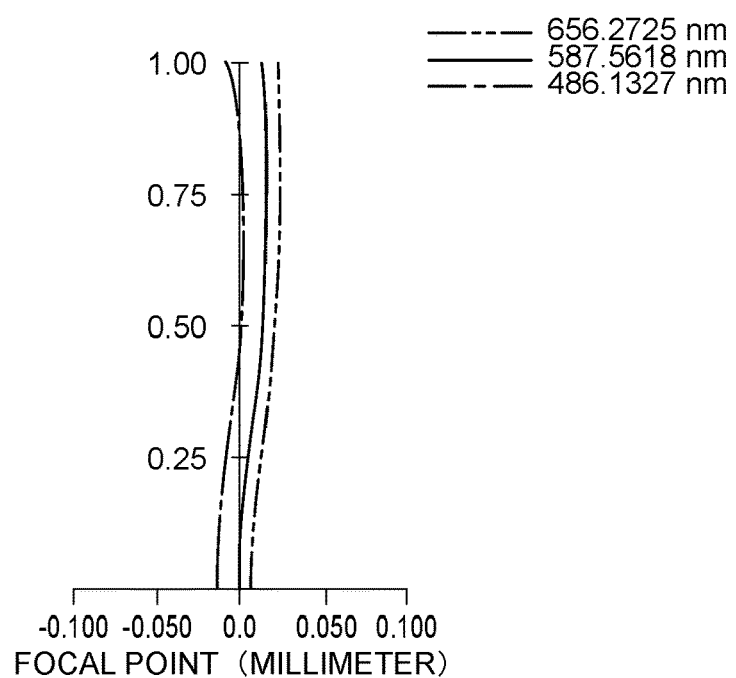
FIG. 38 shows spherical aberrations.

FIG. 38 shows spherical aberrations. The horizontal axis of FIG. 38 represents a position at which a ray that travels parallel to the optical axis and enters the imaging optical system intersects with the optical axis. The vertical axis of FIG. 38 represents distance of the above-described ray from the optical axis. The value of distance is normalized by the radius of the aperture. In other words, the value 1 on the vertical axis represents the radius of the aperture. In FIG. 38, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 39:
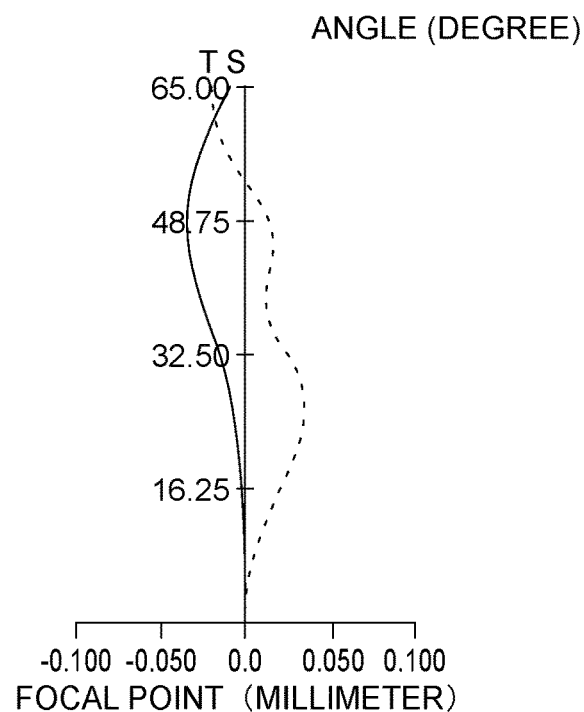
FIG. 39 shows astigmatism of the ray of wavelength of 587.5618 nanometers.

FIG. 39 shows astigmatism of the ray of wavelength of 587.5618 nanometers. The horizontal axis of FIG. 39 represents a position in the optical axis direction of the focal point. The vertical axis of FIG. 39 represents angle that a ray forms with the optical axis. The solid line in FIG. 39 represents the graph of the sagittal plane, and the broken line in FIG. 39 represents the graph of the tangential plane.

Figure 40:
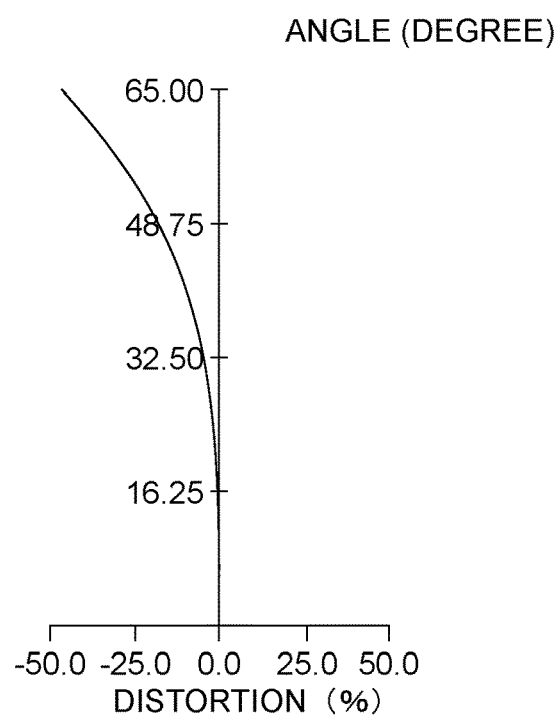
FIG. 40 shows distortion of the ray of wavelength of 587.5618 nanometers.

FIG. 40 shows distortion of the ray of wavelength of 587.5618 nanometers. The horizontal axis of FIG. 40 represents distortion expressed as a percent. The vertical axis of FIG. 40 represents angle that a ray forms with the optical axis.

Example 11

Figure 41:
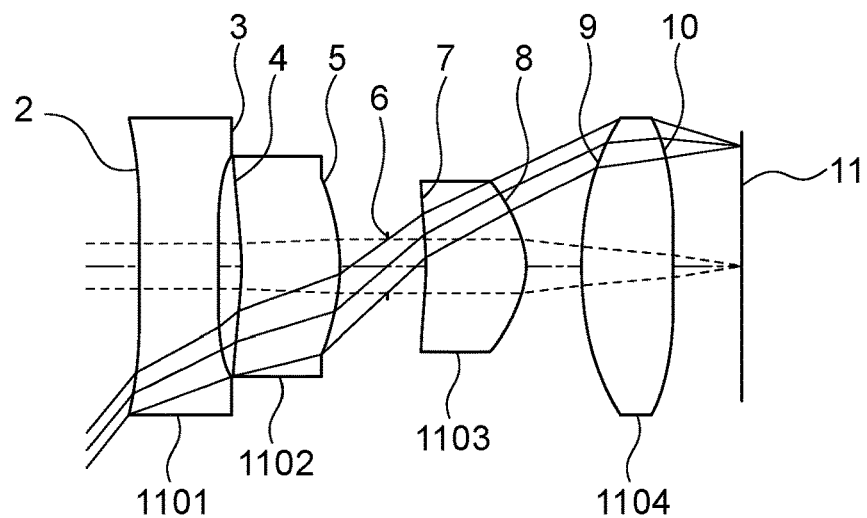
FIG. 41 shows a layout of an imaging optical system of Example 11.

FIG. 41 shows a layout of an imaging optical system of Example 11. The imaging optical system includes four lenses arranged from the object side to the image side. The first lens 1101 is an aspheric lens in which radius of curvature of each of both surfaces is infinity in the paraxial region and which has a power in the peripheral area. The second lens 1102 is a positive meniscus lens which is convex toward the image. The third lens 1103 is a positive meniscus lens which is convex toward the image. The fourth lens 1104 is a biconvex lens. The aperture stop 6 is located between the second lens 1102 and the third lens 1103.

Table 21 shows positions of the optical elements and properties and values of focal length of the lenses of the imaging optical system of Example 11. The focal length f of the whole imaging optical system is given by f=0.273. The F-number Fno is given by Fno=3.25. HFOV representing a half value of angle of view is given by HFOV=50 (degrees). In Table 21, each of the four lenses is represented respectively by lens 1 to lens 4 from the object side.

In the present example, the object distance from the object to the first lens is 5.242(=5.142+0.100) millimeters. Surface 1 does not correspond to a physical object.

TABLE 21

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.141 | Plastic | 1.5311 | 55.634 | ∞ |
| 3 | | ∞ | 0.043 | | | | |
| 4 | Lens 2 | −0.37496 | 0.177 | Plastic | 1.6349 | 23.945 | 1.238 |
| 5 | | −0.30569 | 0.085 | | | | |
| 6 | Ape. Stop | Plano | 0.071 | | | | |
| 7 | Lens 3 | −0.48652 | 0.181 | Plastic | 1.5311 | 55.634 | 0.410 |
| 8 | | −0.16989 | 0.100 | | | | |
| 9 | Lens 4 | 0.83415 | 0.162 | Plastic | 1.5311 | 55.634 | 1.313 |
| 10 | | −3.99663 | 0.125 | | | | |
| 11 | Image | Plano | | | | | |

Table 22 shows conic constants and aspheric coefficients of each surface of each lens of Example 11.

TABLE 22

| Surface | K | A4 | A6 | A8 | A10 | A12 | A14 |
|---|---|---|---|---|---|---|---|
| 2 | 0.0000 | −2.32836E+00 | −1.55438E+01 | −1.41717E+01 | −1.63171E+02 | 6.17353E+02 | 1.10256E+04 |
| 3 | 0.0000 | 1.64151E+01 | 1.46452E+01 | −3.38912E+02 | −5.85873E+03 | −1.86339E+05 | −4.65676E+06 |
| 4 | −17.5374 | 1.41791E+01 | −6.74238E+01 | −1.30252E+02 | −1.82588E+02 | 4.89228E+04 | 1.25134E+06 |
| 5 | −12.8678 | −9.41961E+00 | 7.20759E+01 | 1.65486E+02 | −2.84383E+04 | −5.79999E+05 | 1.00497E+08 |
| 7 | 2.3672 | −1.26715E+01 | 6.17218E+02 | 2.52732E+05 | 1.73377E+07 | 8.27034E+07 | −2.15756E+11 |
| 8 | −0.9986 | 1.52868E+00 | −7.21124E+01 | 7.03914E+03 | 2.45533E+05 | 7.79151E+06 | 2.92319E+08 |
| 9 | 6.6857 | 5.81604E+00 | −2.34589E+01 | −1.11135E+02 | −1.29976E+03 | −1.58222E+04 | −2.68141E+05 |
| 10 | 20.0000 | −3.97802E+00 | −2.06706E+01 | −2.53867E+01 | 2.87569E+02 | −1.94959E+03 | −1.83457E+05 |

Figure 42:
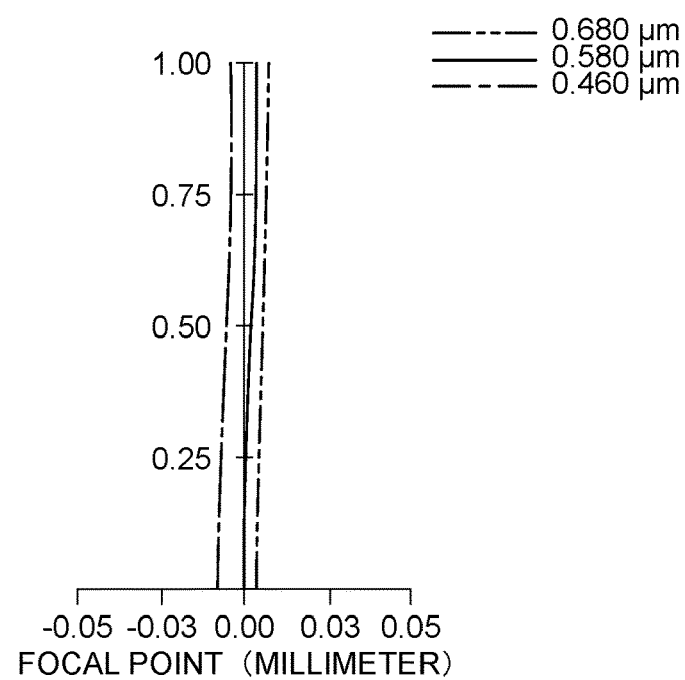
FIG. 42 shows spherical aberrations.

FIG. 42 shows spherical aberrations. The horizontal axis of FIG. 42 represents a position at which a ray that travels parallel to the optical axis and enters the imaging optical system intersects with the optical axis. The vertical axis of FIG. 42 represents distance of the above-described ray from the optical axis. The value of distance is normalized by the radius of the aperture. In other words, the value 1 on the vertical axis represents the radius of the aperture. In FIG. 42, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 43:
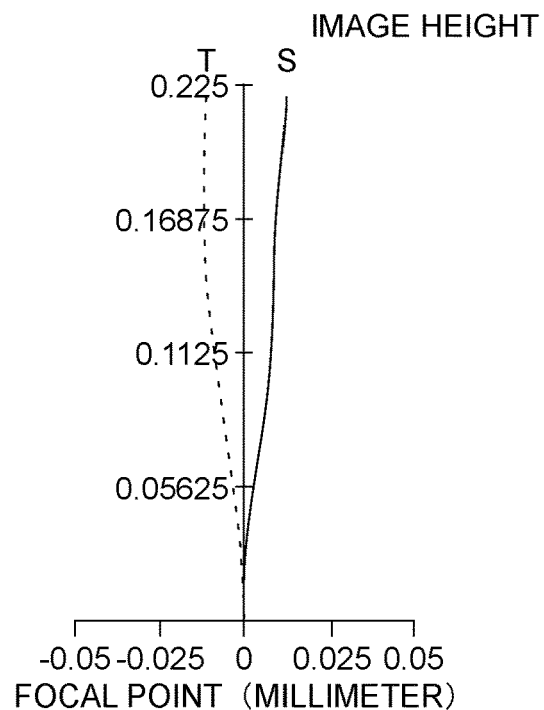
FIG. 43 shows astigmatism of the ray of wavelength of 0.580 micrometers.

FIG. 43 shows astigmatism of the ray of wavelength of 0.580 micrometers. The horizontal axis of FIG. 43 represents a position in the optical axis direction of the focal point. The vertical axis of FIG. 43 represents image height. The solid line in FIG. 43 represents the graph of the sagittal plane, and the broken line in FIG. 43 represents the graph of the tangential plane.

Figure 44:
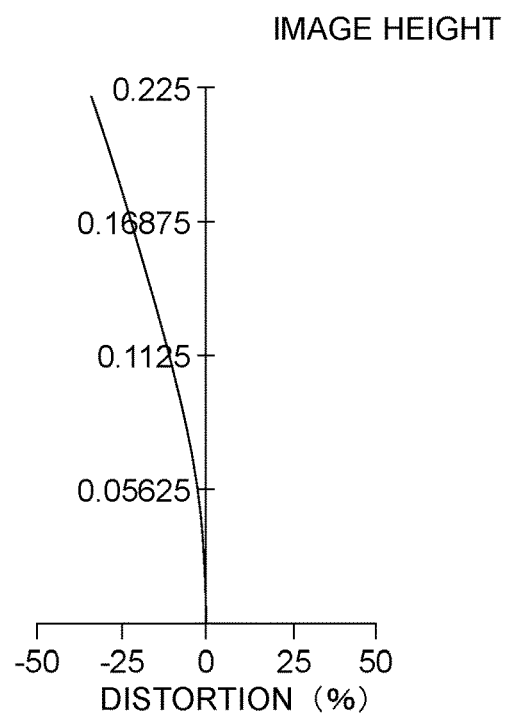
FIG. 44 shows distortion of the ray of wavelength of 0.580 micrometers.

FIG. 44 shows distortion of the ray of wavelength of 0.580 micrometers. The horizontal axis of FIG. 44 represents distortion expressed as a percent. The vertical axis of FIG. 44 represents image height.

Example 12

Figure 45:
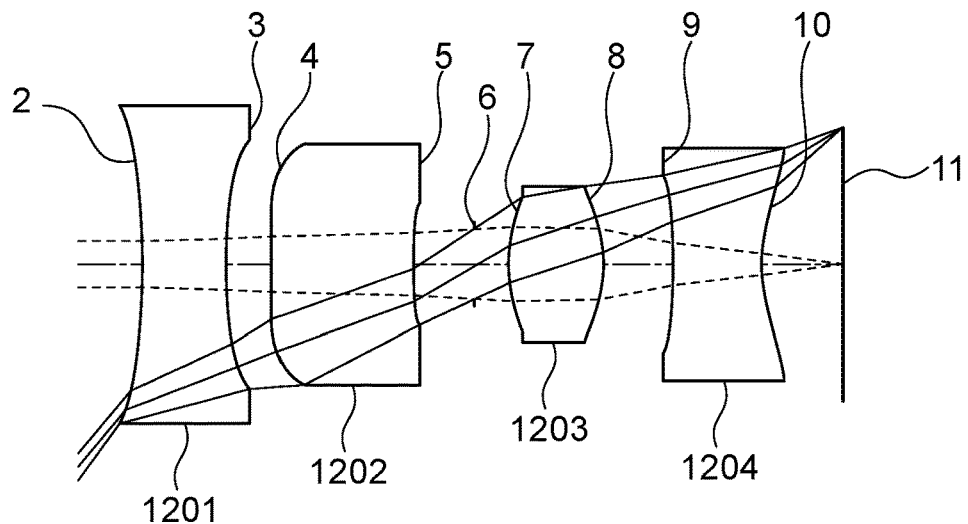
FIG. 45 shows a layout of an imaging optical system of Example 12.

FIG. 45 shows a layout of an imaging optical system of Example 12. The imaging optical system includes four lenses arranged from the object side to the image side. The second lens 1202 is an aspheric lens in which radius of curvature of each of both surfaces is infinity in the paraxial region and which has a power in the peripheral area. The first lens 1201 is a biconcave lens. The third lens 1203 is a biconvex lens. The fourth lens 1204 is a biconcave lens. The aperture stop 6 is located between the second lens 1202 and the third lens 1203.

Table 23 shows positions of the optical elements and properties and values of focal length of the lenses of the imaging optical system of Example 12. The focal length f of the whole imaging optical system is given by f=0.265. The F-number Fno is given by Fno=3.577. HFOV representing a half value of angle of view is given by HFOV=50 (degrees). In Table 23, each of the four lenses is represented respectively by lens 1 to lens 4 from the object side.

In the present example, the object distance from the object to the first lens is 5.242(=5.142+0.100) millimeters. Surface 1 does not correspond to a physical object.

TABLE 23

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | −1.37206 | 0.136 | Plastic | 1.5311 | 55.634 | −0.915 |
| 3 | | 0.77994 | 0.074 | | | | |
| 4 | Lens 2 | ∞ | 0.235 | Plastic | 1.6349 | 23.945 | ∞ |
| 5 | | ∞ | 0.099 | | | | |
| 6 | Ape. Stop | Plano | 0.058 | | | | |
| 7 | Lens 3 | 0.34917 | 0.152 | Plastic | 1.5311 | 55.634 | 0.263 |
| 8 | | −0.19799 | 0.113 | | | | |
| 9 | Lens 4 | −1.19601 | 0.147 | Plastic | 1.4917 | 55.31 | −0.490 |
| 10 | | 0.31434 | 0.130 | | | | |
| 11 | Image | Plano | | | | | |

Table 24 shows conic constants and aspheric coefficients of each surface of each lens of Example 12.

TABLE 24

| Surface | K | A4 | A6 | A8 | A10 | A12 | A14 |
|---|---|---|---|---|---|---|---|
| 2 | 12.2313 | 6.69617E−01 | −2.33764E+01 | −1.23735E+01 | −8.76197E+01 | −1.82077E+03 | −2.21450E+02 |
| 3 | −12.4482 | 1.79394E+00 | 1.68880E+02 | −1.95345E+01 | 1.51058E+03 | 7.18888E+04 | 3.05010E+04 |
| 4 | 0.0000 | 1.41231E+01 | 3.70323E+02 | 6.49774E+02 | 8.27085E+03 | 3.05735E+05 | −2.37465E+05 |
| 5 | 0.0000 | 3.82694E+01 | 2.38445E+03 | −9.91706E+03 | 1.51919E+06 | 7.59284E+08 | 3.23483E+09 |
| 7 | 5.4641 | −1.21476E+01 | 1.06322E+03 | −9.68789E+03 | −6.93064E+05 | −2.46592E+08 | −3.16631E+08 |
| 8 | −2.2492 | 2.53282E+01 | −4.03037E+02 | 4.90848E+04 | 2.64671E+04 | 2.59425E+06 | 2.07856E+08 |
| 9 | 3.7970 | −2.64384E+00 | −3.27368E+02 | 1.54687E+03 | −1.10438E+04 | −1.31452E+06 | 4.00774E+06 |
| 10 | −5.3897 | −3.24395E+00 | −2.60617E+01 | −1.44229E+03 | −2.95760E+03 | −1.21851E+05 | −9.91530E+05 |

Figure 46:
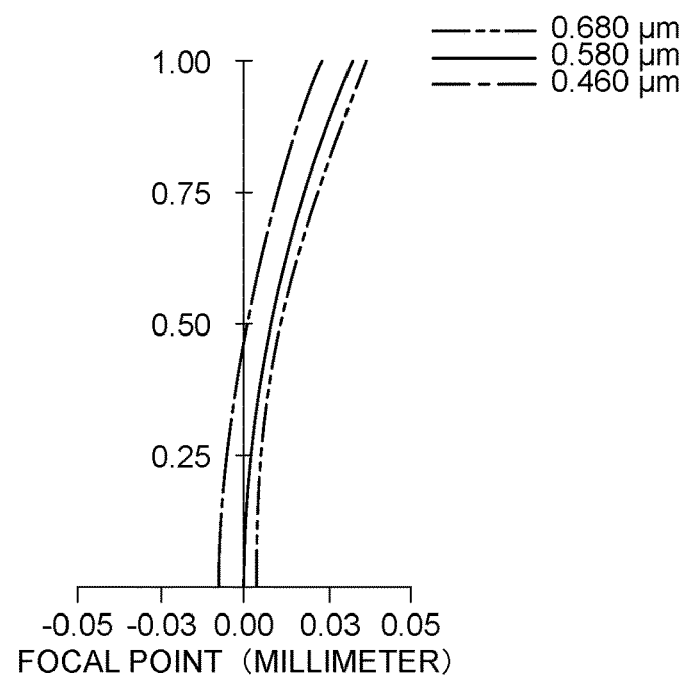
FIG. 46 shows spherical aberrations.

FIG. 46 shows spherical aberrations. The horizontal axis of FIG. 46 represents a position at which a ray that travels parallel to the optical axis and enters the imaging optical system intersects with the optical axis. The vertical axis of FIG. 46 represents distance of the above-described ray from the optical axis. The value of distance is normalized by the radius of the aperture. In other words, the value 1 on the vertical axis represents the radius of the aperture. In FIG. 46, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 47:
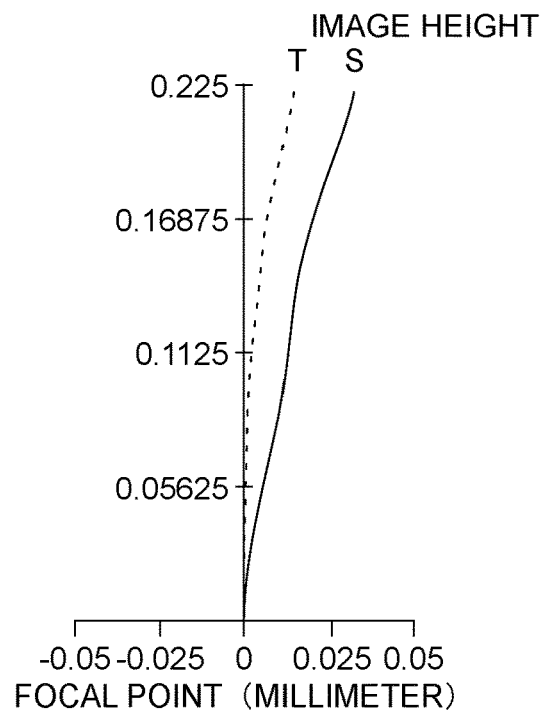
FIG. 47 shows astigmatism of the ray of wavelength of 0.580 micrometers.

FIG. 47 shows astigmatism of the ray of wavelength of 0.580 micrometers. The horizontal axis of FIG. 47 represents a position in the optical axis direction of the focal point. The vertical axis of FIG. 47 represents image height. The solid line in FIG. 47 represents the graph of the sagittal plane, and the broken line in FIG. 47 represents the graph of the tangential plane.

Figure 48:
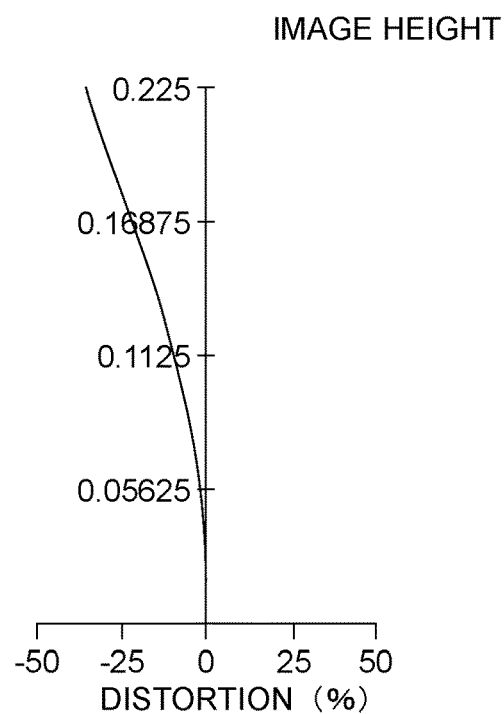
FIG. 48 shows distortion of the ray of wavelength of 0.580 micrometers.

FIG. 48 shows distortion of the ray of wavelength of 0.580 micrometers. The horizontal axis of FIG. 48 represents distortion expressed as a percent. The vertical axis of FIG. 48 represents image height.

Reference Example 1

Figure 49:
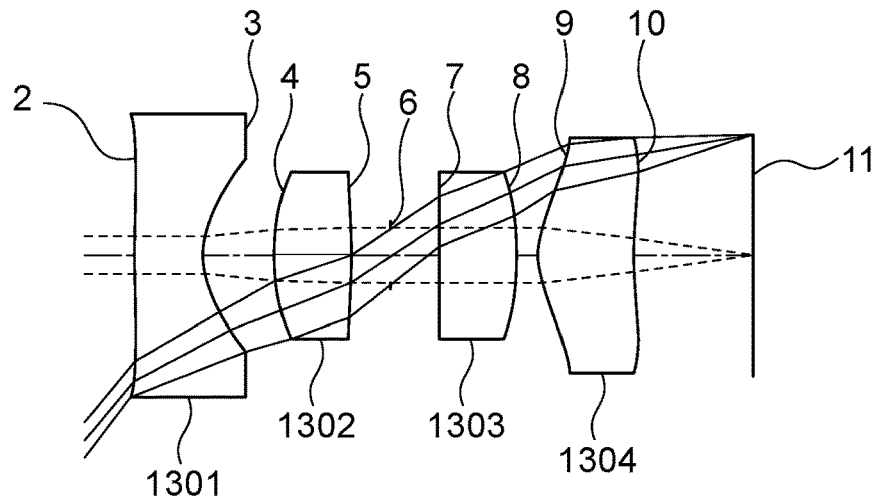
FIG. 49 shows a layout of an imaging optical system of Reference Example 1.

FIG. 49 shows a layout of an imaging optical system of Reference Example 1. The imaging optical system includes four lenses arranged from the object side to the image side. The third lens 1303 is an aspheric lens in which radius of curvature of each of both surfaces is infinity in the paraxial region and which has a power in the peripheral area. The first lens 1301 is a negative meniscus lens which is convex toward the object. The second lens 1302 is a biconvex lens. The fourth lens 1304 is a positive meniscus lens which is convex toward the object. The aperture stop 6 is located between the second lens 1302 and the third lens 1303.

Table 25 shows positions of the optical elements and properties and values of focal length of the lenses of the imaging optical system of Example 12. The focal length f of the whole imaging optical system is given by f=0.24. The F-number Fno is given by Fno=3.438. HFOV representing a half value of angle of view is given by HFOV=50 (degrees). In Table 25, each of the four lenses is represented respectively by lens 1 to lens 4 from the object side.

In the present reference example, the object distance from the object to the first lens is 5.242(=5.142+0.100) millimeters. Surface 1 does not correspond to a physical object.

TABLE 25

| Surface | | Radius of curvature | Thickness or distance | Material | Refractive index | Abbe's number | Focal length |
| --- | --- | --- | --- | --- | --- | --- | --- |
| 0 | Object | Plano | 5.142 | | | | |
| 1 | | Plano | 0.100 | | | | |
| 2 | Lens 1 | 1.45294 | 0.127 | Plastic | 1.5311 | 55.634 | −0.355 |
| 3 | | 0.16224 | 0.133 | | | | |
| 4 | Lens 2 | 0.45523 | 0.141 | Plastic | 1.6349 | 23.945 | 0.480 |
| 5 | | −0.92220 | 0.073 | | | | |
| 6 | Ape. Stop | Plano | 0.089 | | | | |
| 7 | Lens 3 | ∞ | 0.143 | Plastic | 1.5311 | 55.634 | ∞ |
| 8 | | ∞ | 0.040 | | | | |
| 9 | Lens 4 | 0.15850 | 0.176 | Plastic | 1.5311 | 55.634 | 0.342 |
| 10 | | 0.75592 | 0.219 | | | | |
| 11 | Image | Plano | | | | | |

Table 26 shows conic constants and aspheric coefficients of each surface of each lens of Reference Example 1.

TABLE 26

| Surface | K | A4 | A6 | A8 | A10 | A12 | A14 |
| --- | --- | --- | --- | --- | --- | --- | --- |
| 2 | −9.1435 | −5.83006E+00 | 2.78698E+00 | 6.78811E+01 | −5.82375E+01 | −2.41663E+03 | −6.70222E+04 |
| 3 | −1.0771 | −7.57825E+00 | −5.75350E+02 | 1.14496E+04 | −2.49280E+04 | −3.13127E+05 | −2.79784E+07 |
| 4 | −2.5817 | 2.77779E−01 | 2.40042E+02 | 3.85923E+03 | 7.30756E+04 | 1.36131E+06 | −1.24459E+08 |
| 5 | −20.0001 | 6.27636E+00 | 1.03990E+02 | 7.13269E+03 | −2.54640E+04 | 5.62848E+07 | −1.07027E+09 |
| 7 | 0.0000 | −1.73270E+01 | 3.83561E+03 | −1.29365E+05 | −5.18863E+05 | −1.86278E+07 | 2.60436E+09 |
| 8 | 0.0000 | −9.03193E+01 | 2.35365E+03 | −1.03609E+04 | 3.77145E+04 | 2.08807E+05 | −3.24329E+07 |
| 9 | −4.5848 | −2.57022E+00 | −4.28017E+02 | 7.07632E+03 | −5.85680E+02 | 3.80621E+04 | 1.59338E+06 |
| 10 | 9.2100 | −6.54348E+00 | −4.22838E+02 | 3.19529E+03 | −8.97533E+01 | −3.38674E+04 | −1.22112E−06 |

Figure 50:
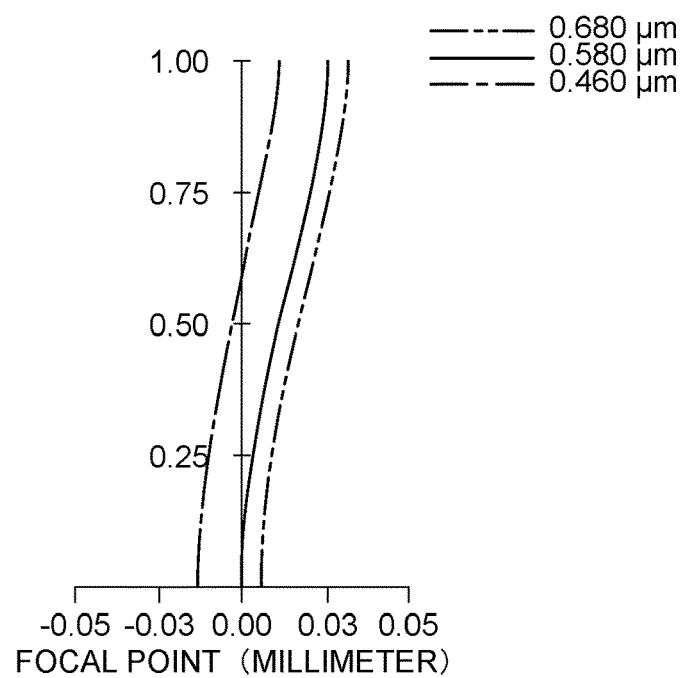
FIG. 50 shows spherical aberrations.

FIG. 50 shows spherical aberrations. The horizontal axis of FIG. 50 represents a position at which a ray that travels parallel to the optical axis and enters the imaging optical system intersects with the optical axis. The vertical axis of FIG. 50 represents distance of the above-described ray from the optical axis. The value of distance is normalized by the radius of the aperture. In other words, the value 1 on the vertical axis represents the radius of the aperture. In FIG. 50, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 51:
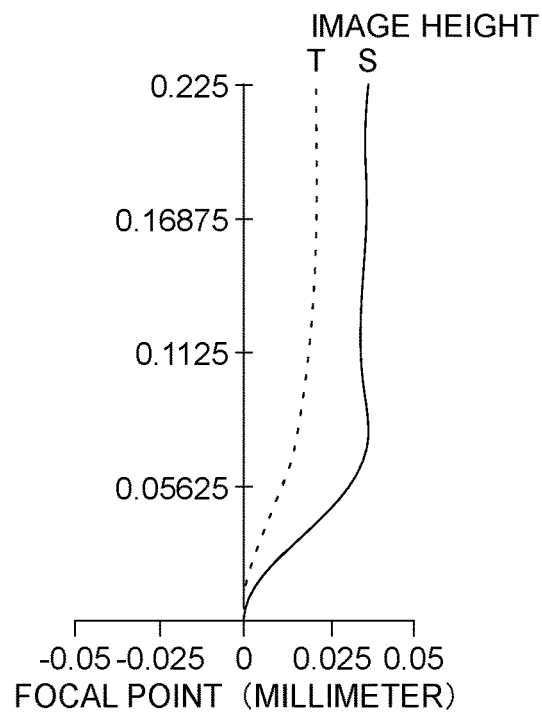
FIG. 51 shows astigmatism of the ray of wavelength of 0.580 micrometers.

FIG. 51 shows astigmatism of the ray of wavelength of 0.580 micrometers. The horizontal axis of FIG. 51 represents a position in the optical axis direction of the focal point. The vertical axis of FIG. 51 represents image height. The solid line in FIG. 51 represents the graph of the sagittal plane, and the broken line in FIG. 51 represents the graph of the tangential plane.

Figure 52:
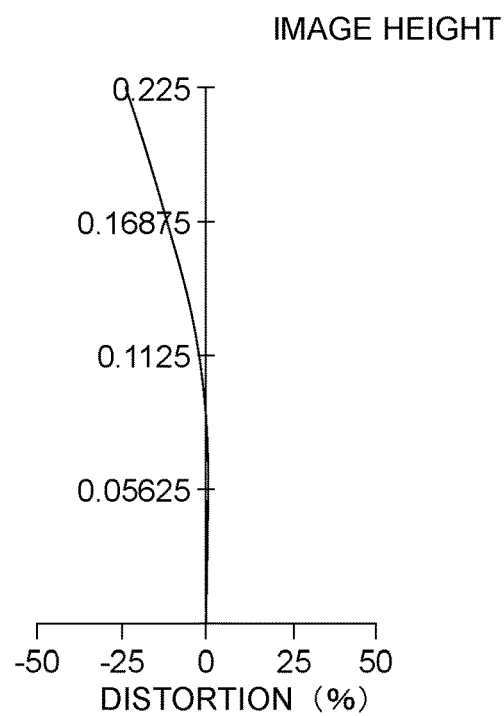
FIG. 52 shows distortion of the ray of wavelength of 0.580 micrometers.

FIG. 52 shows distortion of the ray of wavelength of 0.580 micrometers. The horizontal axis of FIG. 52 represents distortion expressed as a percent. The vertical axis of FIG. 52 represents image height.

Example 14

Figure 53:
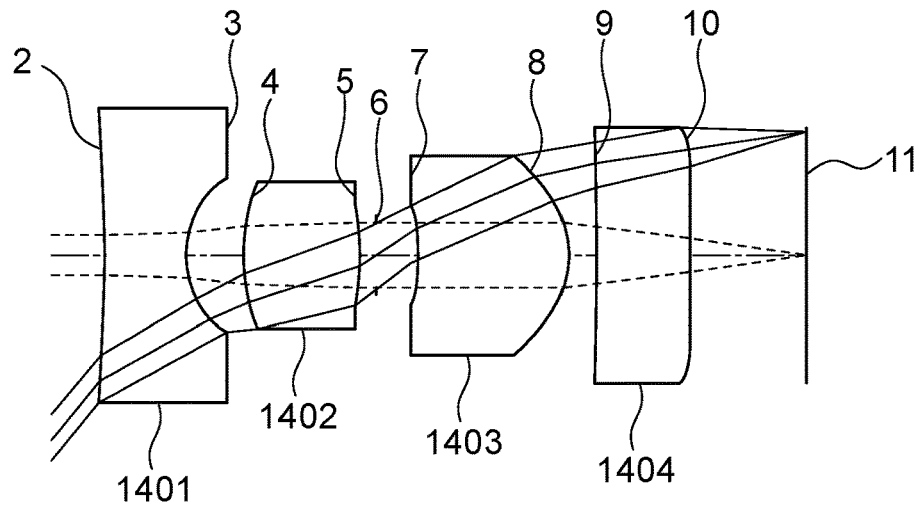
FIG. 53 shows a layout of an imaging optical system of Example 14.

FIG. 53 shows a layout of an imaging optical system of Example 14. The imaging optical system includes four lenses arranged from the object side to the image side. The fourth lens 1404 is an aspheric lens in which radius of curvature of each of both surfaces is infinity in the paraxial region and which has a power in the peripheral area. The first lens 1401 is a biconcave lens. The second lens 1402 is a biconvex lens. The third lens 1403 is a positive meniscus lens which is convex toward the image. The aperture stop 6 is located between the second lens 1402 and the third lens 1403.

Table 27 shows positions of the optical elements and properties and values of focal length of the lenses of the imaging optical system of Example 14. The focal length f of the whole imaging optical system is given by f=0.244. The F-number Fno is given by Fno=3.185. HFOV representing a half value of angle of view is given by HFOV=50 (degrees). In Table 27, each of the four lenses is represented respectively by lens 1 to lens 4 from the object side.

In the present example, the object distance from the object to the first lens is 5.242(=5.142+0.100) millimeters. Surface 1 does not correspond to a physical object.

TABLE 27

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | −1.56147 | 0.146 | Plastic | 1.5311 | 55.634 | −0.295 |
| 3 | | 0.18019 | 0.105 | | | | |
| 4 | Lens 2 | 0.40965 | 0.208 | Plastic | 1.6349 | 23.945 | 0.363 |
| 5 | | −0.46414 | 0.029 | | | | |
| 6 | Ape. Stop | Plano | 0.076 | | | | |
| 7 | Lens 3 | −0.54489 | 0.271 | Plastic | 1.5311 | 55.634 | 0.394 |
| 8 | | −0.17756 | 0.048 | | | | |
| 9 | Lens 4 | ∞ | 0.169 | Plastic | 1.5311 | 55.634 | ∞ |
| 10 | | ∞ | 0.207 | | | | |
| 11 | Image | Plano | | | | | |

Table 28 shows conic constants and aspheric coefficients of each surface of each lens of Example 14.

TABLE 28

| Surface | K | A4 | A6 | A8 | A10 | A12 | A14 |
|---|---|---|---|---|---|---|---|
| 2 | −12.8414 | 3.31259E+00 | −7.19393E+00 | −6.70894E+01 | −3.66190E+02 | −4.93383E+02 | −6.11731E+03 |
| 3 | 0.4405 | −4.58397E−01 | 4.33687E+01 | 3.96877E+03 | 5.63172E+05 | 1.01356E+07 | −3.77482E+09 |
| 4 | −9.4333 | 2.31138E+01 | −1.21532E+02 | −3.55780E+03 | 2.75787E+04 | 9.49692E+06 | 6.24750E+08 |
| 5 | −6.7282 | −2.00366E+01 | −8.89183E+01 | −2.24590E+04 | −2.94207E+05 | 9.50845E+07 | 6.67465E+09 |
| 7 | 17.4482 | −5.80457E+01 | 2.65830E+03 | 1.02001E+05 | 2.38257E+06 | −9.97373E+07 | −6.23985E+10 |
| 8 | −0.2813 | 6.75849E+00 | 1.11674E+02 | 2.33977E+03 | 2.48072E+04 | 1.42314E+06 | 8.51453E+07 |
| 9 | 0.0000 | −1.66280E+00 | 1.25555E+01 | 7.18142E+02 | 9.91073E+03 | −1.32431E+05 | −1.43968E+07 |
| 10 | 0.0000 | −1.30962E+00 | −1.96094E+01 | −4.02359E+02 | −5.30328E+03 | −8.20004E+04 | −2.04582E+06 |

Figure 54:
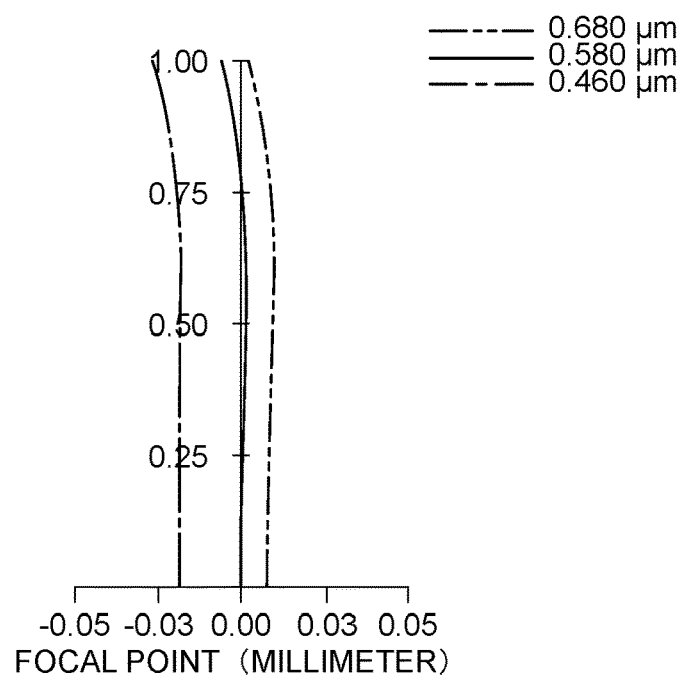
FIG. 54 shows spherical aberrations.

FIG. 54 shows spherical aberrations. The horizontal axis of FIG. 54 represents a position at which a ray that travels parallel to the optical axis and enters the imaging optical system intersects with the optical axis. The vertical axis of FIG. 54 represents distance of the above-described ray from the optical axis. The value of distance is normalized by the radius of the aperture. In other words, the value 1 on the vertical axis represents the radius of the aperture. In FIG. 54, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 55:
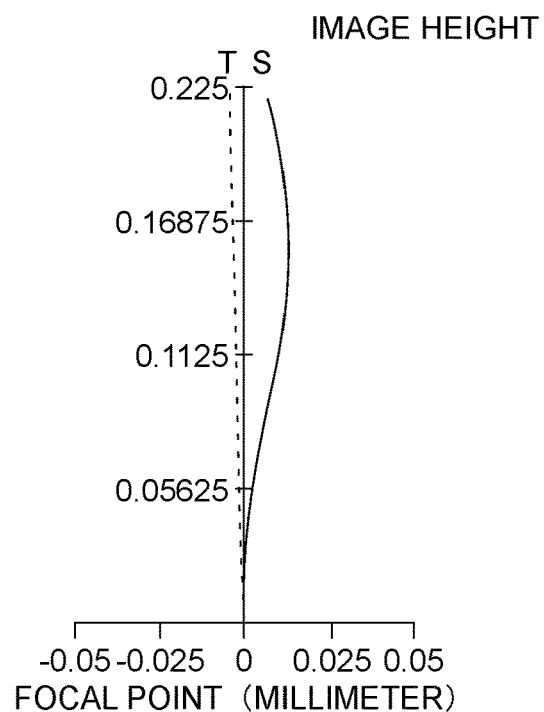
FIG. 55 shows astigmatism of the ray of wavelength of 0.580 micrometers.

FIG. 55 shows astigmatism of the ray of wavelength of 0.580 micrometers. The horizontal axis of FIG. 55 represents a position in the optical axis direction of the focal point. The vertical axis of FIG. 55 represents image height. The solid line in FIG. 55 represents the graph of the sagittal plane, and the broken line in FIG. 55 represents the graph of the tangential plane.

Figure 56:
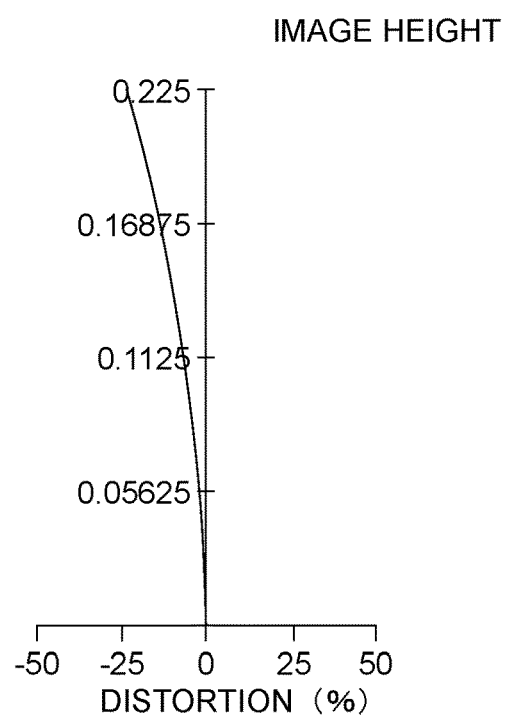
FIG. 56 shows distortion of the ray of wavelength of 0.580 micrometers.

FIG. 56 shows distortion of the ray of wavelength of 0.580 micrometers. The horizontal axis of FIG. 56 represents distortion expressed as a percent. The vertical axis of FIG. 56 represents image height.

Example 15

Figure 57:
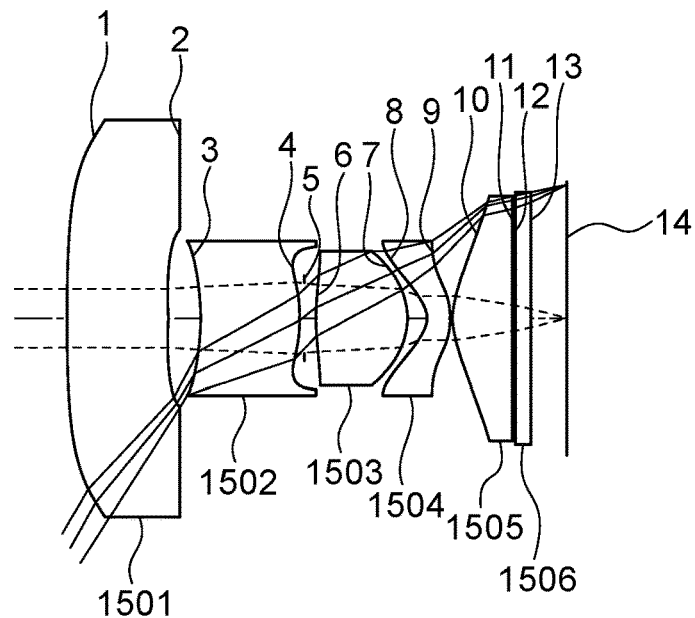
FIG. 57 shows a layout of an imaging optical system of Example 15.

FIG. 57 shows a layout of an imaging optical system of Example 15. The imaging optical system includes five lenses and an infrared cut filter arranged from the object side to the image side. The first lens 1501 is an aspheric lens in which radius of curvature of each of both surfaces is infinity in the paraxial region and which has a power in the peripheral area. The second lens 1502 is a positive meniscus lens which is convex toward the image. The third lens 1503 is a biconvex lens. The fourth lens 1504 is a negative meniscus lens which is convex toward the image. The fifth lens 1505 is a positive meniscus lens which is convex toward the object. The aperture stop 5 is located between the second lens 1502 and the third lens 1503.

Table 29 shows positions of the optical elements and properties and values of focal length of the lenses of the imaging optical system of Example 15. The focal length f of the whole imaging optical system is given by f=1.69. The F-number Fno is given by Fno=2. HFOV representing a half value of angle of view is given by HFOV=60 (degrees). In Table 29, each of the five lenses is represented respectively by lens 1 to lens 5 from the object side.

In the present example, the object distance from the object to the first lens is infinity.

TABLE 29

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | ∞ | 1.500 | Plastic | 1.535 | 56 | ∞ |
| 2 | | ∞ | 0.505 | | | | |
| 3 | Lens 2 | −2.7857 | 1.500 | Plastic | 1.545 | 56 | 19.677 |
| 4 | | −2.6313 | 0.058 | | | | |
| 5 | Ape. Stop | Plano | 0.169 | | | | |
| 6 | Lens 3 | 2.4177 | 1.396 | Plastic | 1.545 | 56 | 1.468 |
| 7 | | −0.9520 | 0.285 | | | | |
| 8 | Lens 4 | −0.2845 | 0.340 | Plastic | 1.645 | 23 | −0.954 |
| 9 | | −0.7770 | 0.030 | | | | |
| 10 | Lens 5 | 0.7226 | 0.908 | Plastic | 1.535 | 56 | 1.334 |
| 11 | | 66.8602 | 0.050 | | | | |
| 12 | IR cut filter | Plano | 0.210 | Glass | 1.517 | 64.2 | |
| 13 | | Plano | 0.550 | | | | |
| 14 | Image | Plano | | | | | |

Table 30 shows conic constants and aspheric coefficients of each surface of each lens of Example 15.

TABLE 30

| Surface | K | A4 | A6 | A8 | A10 | A12 | A14 |
|---|---|---|---|---|---|---|---|
| 1 | 90.0000 | 1.7391E−02 | −1.8991E−03 | 2.0821E−05 | 1.5625E−05 | −1.2142E−06 | 6.5592E−08 |
| 2 | 90.0000 | 1.0834E−01 | −6.0218E−02 | 4.7490E−02 | −1.3516E−02 | −7.2380E−03 | 4.8288E−03 |
| 4 | −28.2707 | −2.9938E−02 | −2.7631E−03 | 3.4536E−03 | −4.1771E−03 | 1.1262E−04 | −7.0895E−07 |
| 5 | −9.5592 | −1.3215E−01 | 1.8042E−01 | −6.6468E−01 | 9.0942E−01 | 7.4246E−06 | −9.9031E−07 |
| 6 | −2.4812 | −9.6787E−02 | −3.3296E−02 | −1.8539E−01 | −3.0522E−01 | 0.0000E+00 | 0.0000E+00 |
| 7 | −0.5755 | 7.2623E−02 | −1.5101E−01 | 1.5996E−01 | −8.4019E−02 | −5.5327E−10 | −2.5667E−11 |
| 8 | −1.9162 | 1.1325E−01 | 3.3713E−02 | −2.6310E−02 | 2.0523E−02 | 4.7016E−10 | −5.2073E−11 |
| 9 | −2.3163 | 1.5675E−01 | 4.4456E−02 | −3.1523E−02 | 1.3948E−02 | −9.5419E−08 | 4.7284E−11 |
| 10 | −5.6505 | −5.7112E−02 | 1.2683E−02 | 4.8910E−03 | −1.4125E−03 | 2.2661E−05 | 7.1840E−10 |
| 11 | 33.8431 | 1.2749E−03 | −1.4602E−02 | 9.1121E−03 | −1.5879E−03 | 6.3516E−06 | 4.6752E−10 |

Figure 58:
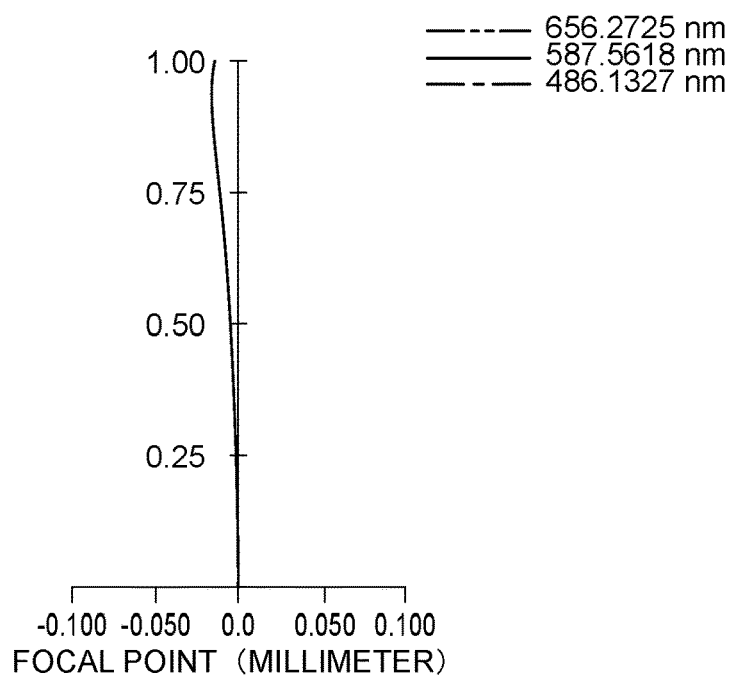
FIG. 58 shows spherical aberrations.

FIG. 58 shows spherical aberrations. The horizontal axis of FIG. 58 represents a position at which a ray that travels parallel to the optical axis and enters the imaging optical system intersects with the optical axis. The vertical axis of FIG. 58 represents distance of the above-described ray from the optical axis. The value of distance is normalized by the radius of the aperture. In other words, the value 1 on the vertical axis represents the radius of the aperture. In FIG. 58, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 59:
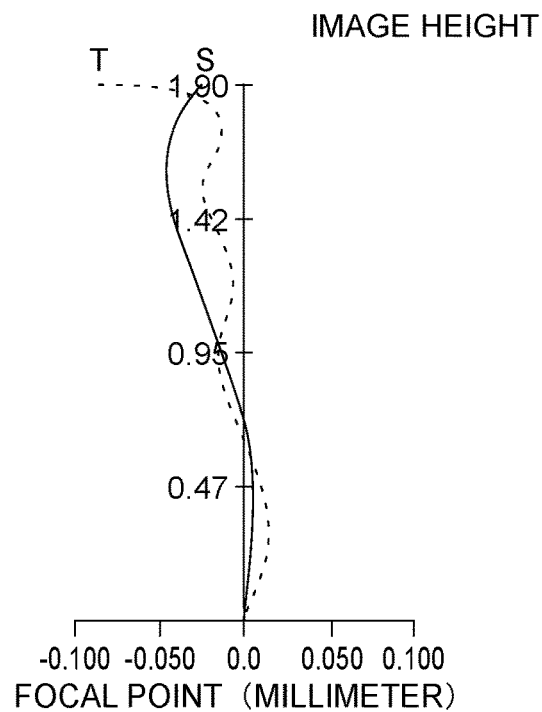
FIG. 59 shows astigmatism of the ray of wavelength of 587.5618 nanometers.

FIG. 59 shows astigmatism of the ray of wavelength of 587.5618 nanometers. The horizontal axis of FIG. 59 represents a position in the optical axis direction of the focal point. The vertical axis of FIG. 59 represents image height. The solid line in FIG. 59 represents the graph of the sagittal plane, and the broken line in FIG. 59 represents the graph of the tangential plane.

Figure 60:
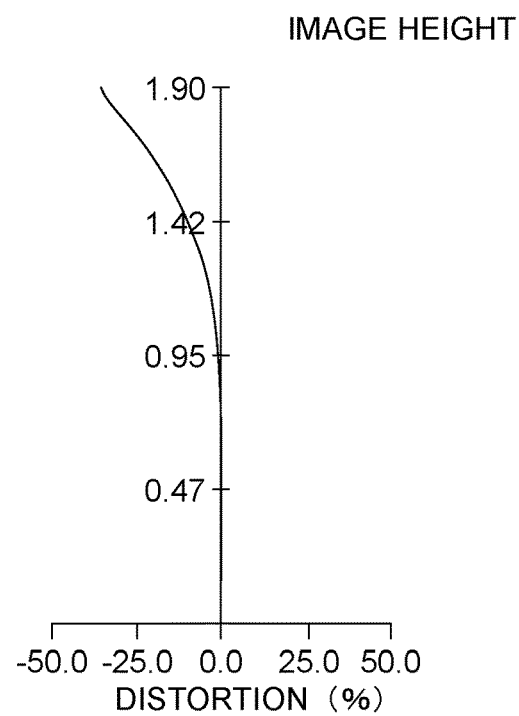
FIG. 60 shows distortion of the ray of wavelength of 587.5618 nanometers.

FIG. 60 shows distortion of the ray of wavelength of 587.5618 nanometers. The horizontal axis of FIG. 60 represents distortion expressed as a percent. The vertical axis of FIG. 60 represents image height.

Example 16

Figure 61:
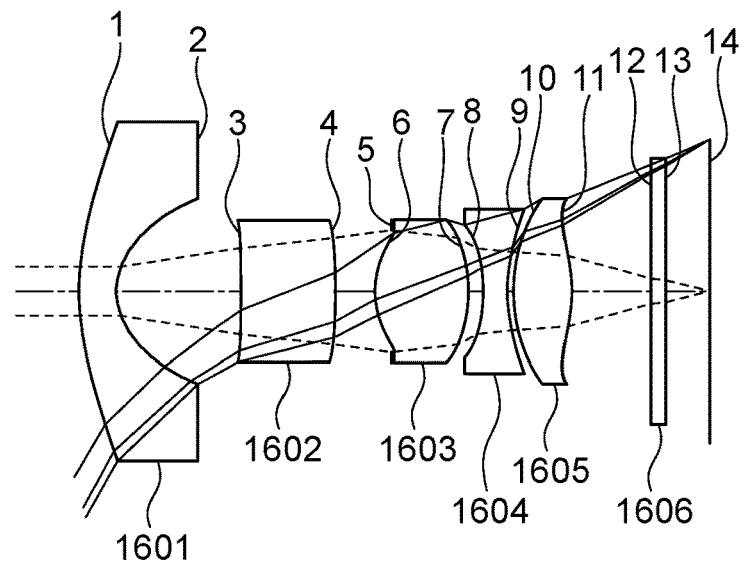
FIG. 61 shows a layout of an imaging optical system of Example 16.

FIG. 61 shows a layout of an imaging optical system of Example 16. The imaging optical system includes five lenses and an infrared cut filter arranged from the object side to the image side. The second lens 1602 is an aspheric lens in which radius of curvature of each of both surfaces is infinity in the paraxial region and which has a power in the peripheral area. The first lens 1601 is a negative meniscus lens which is convex toward the object. The third lens 1603 is a biconvex lens. The fourth lens 1604 is a biconcave lens. The fifth lens 1605 is a biconvex lens. The aperture stop 5 is located closer to the object than the object-side surface of the third lens 1603.

Table 31 shows positions of the optical elements and properties and values of focal length of the lenses of the imaging optical system of Example 16. The focal length f of the whole imaging optical system is given by f=1.3. The F-number Fno is given by Fno=2. HFOV representing a half value of angle of view is given by HFOV=60 (degrees). In Table 31, each of the five lenses is represented respectively by lens 1 to lens 5 from the object side.

In the present example, the object distance from the object to the first lens is infinity.

TABLE 31

| Surface | | Radius of curvature | Thickness or distance | Material | Refractive index | Abbe's number | Focal length |
| --- | --- | --- | --- | --- | --- | --- | --- |
| 0 | Object | Plano | ∞ | | | | |
| 1 | Lens 1 | 4.2189 | 0.479 | Plastic | 1.545 | 56 | −2.179 |
| 2 | | 0.8895 | 1.564 | | | | |
| 3 | Lens 2 | ∞ | 1.200 | Plastic | 1.645 | 23 | ∞ |
| 4 | | ∞ | 0.702 | | | | |
| 5 | Ape. Stop | Plano | −0.184 | | | | |
| 6 | Lens 3 | 1.2588 | 1.161 | Plastic | 1.545 | 56 | 1.552 |
| 7 | | −1.7404 | 0.221 | | | | |
| 8 | Lens 4 | −2.3807 | 0.300 | Plastic | 1.645 | 23 | −1.365 |
| 9 | | 1.4656 | 0.089 | | | | |
| 10 | Lens 5 | 1.8256 | 0.722 | Plastic | 1.545 | 56 | 1.944 |
| 11 | | −2.1737 | 0.986 | | | | |
| 12 | IR cut filter | Plano | 0.210 | Glass | 1.517 | 64.2 | |
| 13 | | Plano | 0.550 | | | | |
| 14 | Image | Plano | | | | | |

Table 32 shows conic constants and aspheric coefficients of each surface of each lens of Example 16.

TABLE 32

| Surface | K | A4 | A6 | A8 | A10 | A12 | A14 |
| --- | --- | --- | --- | --- | --- | --- | --- |
| 1 | 0.8179 | 5.7037E−03 | −4.1021E−03 | 2.3033E−04 | 2.2707E−05 | −1.6911E−06 | −6.5007E−08 |
| 2 | −0.8896 | 8.7653E−02 | −9.3382E−03 | 4.4523E−02 | −2.5845E−02 | −1.6860E−07 | 1.6171E−08 |
| 4 | 56.2288 | −6.6155E−02 | 2.1388E−02 | −2.2250E−02 | 7.2844E−03 | 2.6238E−09 | −1.9906E−12 |
| 5 | 56.2288 | −1.4473E−01 | 9.8671E−02 | −4.8968E−02 | 1.5996E−02 | 1.6634E−10 | −3.2330E−12 |
| 6 | −1.8767 | −1.4887E−02 | 1.3031E−02 | 5.5654E−02 | −9.9089E−02 | 0.0000E+00 | 0.0000E+00 |
| 7 | 0.4527 | 1.0433E−01 | −1.7960E−01 | 1.2839E−01 | −6.8380E−02 | −4.8765E−12 | −7.1656E−13 |
| 8 | 2.5650 | −1.4605E−01 | 2.1766E−03 | −2.9251E−02 | 4.8900E−02 | 2.0104E−11 | 4.3986E−12 |
| 9 | −13.1448 | 2.0720E−02 | −4.2816E−02 | 4.3296E−02 | −1.3094E−02 | −1.2225E−11 | −3.0361E−12 |
| 10 | −19.0957 | 8.6651E−02 | −2.0583E−02 | 1.5181E−02 | −9.1093E−04 | 5.7829E−10 | 1.5574E−12 |
| 11 | −1.5755 | 2.9450E−02 | 5.3841E−02 | 1.5708E−02 | −2.0297E−03 | 1.4035E−10 | −4.6034E−12 |

Figure 62:
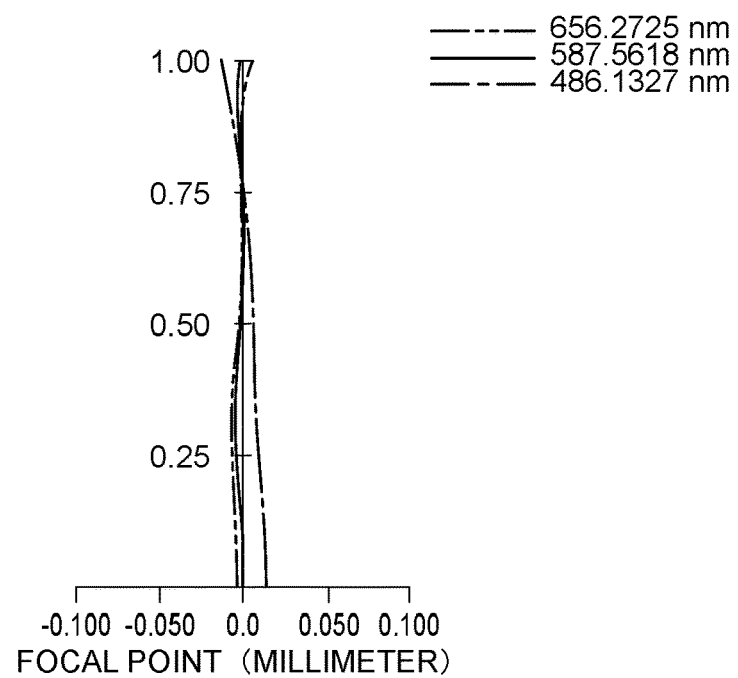
FIG. 62 shows spherical aberrations.

FIG. 62 shows spherical aberrations. The horizontal axis of FIG. 62 represents a position at which a ray that travels parallel to the optical axis and enters the imaging optical system intersects with the optical axis. The vertical axis of FIG. 62 represents distance of the above-described ray from the optical axis. The value of distance is normalized by the radius of the aperture. In other words, the value 1 on the vertical axis represents the radius of the aperture. In FIG. 62, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 63:
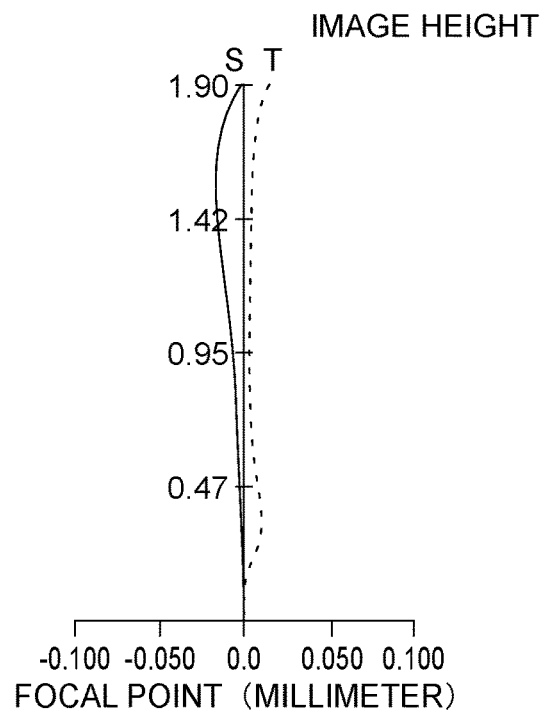
FIG. 63 shows astigmatism of the ray of wavelength of 587.5618 nanometers.

FIG. 63 shows astigmatism of the ray of wavelength of 587.5618 nanometers. The horizontal axis of FIG. 63 represents a position in the optical axis direction of the focal point. The vertical axis of FIG. 63 represents image height. The solid line in FIG. 63 represents the graph of the sagittal plane, and the broken line in FIG. 63 represents the graph of the tangential plane.

Figure 64:
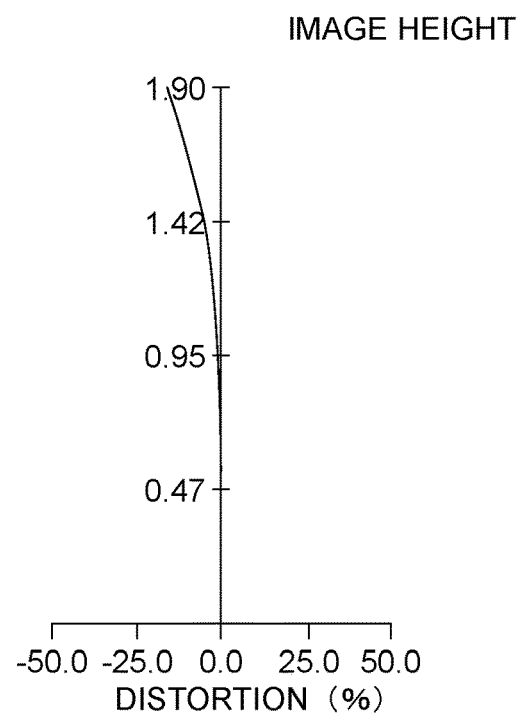
FIG. 64 shows distortion of the ray of wavelength of 587.5618 nanometers.

FIG. 64 shows distortion of the ray of wavelength of 587.5618 nanometers. The horizontal axis of FIG. 64 represents distortion expressed as a percent. The vertical axis of FIG. 64 represents image height.

Example 17

Figure 65:
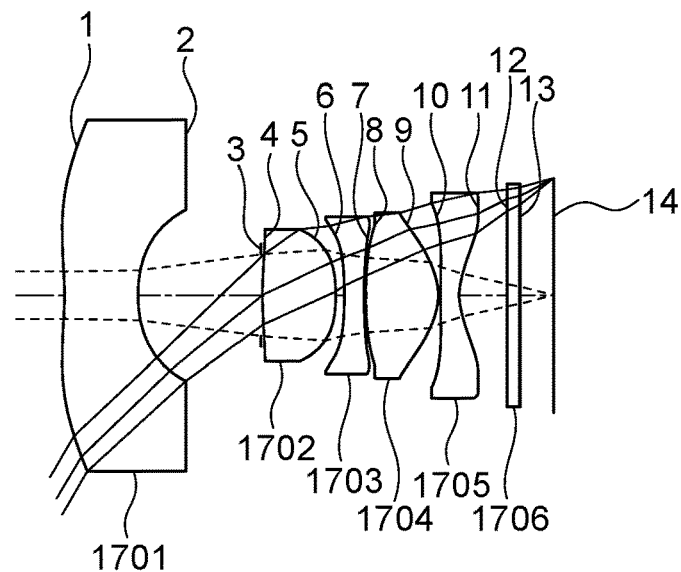
FIG. 65 shows a layout of an imaging optical system of Example 17.

FIG. 65 shows a layout of an imaging optical system of Example 17. The imaging optical system includes five lenses and an infrared cut filter arranged from the object side to the image side. The third lens 1703 is an aspheric lens in which radius of curvature of each of both surfaces is infinity in the paraxial region and which has a power in the peripheral area. The first lens 1701 is a biconcave lens. The second lens 1702 is a biconvex lens. The fourth lens 1704 is a biconvex lens. The fifth lens 1705 is a negative meniscus lens which is convex toward the object. The aperture stop 3 is located between the first lens 1701 and the second lens 1702.

Table 33 shows positions of the optical elements and properties and values of focal length of the lenses of the imaging optical system of Example 17. The focal length f of the whole imaging optical system is given by f=1.55. The F-number Fno is given by Fno=2. HFOV representing a half value of angle of view is given by HFOV=60 (degrees). In Table 33, each of the five lenses is represented respectively by lens 1 to lens 5 from the object side.

In the present example, the object distance from the object to the first lens is infinity.

TABLE 33

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | −5.8565 | 1.200 | Plastic | 1.545 | 56 | −3.262 |
| 2 | | 2.7363 | 2.007 | | | | |
| 3 | Ape. Stop | Plano | 0.034 | | | | |
| 4 | Lens 2 | 3.3238 | 1.199 | Plastic | 1.545 | 56 | 2.98 |
| 5 | | −2.7704 | 0.144 | | | | |
| 6 | Lens 3 | ∞ | 0.300 | Plastic | 1.645 | 23 | ∞ |
| 7 | | ∞ | 0.030 | | | | |
| 8 | Lens 4 | 8.3040 | 1.199 | Plastic | 1.545 | 56 | 1.394 |
| 9 | | −0.7939 | 0.030 | | | | |
| 10 | Lens 5 | 2.7871 | 0.300 | Plastic | 1.645 | 23 | −1.41 |
| 11 | | 0.6568 | 0.798 | | | | |
| 12 | IR cut filter | Plano | 0.500 | Glass | 1.517 | 64.2 | |
| 13 | | Plano | 0.550 | | | | |
| 14 | Image | Plano | | | | | |

Table 34 shows conic constants and aspheric coefficients of each surface of each lens of Example 17.

TABLE 34

| Surface | K | A4 | A6 | A8 | A10 | A12 | A14 |
|---|---|---|---|---|---|---|---|
| 1 | −90.0000 | 2.3683E−02 | −3.0230E−03 | 1.8374E−04 | 3.3049E−06 | −1.4415E−06 | 6.4576E−08 |
| 2 | 0.7353 | 1.0740E−01 | −1.7952E−02 | 1.1163E−02 | 1.5900E−03 | −2.5554E−03 | 1.6924E−04 |
| 4 | −2.0771 | −8.2513E−02 | −1.3276E−01 | 2.6825E−01 | −5.5734E−01 | 0.0000E+00 | 0.0000E+00 |
| 5 | 4.9311 | −3.0360E−01 | 1.0233E−01 | 4.3446E−02 | −5.0432E−02 | −6.0615E−05 | −1.1237E−04 |
| 6 | −90.0000 | −1.9078E−01 | −2.1202E−02 | 4.1238E−02 | 3.8322E−03 | −1.8074E−03 | 9.4190E−07 |
| 7 | −90.0000 | 1.5694E−01 | −6.9520E−02 | −2.0582E−02 | 5.5314E−03 | 9.5360E−04 | −3.8668E−05 |
| 8 | 30.4139 | 8.1516E−02 | −3.2995E−02 | −4.3439E−03 | −3.2801E−03 | 9.6842E−04 | −7.5342E−06 |
| 9 | −5.6422 | −1.0386E−01 | 2.0671E−02 | 4.1304E−03 | 4.0088E−03 | 1.0830E−04 | 6.7512E−06 |
| 10 | −90.0000 | −1.1233E−01 | 1.2200E−02 | 9.6852E−03 | 6.1476E−05 | −4.9425E−04 | −6.8847E−05 |
| 11 | −6.2476 | −7.0994E−02 | 2.2889E−02 | −6.4327E−03 | 5.2260E−04 | 3.1255E−04 | −8.5887E−05 |

Figure 66:
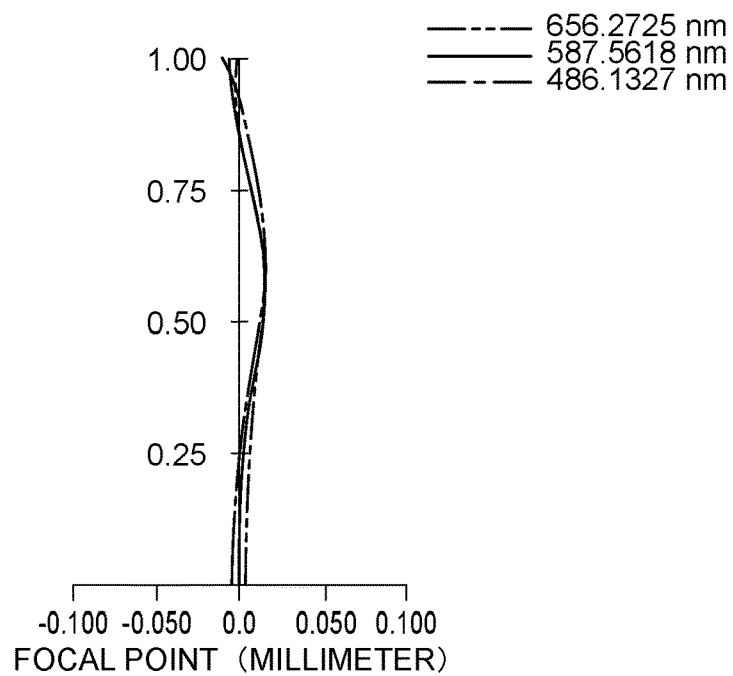
FIG. 66 shows spherical aberrations.

FIG. 66 shows spherical aberrations. The horizontal axis of FIG. 66 represents a position at which a ray that travels parallel to the optical axis and enters the imaging optical system intersects with the optical axis. The vertical axis of FIG. 66 represents distance of the above-described ray from the optical axis. The value of distance is normalized by the radius of the aperture. In other words, the value 1 on the vertical axis represents the radius of the aperture. In FIG. 66, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 67:
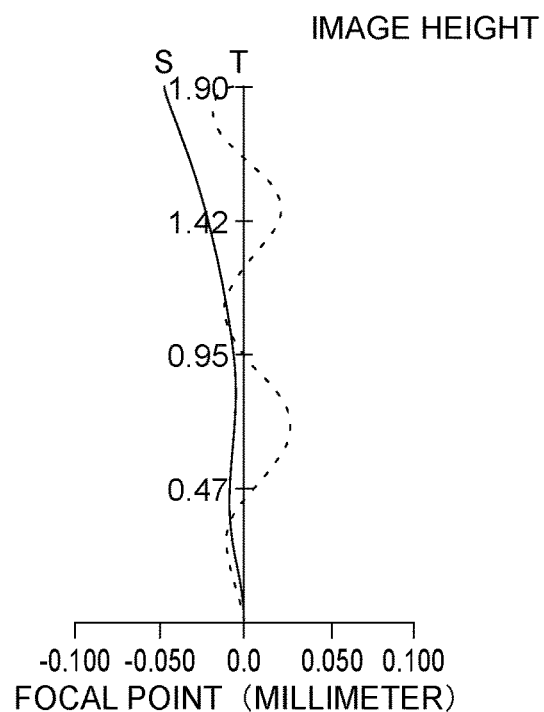
FIG. 67 shows astigmatism of the ray of wavelength of 587.5618 nanometers.

FIG. 67 shows astigmatism of the ray of wavelength of 587.5618 nanometers. The horizontal axis of FIG. 67 represents a position in the optical axis direction of the focal point. The vertical axis of FIG. 67 represents image height. The solid line in FIG. 67 represents the graph of the sagittal plane, and the broken line in FIG. 67 represents the graph of the tangential plane.

Figure 68:
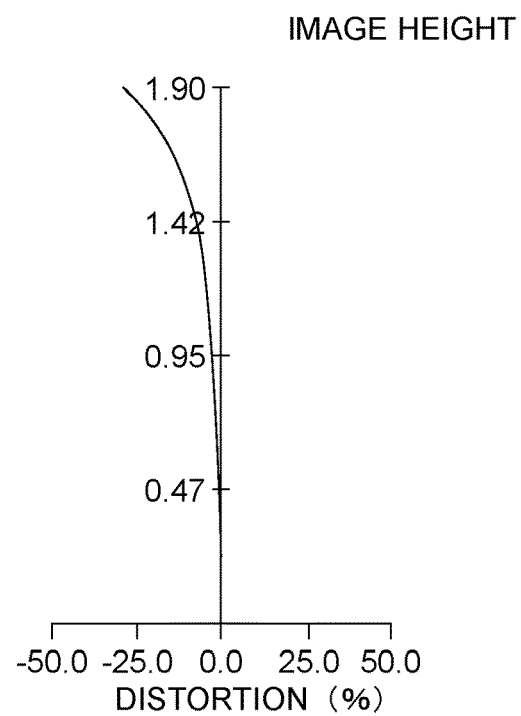
FIG. 68 shows distortion of the ray of wavelength of 587.5618 nanometers.

FIG. 68 shows distortion of the ray of wavelength of 587.5618 nanometers. The horizontal axis of FIG. 68 represents distortion expressed as a percent. The vertical axis of FIG. 68 represents image height.

Example 18

Figure 69:
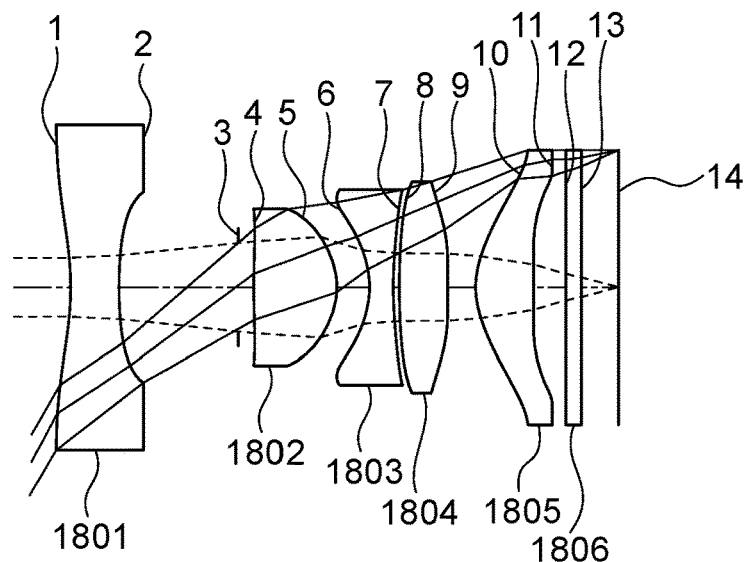
FIG. 69 shows a layout of an imaging optical system of Example 18.

FIG. 69 shows a layout of an imaging optical system of Example 18. The imaging optical system includes five lenses and an infrared cut filter arranged from the object side to the image side. The fourth lens 1804 is an aspheric lens in which radius of curvature of each of both surfaces is infinity in the paraxial region and which has a power in the peripheral area. The first lens 1801 is a biconcave lens. The second lens 1802 is a biconvex lens. The third lens 1803 is a biconcave lens. The fifth lens 1805 is a biconvex lens. The aperture stop 3 is located between the first lens 1801 and the second lens 1802.

Table 35 shows positions of the optical elements and properties and values of focal length of the lenses of the imaging optical system of Example 18. The focal length f of the whole imaging optical system is given by f=1.6. The F-number Fno is given by Fno=2. HFOV representing a half value of angle of view is given by HFOV=60 (degrees). In Table 35, each of the five lenses is represented respectively by lens 1 to lens 5 from the object side.

In the present example, the object distance from the object to the first lens is infinity.

TABLE 35

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | −3.4343 | 0.728 | Plastic | 1.535 | 56 | −4.07 |
| 2 | | 6.3883 | 1.736 | | | | |
| 3 | Ape. Stop | Plano | 0.208 | | | | |
| 4 | Lens 2 | 4.1069 | 1.200 | Plastic | 1.545 | 56 | 1.623 |
| 5 | | −1.0109 | 0.480 | | | | |
| 6 | Lens 3 | −1.2477 | 0.368 | Plastic | 1.645 | 23 | −1.72 |
| 7 | | 11.1777 | 0.095 | | | | |
| 8 | Lens 4 | ∞ | 0.710 | Plastic | 1.545 | 56 | ∞ |
| 9 | | ∞ | 0.404 | | | | |
| 10 | Lens 5 | 1.3400 | 0.870 | Plastic | 1.545 | 56 | 2.031 |
| 11 | | −4.9039 | 0.440 | | | | |
| 12 | IR cut filter | Plano | 0.500 | Glass | 1.517 | 64.2 | |
| 13 | | Plano | 0.550 | | | | |
| 14 | Image | Plano | | | | | |

Table 36 shows conic constants and aspheric coefficients of each surface of each lens of Example 18.

TABLE 36

| Surface | K | A4 | A6 | A8 | A10 | A12 | A14 |
|---|---|---|---|---|---|---|---|
| 1 | −17.7525 | 1.4434E−02 | −2.1495E−03 | 7.7962E−05 | 1.1888E−05 | 3.5467E−07 | −2.6371E−08 |
| 2 | 21.4802 | 5.5206E−02 | −2.4357E−02 | 1.4916E−02 | −5.4165E−03 | 5.7491E−04 | 3.8718E−05 |
| 4 | −10.3220 | −7.1398E−02 | −1.1019E−01 | 8.9830E−02 | −3.1480E−01 | 0.0000E+00 | 0.0000E+00 |
| 5 | −0.2643 | 1.3778E−01 | −6.4736E−02 | 1.5652E−02 | 9.4026E−03 | −6.1774E−03 | 2.4407E−09 |
| 6 | −3.8823 | −6.6208E−02 | −2.6227E−02 | 3.3856E−02 | 3.4150E−03 | 2.7071E−06 | 3.8275E−11 |
| 7 | 63.9863 | 4.4551E−02 | −1.5592E−02 | −5.3728E−03 | −6.6682E−04 | 1.8545E−04 | −1.5125E−07 |
| 8 | −90.0000 | 7.6908E−02 | −1.6373E−02 | −5.7571E−04 | −2.0825E−04 | 2.8320E−05 | −3.7056E−06 |
| 9 | −90.0000 | −1.6408E−01 | 3.5443E−02 | 8.0217E−03 | 8.4281E−04 | −5.4806E−04 | 1.9163E−06 |
| 10 | −2.4784 | 1.2719E−02 | −2.8348E−03 | −1.4803E−03 | −2.5329E−04 | 4.6567E−05 | 1.4336E−05 |
| 11 | −12.9810 | 1.4639E−01 | −2.9263E−02 | −1.4918E−03 | 1.6018E−04 | 3.4148E−05 | 5.3126E−06 |

Figure 70:
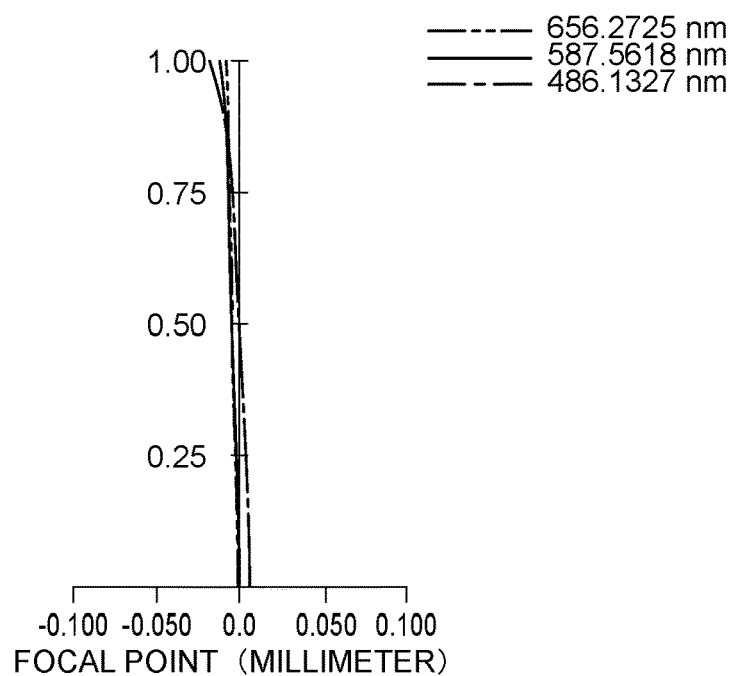
FIG. 70 shows spherical aberrations.

FIG. 70 shows spherical aberrations. The horizontal axis of FIG. 70 represents a position at which a ray that travels parallel to the optical axis and enters the imaging optical system intersects with the optical axis. The vertical axis of FIG. 70 represents distance of the above-described ray from the optical axis. The value of distance is normalized by the radius of the aperture. In other words, the value 1 on the vertical axis represents the radius of the aperture. In FIG. 70, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 71:
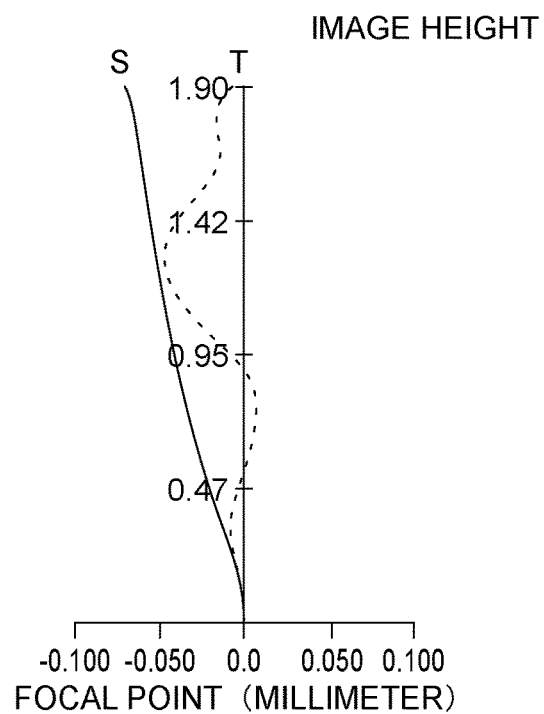
FIG. 71 shows astigmatism of the ray of wavelength of 587.5618 nanometers.

FIG. 71 shows astigmatism of the ray of wavelength of 587.5618 nanometers. The horizontal axis of FIG. 71 represents a position in the optical axis direction of the focal point. The vertical axis of FIG. 71 represents image height. The solid line in FIG. 71 represents the graph of the sagittal plane, and the broken line in FIG. 71 represents the graph of the tangential plane.

Figure 72:
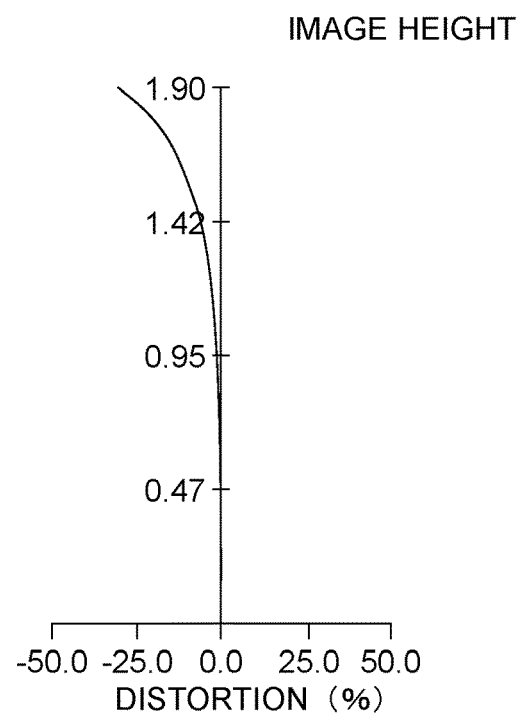
FIG. 72 shows distortion of the ray of wavelength of 587.5618 nanometers.

FIG. 72 shows distortion of the ray of wavelength of 587.5618 nanometers. The horizontal axis of FIG. 72 represents distortion expressed as a percent. The vertical axis of FIG. 72 represents image height.

Example 19

Figure 73:
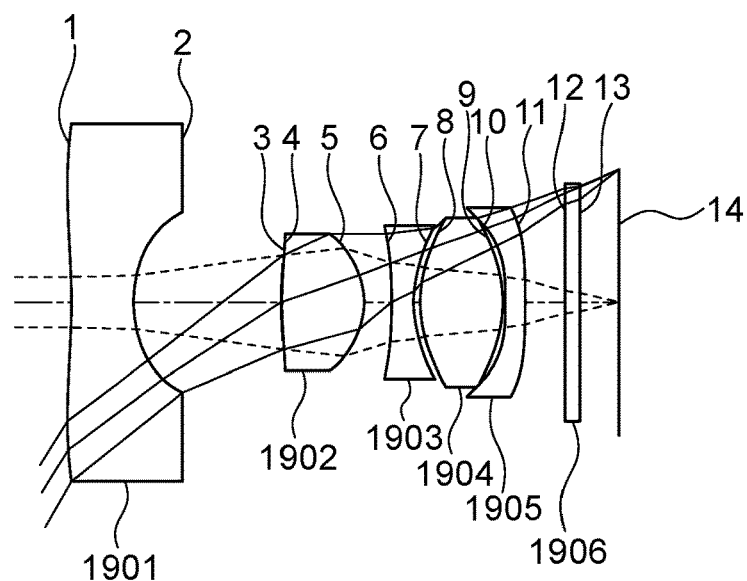
FIG. 73 shows a layout of an imaging optical system of Example 19.

FIG. 73 shows a layout of an imaging optical system of Example 19. The imaging optical system includes five lenses and an infrared cut filter arranged from the object side to the image side. The fifth lens 1905 is an aspheric lens in which radius of curvature of each of both surfaces is infinity in the paraxial region and which has a power in the peripheral area. The first lens 1901 is a biconcave lens. The second lens 1902 is a biconvex lens. The third lens 1903 is a biconcave lens. The fourth lens 1904 is a biconvex lens. The aperture stop 3 is located closer to the object than the object-side surface of the second lens 1902.

Table 37 shows positions of the optical elements and properties and values of focal length of the lenses of the imaging optical system of Example 19. The focal length f of the whole imaging optical system is given by f=1.4. The F-number Fno is given by Fno=2. HFOV representing a half value of angle of view is given by HFOV=60 (degrees). In Table 37, each of the five lenses is represented respectively by lens 1 to lens 5 from the object side.

In the present example, the object distance from the object to the first lens is infinity.

TABLE 37

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | −7.3838 | 0.930 | Plastic | 1.545 | 56 | −2.557 |
| 2 | | 1.7941 | 2.194 | | | | |
| 3 | Ape. Stop | Plano | −0.027 | | | | |
| 4 | Lens 2 | 3.2782 | 1.200 | Plastic | 1.545 | 56 | 1.589 |
| 5 | | −1.0249 | 0.416 | | | | |
| 6 | Lens 3 | −6.3174 | 0.300 | Plastic | 1.645 | 23 | −1.43 |
| 7 | | 1.1001 | 0.109 | | | | |
| 8 | Lens 4 | 1.6435 | 1.200 | Plastic | 1.545 | 56 | 1.933 |
| 9 | | −2.1794 | 0.030 | | | | |
| 10 | Lens 5 | ∞ | 0.300 | Plastic | 1.645 | 23 | ∞ |
| 11 | | ∞ | 0.588 | | | | |
| 12 | IR cut filter | Plano | 0.500 | Glass | 1.517 | 64.2 | |
| 13 | | Plano | 0.550 | | | | |
| 14 | Image | Plano | | | | | |

Table 38 shows conic constants and aspheric coefficients of each surface of each lens of Example 19.

TABLE 38

| Surface | K | A4 | A6 | A8 | A10 | A12 | A14 |
|---|---|---|---|---|---|---|---|
| 1 | −90.0000 | −1.0207E−02 | 9.5231E−04 | 2.5930E−05 | −3.5208E−06 | −5.2298E−07 | 4.5176E−08 |
| 2 | −0.6839 | −2.2244E−02 | −1.8222E−02 | −1.7697E−03 | −3.3030E−04 | −3.6308E−06 | −1.1747E−06 |
| 4 | 0.1452 | 3.1763E−02 | 8.8548E−03 | −1.0762E−03 | −2.1196E−04 | −1.1015E−13 | 6.9690E−16 |
| 5 | 90.0000 | 5.8873E−02 | 4.1834E−02 | −1.0676E−02 | 2.4312E−02 | 4.4638E−10 | −1.0169E−11 |
| 6 | −1.5562 | 3.0436E−02 | 1.2059E−02 | −1.2073E−01 | −6.2694E−03 | 0.0000E+00 | 0.0000E+00 |
| 7 | −5.4943 | −1.4743E−01 | −5.9764E−02 | 5.1021E−02 | −2.9446E−02 | 2.2860E−14 | 1.1757E−15 |
| 8 | −4.6226 | 3.5341E−02 | −6.0148E−02 | −3.2539E−02 | 9.0784E−02 | 1.8405E−14 | 7.8387E−16 |
| 9 | −7.4724 | 1.4767E−01 | 2.3129E−02 | −1.2485E−02 | 7.1190E−02 | −5.6997E−12 | 1.1303E−15 |
| 10 | −90.0000 | 4.8492E−02 | −5.3535E−02 | 1.8189E−02 | 4.2188E−03 | −2.0268E−03 | −2.4637E−08 |
| 11 | −90.0000 | 2.4289E−02 | −1.0504E−02 | −3.8614E−03 | 8.8037E−04 | −1.1644E−05 | 8.3137E−08 |

Figure 74:
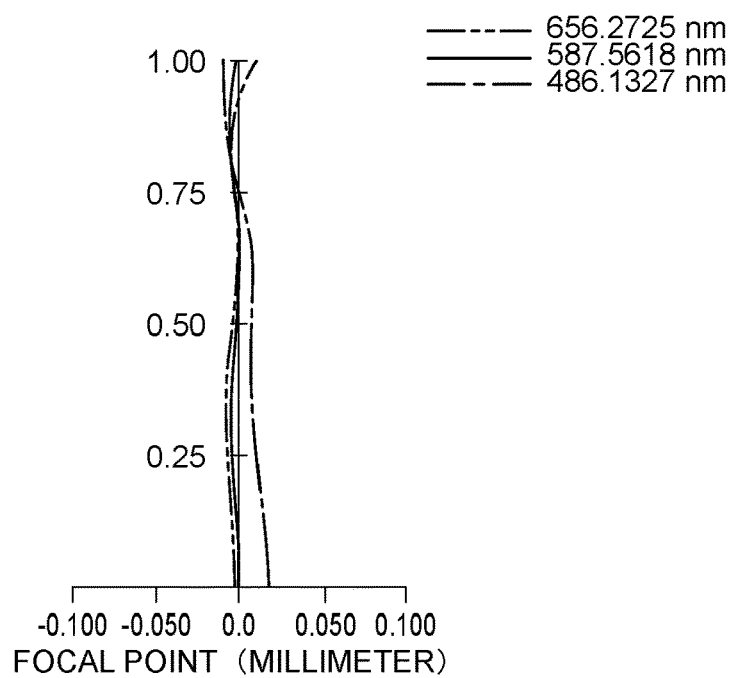
FIG. 74 shows spherical aberrations.

FIG. 74 shows spherical aberrations. The horizontal axis of FIG. 74 represents a position at which a ray that travels parallel to the optical axis and enters the imaging optical system intersects with the optical axis. The vertical axis of FIG. 74 represents distance of the above-described ray from the optical axis. The value of distance is normalized by the radius of the aperture. In other words, the value 1 on the vertical axis represents the radius of the aperture. In FIG. 74, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 75:
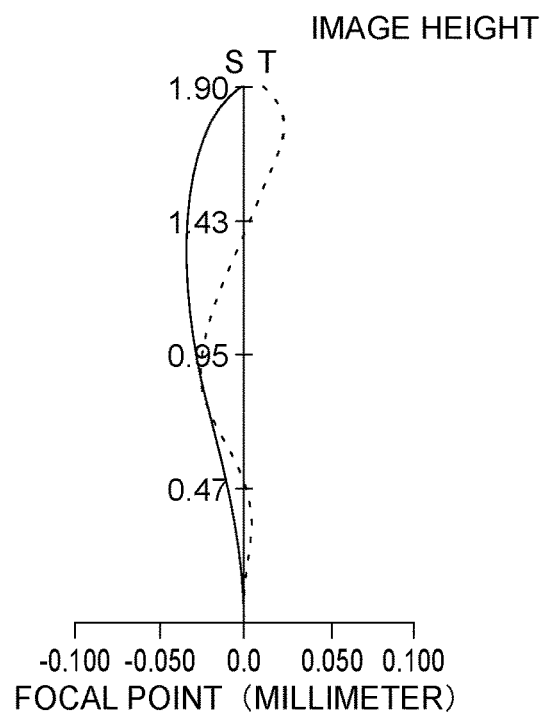
FIG. 75 shows astigmatism of the ray of wavelength of 587.5618 nanometers.

FIG. 75 shows astigmatism of the ray of wavelength of 587.5618 nanometers. The horizontal axis of FIG. 75 represents a position in the optical axis direction of the focal point. The vertical axis of FIG. 75 represents image height. The solid line in FIG. 75 represents the graph of the sagittal plane, and the broken line in FIG. 75 represents the graph of the tangential plane.

Figure 76:
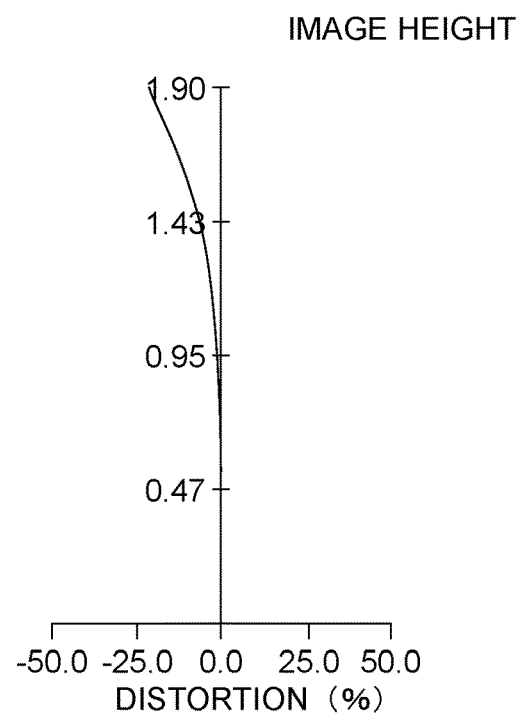
FIG. 76 shows distortion of the ray of wavelength of 587.5618 nanometers.

FIG. 76 shows distortion of the ray of wavelength of 587.5618 nanometers. The horizontal axis of FIG. 76 represents distortion expressed as a percent. The vertical axis of FIG. 76 represents image height.

Example 20

Figure 77:
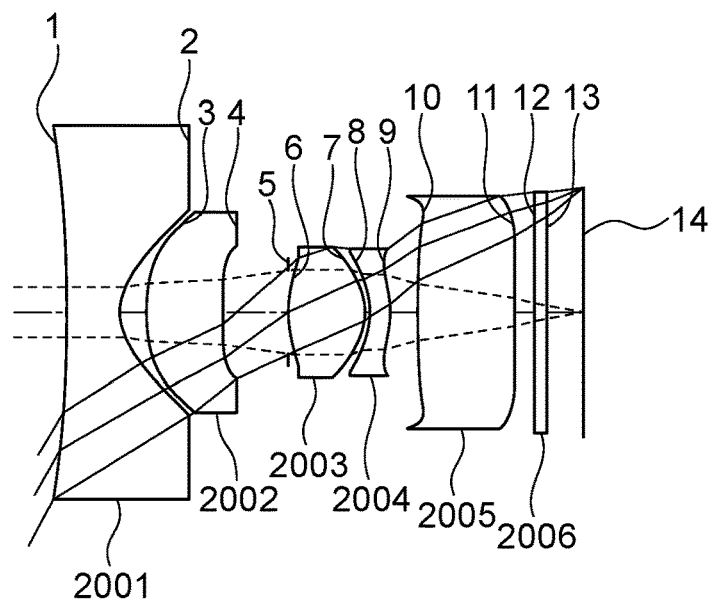
FIG. 77 shows a layout of an imaging optical system of Example 20.

FIG. 77 shows a layout of an imaging optical system of Example 20. The imaging optical system includes five lenses and an infrared cut filter arranged from the object side to the image side. The fifth lens 2005 is an aspheric lens in which radius of curvature of each of both surfaces is infinity in the paraxial region and which has a power in the peripheral area. The first lens 2001 is a negative meniscus lens which is convex toward the object. The second lens 2002 is a positive meniscus lens which is convex toward the object. The third lens 2003 is a biconvex lens. The fourth lens 2004 is a negative meniscus lens which is convex toward the image. The aperture stop 5 is located between the second lens 2002 and the third lens 2003.

Table 39 shows positions of the optical elements and properties and values of focal length of the lenses of the imaging optical system of Example 20. The focal length f of the whole imaging optical system is given by f=1.69. The F-number Fno is given by Fno=2. HFOV representing a half value of angle of view is given by HFOV=60 (degrees). In Table 39, each of the five lenses is represented respectively by lens 1 to lens 5 from the object side.

In the present example, the object distance from the object to the first lens is infinity.

TABLE 39

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 90.0000 | 0.831 | Plastic | 1.545 | 56 | −1.939 |
| 2 | | 1.0413 | 0.398 | | | | |
| 3 | Lens 2 | 2.6261 | 1.199 | Plastic | 1.645 | 23 | 5.167 |
| 4 | | 10.1709 | 0.980 | | | | |
| 5 | Ape. Stop | Plano | 0.027 | | | | |
| 6 | Lens 3 | 1.7537 | 1.173 | Plastic | 1.545 | 56 | 1.356 |
| 7 | | −0.9761 | 0.105 | | | | |
| 8 | Lens 4 | −0.7664 | 0.300 | Plastic | 1.645 | 23 | −3.812 |
| 9 | | −1.2844 | 0.426 | | | | |
| 10 | Lens 5 | ∞ | 1.500 | Plastic | 1.535 | 56 | ∞ |
| 11 | | ∞ | 0.300 | | | | |
| 12 | IR cut filter | Plano | 0.500 | Glass | 1.517 | 64.2 | |
| 13 | | Plano | 0.550 | | | | |
| 14 | Image | Plano | | | | | |

Table 40 shows conic constants and aspheric coefficients of each surface of each lens of Example 20.

TABLE 40

| Surface | K | A4 | A6 | A8 | A10 | A12 | A14 |
|---|---|---|---|---|---|---|---|
| 1 | −90.0000 | 1.4022E−02 | −2.1589E−03 | 1.6078E−04 | −3.3578E−05 | 6.7209E−06 | −4.0845E−07 |
| 2 | −0.0777 | 5.0991E−02 | −3.4859E−02 | 3.7447E−02 | −1.5635E−03 | −1.7443E−02 | 6.6831E−03 |
| 4 | −10.5504 | −6.4805E−02 | −1.5919E−01 | 2.9595E−01 | −5.6178E−01 | 0.0000E+00 | 0.0000E+00 |
| 5 | −0.1480 | 2.0895E−01 | −1.7379E−01 | 1.3421E−01 | −3.2192E−02 | 7.2923E−07 | 2.2239E−07 |
| 6 | 33.3000 | −3.2874E−02 | 4.4554E−02 | −2.7515E−02 | 2.2700E−02 | 7.1933E−09 | −3.2419E−09 |
| 7 | −6.8625 | 1.4625E−02 | 2.5747E−05 | 6.4245E−04 | −2.8271E−03 | 1.3692E−04 | 2.7418E−09 |
| 8 | −11.1891 | 6.6853E−02 | 4.6226E−04 | −5.9200E−03 | 3.5794E−03 | 2.2220E−04 | −1.2089E−04 |
| 9 | −5.2796 | −1.3659E−01 | 4.0990E−02 | 1.3003E−02 | 1.4618E−02 | −6.4134E−03 | −4.0579E−05 |
| 10 | −90.0000 | −1.8409E−01 | −1.9550E−02 | −2.9351E−02 | 5.9433E−03 | 2.0842E−02 | −5.6960E−03 |
| 11 | −90.0000 | −2.4665E−02 | −4.6170E−02 | 1.2322E−02 | 2.2999E−03 | −5.3992E−04 | 2.2546E−04 |

Figure 78:
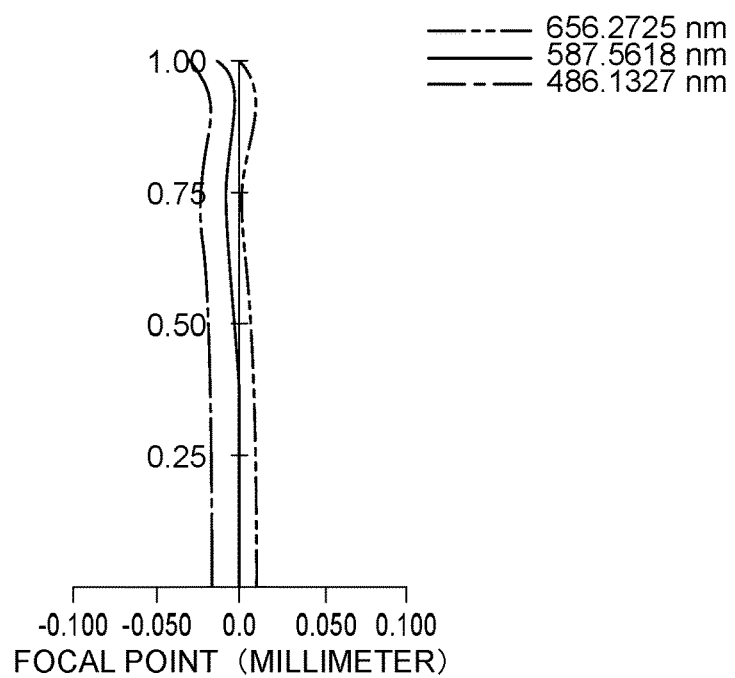
FIG. 78 shows spherical aberrations.

FIG. 78 shows spherical aberrations. The horizontal axis of FIG. 78 represents a position at which a ray that travels parallel to the optical axis and enters the imaging optical system intersects with the optical axis. The vertical axis of FIG. 78 represents distance of the above-described ray from the optical axis. The value of distance is normalized by the radius of the aperture. In other words, the value 1 on the vertical axis represents the radius of the aperture. In FIG. 78, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 79:
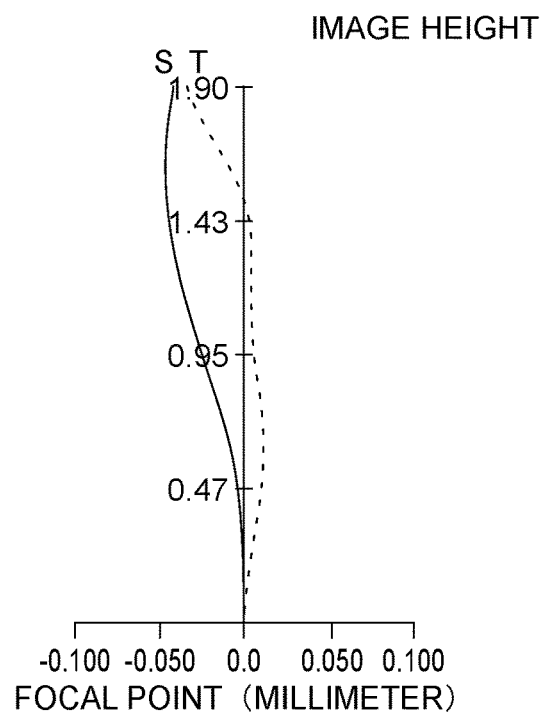
FIG. 79 shows astigmatism of the ray of wavelength of 587.5618 nanometers.

FIG. 79 shows astigmatism of the ray of wavelength of 587.5618 nanometers. The horizontal axis of FIG. 79 represents a position in the optical axis direction of the focal point. The vertical axis of FIG. 79 represents image height. The solid line in FIG. 79 represents the graph of the sagittal plane, and the broken line in FIG. 79 represents the graph of the tangential plane.

Figure 80:
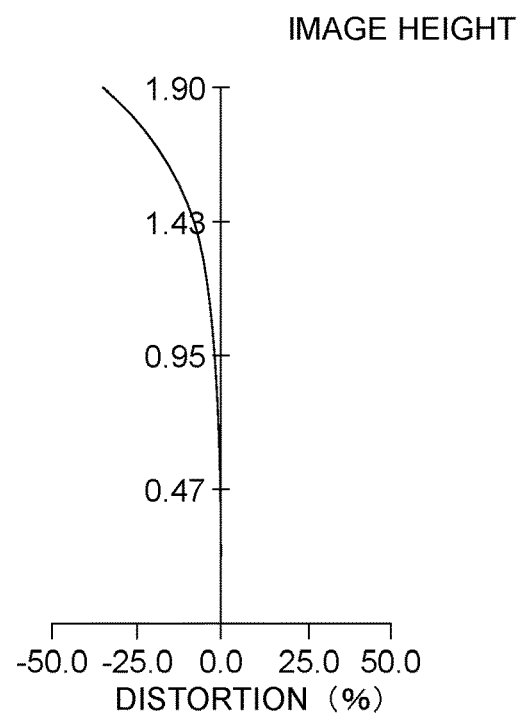
FIG. 80 shows distortion of the ray of wavelength of 587.5618 nanometers.

FIG. 80 shows distortion of the ray of wavelength of 587.5618 nanometers. The horizontal axis of FIG. 80 represents distortion expressed as a percent. The vertical axis of FIG. 80 represents image height.

Example 21

Figure 81:
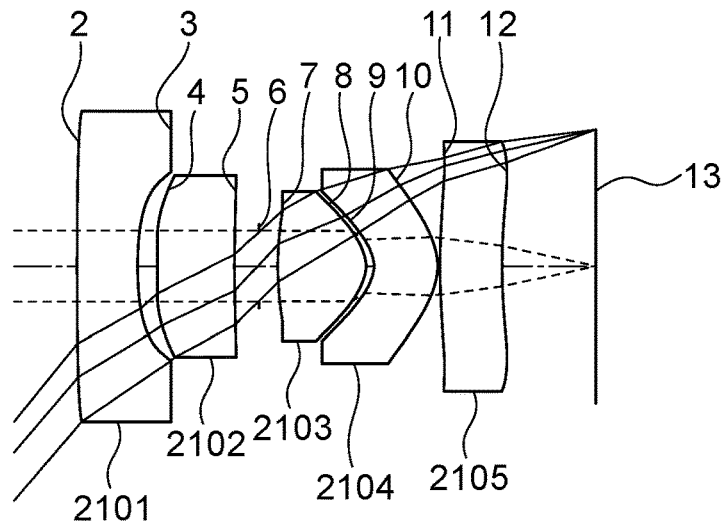
FIG. 81 shows a layout of an imaging optical system of Example 21.

FIG. 81 shows a layout of an imaging optical system of Example 21. The imaging optical system includes five lenses arranged from the object side to the image side. Each of the first lens 2101, the second lens 2102 and the fifth lens 2105 is an aspheric lens in which radius of curvature of each of both surfaces is infinity in the paraxial region and which has a power in the peripheral area. The third lens 2103 is a biconvex lens. The fourth lens 2104 is a negative meniscus lens which is convex toward the image. The aperture stop 6 is located between the second lens 2102 and the third lens 2103.

Table 41 shows positions of the optical elements and properties and values of focal length of the lenses of the imaging optical system of Example 21. The focal length f of the whole imaging optical system is given by f=0.264. The F-number Fno is given by Fno=2.51. HFOV representing a half value of angle of view is given by HFOV=50 (degrees). In Table 41, each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 41

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.100 | Plastic | 1.5311 | 55.634 | ∞ |
| 3 | | ∞ | 0.029 | | | | |
| 4 | Lens 2 | ∞ | 0.124 | Plastic | 1.6611 | 20.345 | ∞ |
| 5 | | ∞ | 0.038 | | | | |
| 6 | Ape. Stop | Plano | 0.030 | | | | |
| 7 | Lens 3 | 0.34242 | 0.142 | Plastic | 1.5311 | 55.634 | 0.102 |
| 8 | | −0.05508 | 0.013 | | | | |
| 9 | Lens 4 | −0.04764 | 0.100 | Plastic | 1.6611 | 20.345 | −0.258 |
| 10 | | −0.12134 | 0.005 | | | | |
| 11 | Lens 5 | ∞ | 0.100 | Plastic | 1.6349 | 23.945 | ∞ |
| 12 | | ∞ | 0.150 | | | | |
| 13 | Image | Plano | 0.000 | | | | |

Table 42 shows conic constants and aspheric coefficients of each surface of each lens of Example 21.

TABLE 42

| Surface | K | A4 | A6 | A8 | A10 | A12 | A14 |
|---|---|---|---|---|---|---|---|
| 2 | 90.0000 | −2.22576E+00 | 6.23522E+01 | 1.53085E+02 | 8.89580E+02 | −8.35882E+03 | −5.91756E+05 |
| 3 | 90.0000 | 1.15995E+02 | −8.46068E+02 | 4.09923E+03 | 9.87895E+04 | −3.67235E+06 | −3.88181E+08 |
| 4 | −74.0000 | 1.16721E+02 | −2.17027E+03 | −7.23916E+03 | −1.25135E+05 | 2.81108E+06 | 2.88505E+08 |
| 5 | 41.0000 | 5.62622E+01 | −3.60024E+03 | 8.07693E+04 | 6.47018E+05 | −5.68949E+08 | 4.93227E+10 |
| 7 | −20.0000 | 2.81690E+01 | −4.39719E+03 | −3.15856E+05 | −6.54472E+06 | 1.84291E+09 | 9.37370E+10 |
| 8 | −1.9876 | 4.49814E+01 | −5.68453E+03 | −6.28784E+04 | −2.81565E+06 | 6.71141E+07 | 3.53324E+10 |
| 9 | −1.7135 | −2.43292E+01 | 2.15889E+03 | 9.12372E+04 | 6.76144E+06 | 1.85898E+08 | −2.34746E+10 |
| 10 | −0.9925 | 3.06889E+00 | 1.63863E+03 | −1.31779E+03 | −3.29863E+05 | −7.15018E+06 | 5.01160E+08 |
| 11 | 90.0000 | 4.43392E+01 | −1.04854E+03 | −3.75104E+02 | 5.62925E+04 | 1.40463E+05 | −2.69067E+08 |
| 12 | 90.0000 | 4.72473E+01 | −1.43463E+03 | −3.96014E+03 | 2.42354E+05 | 3.79666E+06 | −8.96607E+07 |

Figure 82:
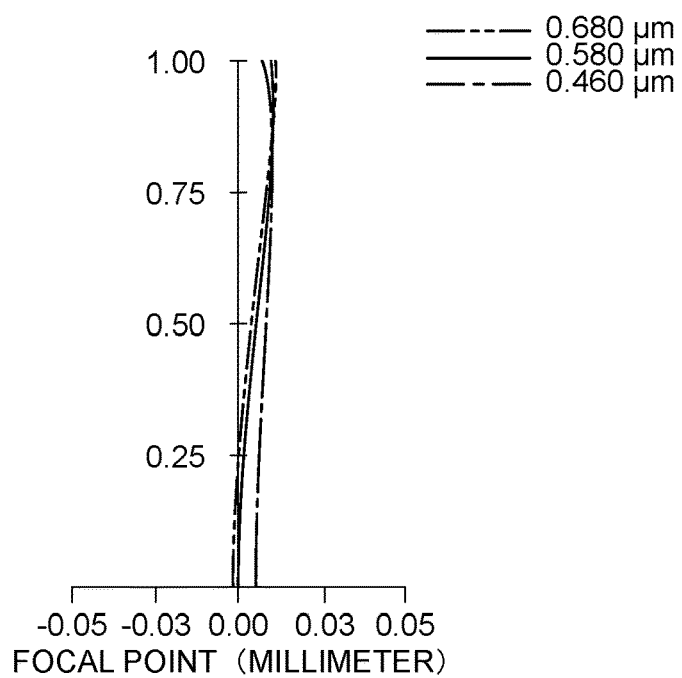
FIG. 82 shows spherical aberrations.

FIG. 82 shows spherical aberrations. The horizontal axis of FIG. 82 represents a position at which a ray that travels parallel to the optical axis and enters the imaging optical system intersects with the optical axis. The vertical axis of FIG. 82 represents distance of the above-described ray from the optical axis. The value of distance is normalized by the radius of the aperture. In other words, the value 1 on the vertical axis represents the radius of the aperture. In FIG. 82, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 83:
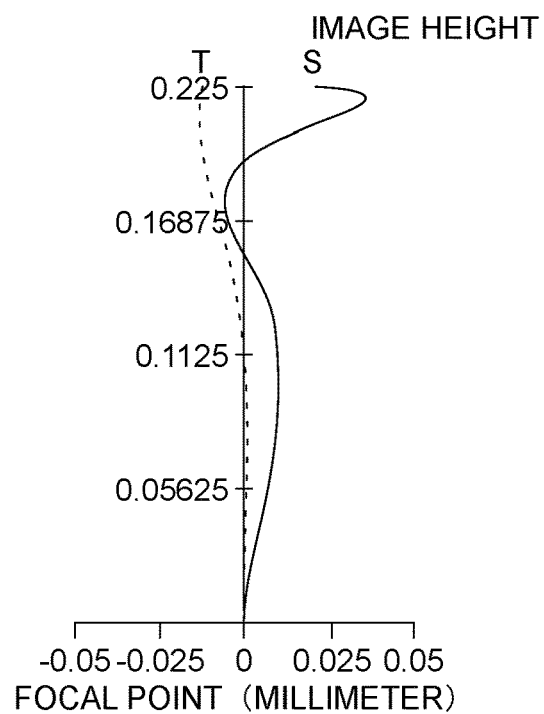
FIG. 83 shows astigmatism of the ray of wavelength of 0.580 micrometers.

FIG. 83 shows astigmatism of the ray of wavelength of 0.580 micrometers. The horizontal axis of FIG. 83 represents a position in the optical axis direction of the focal point. The vertical axis of FIG. 83 represents image height. The solid line in FIG. 83 represents the graph of the sagittal plane, and the broken line in FIG. 83 represents the graph of the tangential plane.

Figure 84:
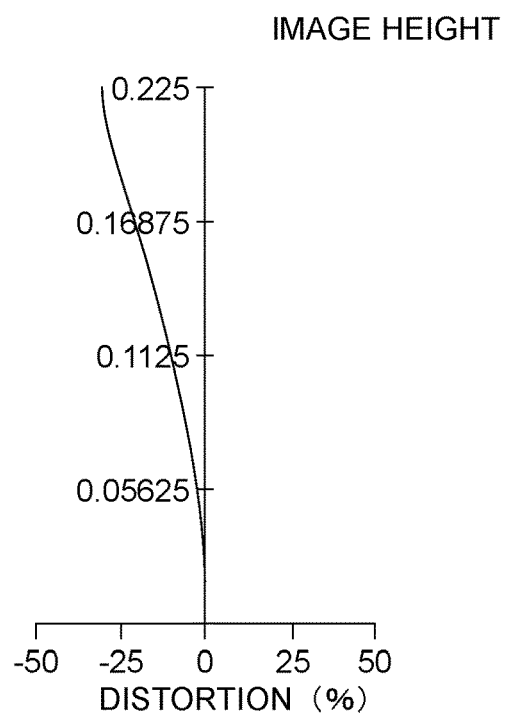
FIG. 84 shows distortion of the ray of wavelength of 0.580 micrometers.

FIG. 84 shows distortion of the ray of wavelength of 0.580 micrometers. The horizontal axis of FIG. 84 represents distortion expressed as a percent. The vertical axis of FIG. 84 represents image height.

Example 22

Figure 85:
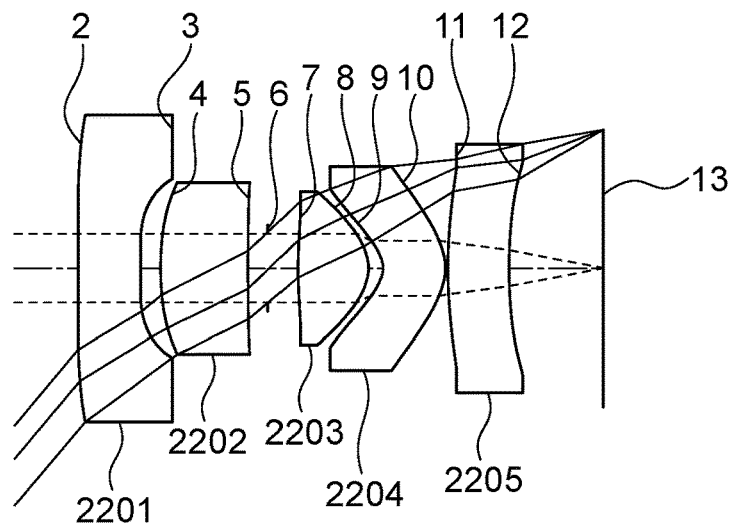
FIG. 85 shows a layout of an imaging optical system of Example 22.

FIG. 85 shows a layout of an imaging optical system of Example 22. The imaging optical system includes five lenses arranged from the object side to the image side. Each of the first lens 2201, the second lens 2202 and the fifth lens 2205 is an aspheric lens in which radius of curvature of each of both surfaces is infinity in the paraxial region and which has a power in the peripheral area. The third lens 2203 is a biconvex lens. The fourth lens 2204 is a negative meniscus lens which is convex toward the image. The aperture stop 6 is located between the second lens 2202 and the third lens 2203.

Table 43 shows positions of the optical elements and properties and values of focal length of the lenses of the imaging optical system of Example 22. The focal length f of the whole imaging optical system is given by f=0.274. The F-number Fno is given by Fno=2.492. HFOV representing a half value of angle of view is given by HFOV=50 (degrees). In Table 43, each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 43

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.100 | Plastic | 1.5311 | 55.634 | ∞ |
| 3 | | ∞ | 0.034 | | | | |
| 4 | Lens 2 | ∞ | 0.139 | Plastic | 1.6611 | 20.345 | ∞ |
| 5 | | ∞ | 0.032 | | | | |
| 6 | Ape. Stop | Plano | 0.047 | | | | |
| 7 | Lens 3 | 0.34976 | 0.115 | Plastic | 1.5311 | 55.634 | 0.119 |
| 8 | | −0.06848 | 0.022 | | | | |
| 9 | Lens 4 | −0.05359 | 0.100 | Plastic | 1.6611 | 20.345 | −0.351 |
| 10 | | −0.12143 | 0.005 | | | | |
| 11 | Lens 5 | ∞ | 0.100 | Plastic | 1.6349 | 23.945 | ∞ |
| 12 | | ∞ | 0.150 | | | | |
| 13 | Image | Plano | 0.000 | | | | |

Table 44 shows conic constants and aspheric coefficients of each surface of each lens of Example 22.

TABLE 44

| Surface | K | A4 | A6 | A8 | A10 | A12 | A14 |
|---|---|---|---|---|---|---|---|
| 2 | 90.0000 | −9.94989E−01 | 5.89691E+01 | 1.01478E+02 | 4.25077E+02 | −9.02010E+03 | −4.33808E+05 |
| 3 | 90.0000 | 1.13049E+02 | 3.32982E+01 | 9.19805E+02 | 1.19988E+05 | −3.81374E+06 | −4.61293E+08 |
| 4 | −74.0000 | 1.19971E+02 | −2.43506E+03 | −1.09873E+04 | −1.74088E+05 | 4.62907E+06 | 6.01070E+08 |
| 5 | 41.0000 | 6.65036E+01 | −4.91397E+03 | −4.69611E+04 | 2.81649E+06 | 8.56024E+08 | 2.25028E+11 |
| 7 | −20.0000 | 2.46110E+01 | −4.07461E+03 | −3.27892E+05 | −9.95296E+06 | 1.51382E+09 | 3.12358E+10 |
| 8 | −1.9876 | 4.17064E+01 | −6.08499E+03 | −7.03565E+04 | −2.86170E+06 | 2.83848E+07 | 2.45611E+10 |
| 9 | −1.7135 | −2.52905E+01 | 2.20873E+03 | 9.42261E+04 | 6.89039E+06 | 1.71583E+08 | −2.66182E+10 |
| 10 | −0.9925 | 6.88180E+00 | 1.64012E+03 | −9.60759E+02 | −3.48523E+05 | −1.10789E+07 | 1.23385E+08 |
| 11 | 90.0000 | 4.76782E+01 | −7.13490E+02 | −5.69256E+03 | −4.52837E+04 | 1.59139E+06 | −1.28067E+08 |
| 12 | 90.0000 | 6.69547E+01 | −1.73837E+03 | −1.58527E+02 | 3.28859E+05 | 3.75890E+06 | −1.40394E+08 |

Figure 86:
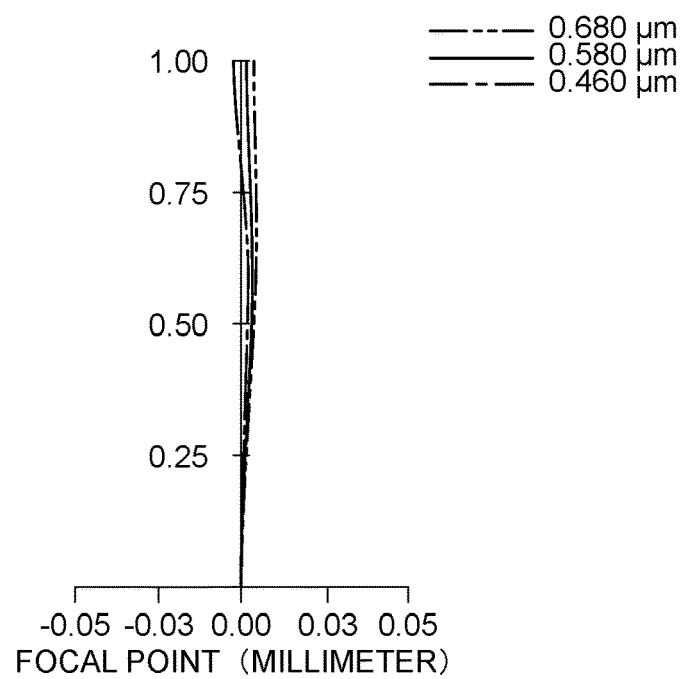
FIG. 86 shows spherical aberrations.

FIG. 86 shows spherical aberrations. The horizontal axis of FIG. 86 represents a position at which a ray that travels parallel to the optical axis and enters the imaging optical system intersects with the optical axis. The vertical axis of FIG. 86 represents distance of the above-described ray from the optical axis. The value of distance is normalized by the radius of the aperture. In other words, the value 1 on the vertical axis represents the radius of the aperture. In FIG. 86, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 87:
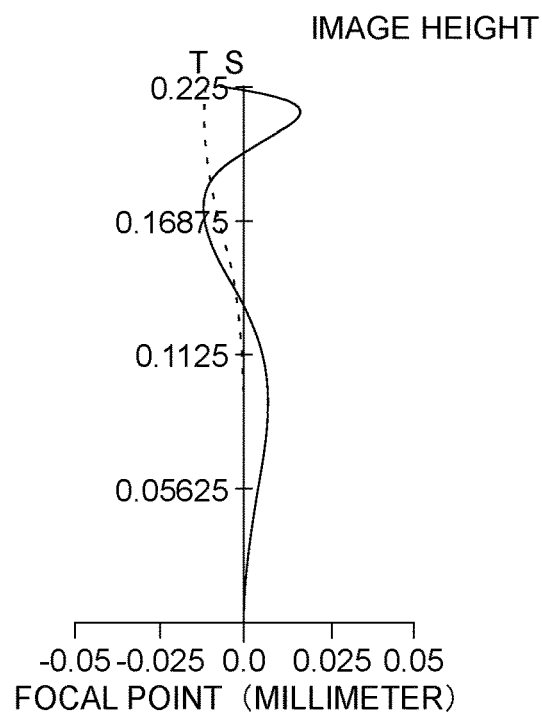
FIG. 87 shows astigmatism of the ray of wavelength of 0.580 micrometers.

FIG. 87 shows astigmatism of the ray of wavelength of 0.580 micrometers. The horizontal axis of FIG. 87 represents a position in the optical axis direction of the focal point. The vertical axis of FIG. 87 represents image height. The solid line in FIG. 87 represents the graph of the sagittal plane, and the broken line in FIG. 87 represents the graph of the tangential plane.

Figure 88:
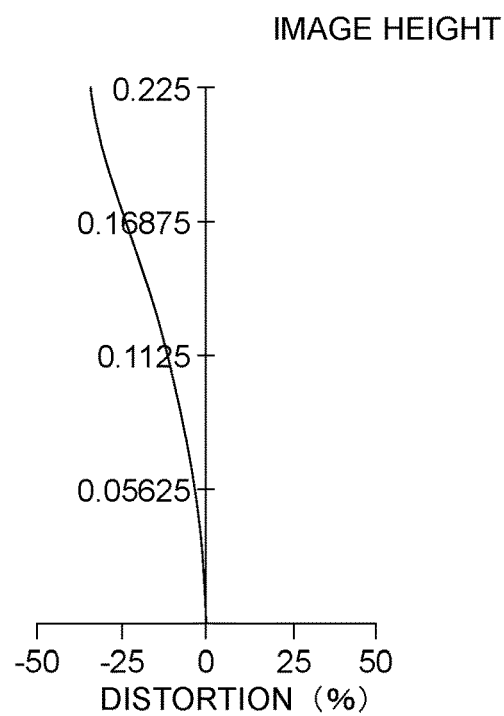
FIG. 88 shows distortion of the ray of wavelength of 0.580 micrometers.

FIG. 88 shows distortion of the ray of wavelength of 0.580 micrometers. The horizontal axis of FIG. 88 represents distortion expressed as a percent. The vertical axis of FIG. 88 represents image height.

Example 23

Figure 89:
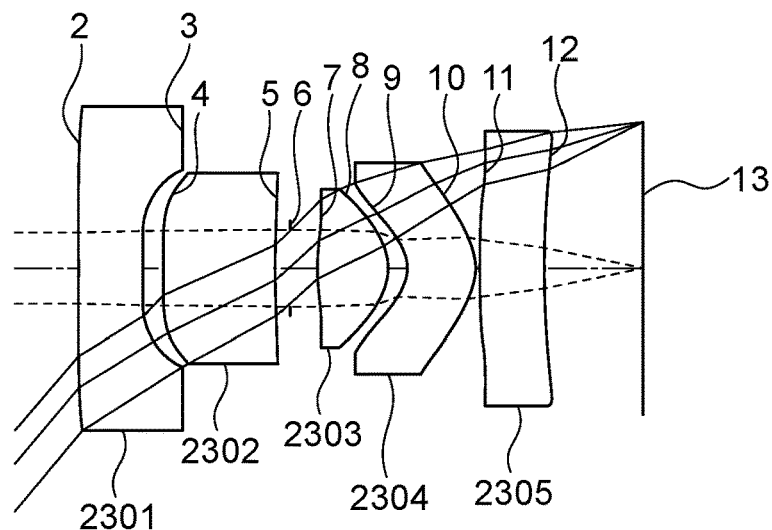
FIG. 89 shows a layout of an imaging optical system of Example 23.

FIG. 89 shows a layout of an imaging optical system of Example 23. The imaging optical system includes five lenses arranged from the object side to the image side. Each of the first lens 2301, the second lens 2302 and the fifth lens 2305 is an aspheric lens in which radius of curvature of each of both surfaces is infinity in the paraxial region and which has a power in the peripheral area. The third lens 2303 is a biconvex lens. The fourth lens 2304 is a negative meniscus lens which is convex toward the image. The aperture stop 6 is located between the second lens 2302 and the third lens 2303.

Table 45 shows positions of the optical elements and properties and values of focal length of the lenses of the imaging optical system of Example 23. The focal length f of the whole imaging optical system is given by f=0.278. The F-number Fno is given by Fno=2.458. HFOV representing a half value of angle of view is given by HFOV=50 (degrees). In Table 45 each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 45

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.100 | Plastic | 1.5311 | 55.634 | ∞ |
| 3 | | ∞ | 0.032 | | | | |
| 4 | Lens 2 | ∞ | 0.172 | Plastic | 1.6611 | 20.345 | ∞ |
| 5 | | ∞ | 0.022 | | | | |
| 6 | Ape. Stop | Plano | 0.043 | | | | |
| 7 | Lens 3 | 0.41199 | 0.108 | Plastic | 1.5311 | 55.634 | 0.135 |
| 8 | | −0.07936 | 0.028 | | | | |
| 9 | Lens 4 | −0.05864 | 0.105 | Plastic | 1.6611 | 20.345 | −0.600 |
| 10 | | −0.11796 | 0.008 | | | | |
| 11 | Lens 5 | ∞ | 0.100 | Plastic | 1.6349 | 23.945 | ∞ |
| 12 | | ∞ | 0.150 | | | | |
| 13 | Image | Plano | 0.000 | | | | |

Table 46 shows conic constants and aspheric coefficients of each surface of each lens of Example 23.

TABLE 46

| Surface | K | A4 | A6 | A8 | A10 | A12 | A14 |
|---|---|---|---|---|---|---|---|
| 2 | 90.0000 | −9.70170E−01 | 3.86860E+01 | 9.74997E+01 | 3.59273E+02 | −1.01841E+04 | −4.70317E+05 |
| 3 | 90.0000 | 8.75567E+01 | 1.49643E+03 | −3.60693E+03 | −4.88479E+03 | −5.70712E+06 | −5.40166E+08 |
| 4 | −74.0000 | 1.01305E+02 | −9.60315E+02 | −1.23580E+04 | −1.75144E+05 | 6.42017E+06 | 7.12585E+08 |
| 5 | 41.0000 | 7.70464E+01 | −6.49073E+03 | −1.14975E+05 | 5.28758E+07 | 8.83493E+09 | −4.04033E+11 |
| 7 | −20.0000 | 2.81446E+01 | −3.56635E+03 | −3.02628E+05 | −8.82061E+06 | 1.54402E+09 | 1.30138E+10 |
| 8 | −1.9876 | 3.96451E+01 | −6.03641E+03 | −4.91808E+04 | −1.21510E+06 | 6.44120E+07 | 1.52226E+10 |
| 9 | −1.7135 | −2.59508E+01 | 2.15044E+03 | 9.06093E+04 | 6.95423E+06 | 1.94503E+08 | −2.66989E+10 |
| 10 | −0.9925 | 7.40086E+00 | 1.64959E+03 | 2.62202E+01 | −2.94239E+05 | −8.73012E+06 | 2.24069E+08 |
| 11 | 90.0000 | 3.01210E+01 | −3.00615E+02 | −5.84241E+03 | −4.67634E+04 | 1.93889E+06 | −9.94612E+07 |
| 12 | 90.0000 | 4.45533E+01 | −1.37479E+03 | −1.53551E+02 | 3.31391E+05 | 3.77831E+06 | −1.42171E+08 |

Figure 90:
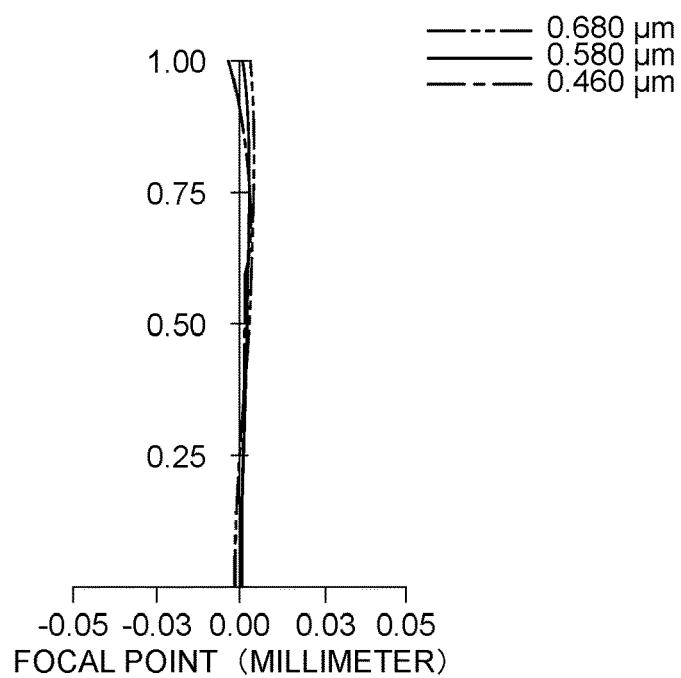
FIG. 90 shows spherical aberrations.

FIG. 90 shows spherical aberrations. The horizontal axis of FIG. 90 represents a position at which a ray that travels parallel to the optical axis and enters the imaging optical system intersects with the optical axis. The vertical axis of FIG. 90 represents distance of the above-described ray from the optical axis. The value of distance is normalized by the radius of the aperture. In other words, the value 1 on the vertical axis represents the radius of the aperture. In FIG. 90, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 91:
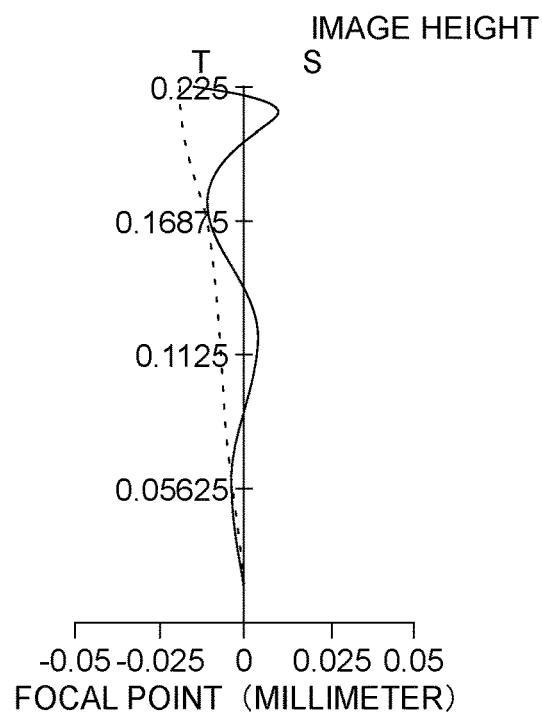
FIG. 91 shows astigmatism of the ray of wavelength of 0.580 micrometers.

FIG. 91 shows astigmatism of the ray of wavelength of 0.580 micrometers. The horizontal axis of FIG. 91 represents a position in the optical axis direction of the focal point. The vertical axis of FIG. 91 represents image height. The solid line in FIG. 91 represents the graph of the sagittal plane, and the broken line in FIG. 91 represents the graph of the tangential plane.

Figure 92:
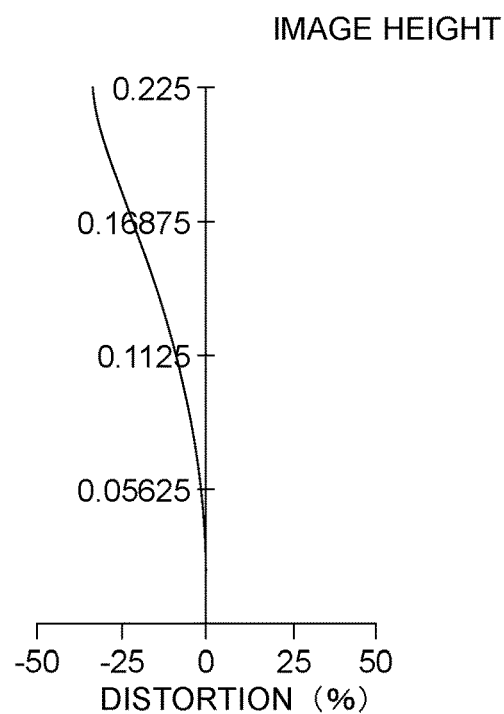
FIG. 92 shows distortion of the ray of wavelength of 0.580 micrometers.

FIG. 92 shows distortion of the ray of wavelength of 0.580 micrometers. The horizontal axis of FIG. 92 represents distortion expressed as a percent. The vertical axis of FIG. 92 represents image height.

Example 24

Figure 93:
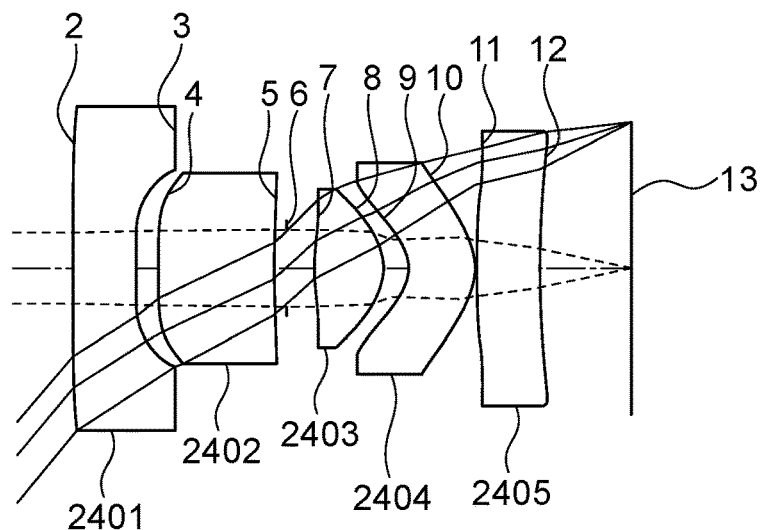
FIG. 93 shows a layout of an imaging optical system of Example 24.

FIG. 93 shows a layout of an imaging optical system of Example 24. The imaging optical system includes five lenses arranged from the object side to the image side. Each of the first lens 2401, the second lens 2402 and the fifth lens 2405 is an aspheric lens in which radius of curvature of each of both surfaces is infinity in the paraxial region and which has a power in the peripheral area. The third lens 2403 is a biconvex lens. The fourth lens 2404 is a negative meniscus lens which is convex toward the image. The aperture stop 6 is located between the second lens 2402 and the third lens 2403.

Table 47 shows positions of the optical elements and properties and values of focal length of the lenses of the imaging optical system of Example 24. The focal length f of the whole imaging optical system is given by f=0.277. The F-number Fno is given by Fno=2.458. HFOV representing a half value of angle of view is given by HFOV=50 (degrees). In Table 47 each of the five lenses is represented respectively by lens 1 to lens 5 from the object side.

In the present example, the object distance from the object to the first lens is 5.242(=5.142+0.100) millimeters. Surface 1 does not correspond to a physical object.

TABLE 47

| Surface | | Radius of curvature | Thickness or distance | Material | Refractive index | Abbe's number | Focal length |
|---|---|---|---|---|---|---|---|
| 0 | Object | Plano | 5.142 | | | | |
| 1 | | Plano | 0.100 | | | | |
| 2 | Lens 1 | ∞ | 0.100 | Plastic | 1.5311 | 55.634 | ∞ |
| 3 | | ∞ | 0.031 | | | | |
| 4 | Lens 2 | ∞ | 0.181 | Plastic | 1.6611 | 20.345 | ∞ |
| 5 | | ∞ | 0.017 | | | | |
| 6 | Ape. Stop | Plano | 0.040 | | | | |
| 7 | Lens 3 | 0.42293 | 0.110 | Plastic | 1.5311 | 55.634 | 0.149 |
| 8 | | −0.08889 | 0.037 | | | | |
| 9 | Lens 4 | −0.06272 | 0.101 | Plastic | 1.6611 | 20.345 | −0.871 |
| 10 | | −0.11563 | 0.001 | | | | |
| 11 | Lens 5 | ∞ | 0.100 | Plastic | 1.6349 | 23.945 | ∞ |
| 12 | | ∞ | 0.140 | | | | |
| 13 | Image | Plano | 0.000 | | | | |

Table 48 shows conic constants and aspheric coefficients of each surface of each lens of Example 24.

TABLE 48

| Surface | K | A4 | A6 | A8 | A10 | A12 | A14 |
|---|---|---|---|---|---|---|---|
| 2 | 90.0000 | −1.37641E+00 | 3.71943E+01 | 1.07128E+02 | 6.59359E+02 | −6.66303E+03 | −5.29998E+05 |
| 3 | 90.0000 | 8.86599E+01 | 1.39340E+03 | −1.08550E+04 | −1.34802E+05 | −5.78030E+06 | −4.66440E+08 |
| 4 | −74.0000 | 9.91857E+01 | −9.82524E+02 | −1.11847E+04 | −9.61220E+04 | 6.70346E+06 | 4.97436E+08 |
| 5 | 41.0000 | 8.54878E+01 | −7.65320E+03 | 1.22655E+05 | 1.11775E+08 | −3.64873E+08 | 1.25889E+11 |
| 7 | −18.7258 | 3.24205E+01 | −2.95426E+03 | −2.65481E+05 | −6.81859E+06 | 1.46341E+09 | −1.10268E+10 |
| 8 | −1.8705 | 3.52866E+01 | −6.04501E+03 | −2.40640E+04 | 5.81010E+05 | 7.35222E+07 | 1.93656E+09 |
| 9 | −1.6388 | −2.72723E+01 | 2.07233E+03 | 8.54095E+04 | 6.95416E+06 | 2.16757E+08 | −2.58342E+10 |
| 10 | −1.0178 | 7.86476E+00 | 1.64494E+03 | 1.17276E+03 | −2.07317E+05 | −4.09184E+06 | 4.70018E+08 |
| 11 | 90.0000 | 3.14198E+01 | −3.16579E+02 | −6.31997E+03 | −4.91771E+04 | 2.48269E+06 | −7.00164E+07 |
| 12 | 90.0000 | 4.31251E+01 | −1.36551E+03 | 1.70746E+02 | 3.41192E+05 | 3.87243E+06 | −1.45233E+08 |

Figure 94:
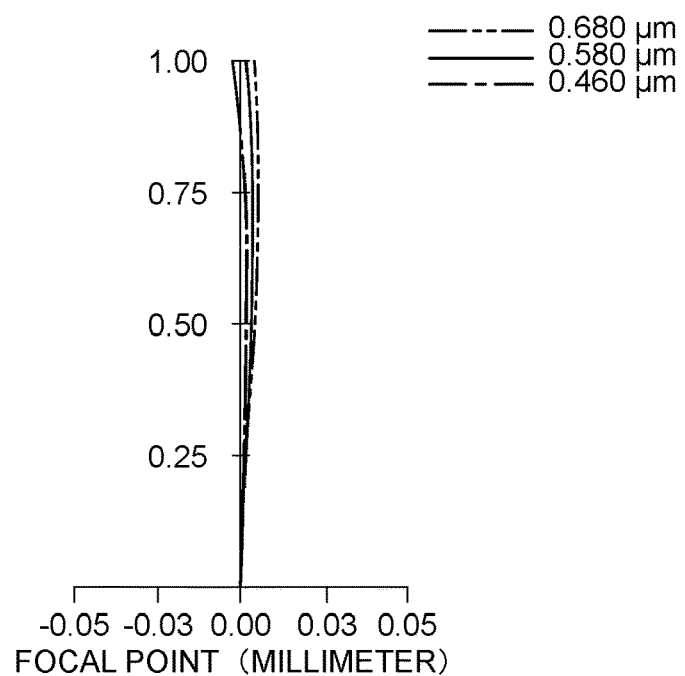
FIG. 94 shows spherical aberrations.

FIG. 94 shows spherical aberrations. The horizontal axis of FIG. 94 represents a position at which a ray that travels parallel to the optical axis and enters the imaging optical system intersects with the optical axis. The vertical axis of FIG. 94 represents distance of the above-described ray from the optical axis. The value of distance is normalized by the radius of the aperture. In other words, the value 1 on the vertical axis represents the radius of the aperture. In FIG. 94, the solid line represents the graph of the ray of wavelength of 0.580 micrometers, the chain line represents the graph of the ray of wavelength of 0.460 micrometers and the two-dot chain line represents the graph of the ray of wavelength of 0.680 micrometers.

Figure 95:
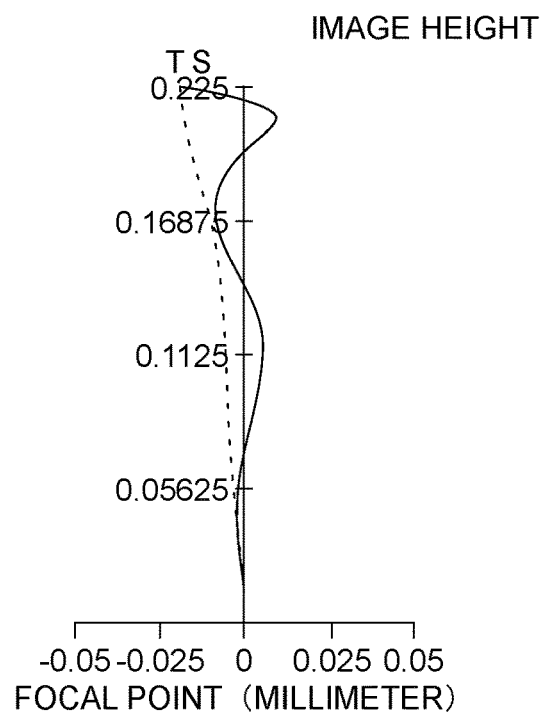
FIG. 95 shows astigmatism of the ray of wavelength of 0.580 micrometers.

FIG. 95 shows astigmatism of the ray of wavelength of 0.580 micrometers. The horizontal axis of FIG. 95 represents a position in the optical axis direction of the focal point. The vertical axis of FIG. 95 represents image height. The solid line in FIG. 95 represents the graph of the sagittal plane, and the broken line in FIG. 95 represents the graph of the tangential plane.

Figure 96:
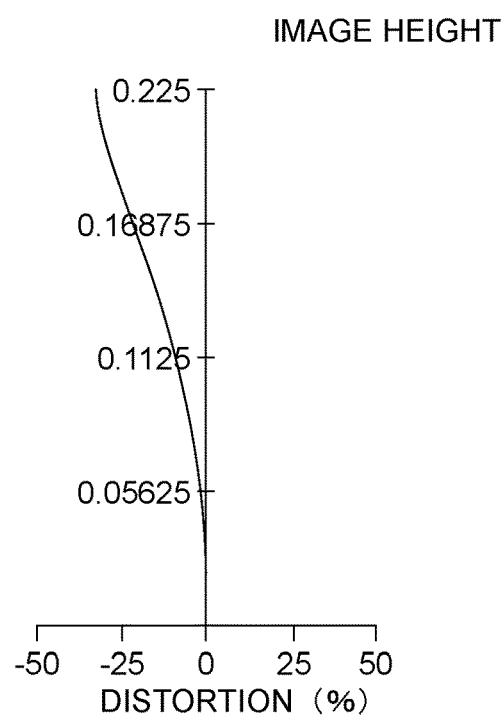
FIG. 96 shows distortion of the ray of wavelength of 0.580 micrometers.

FIG. 96 shows distortion of the ray of wavelength of 0.580 micrometers. The horizontal axis of FIG. 96 represents distortion expressed as a percent. The vertical axis of FIG. 96 represents image height.

Example 25

Figure 97:
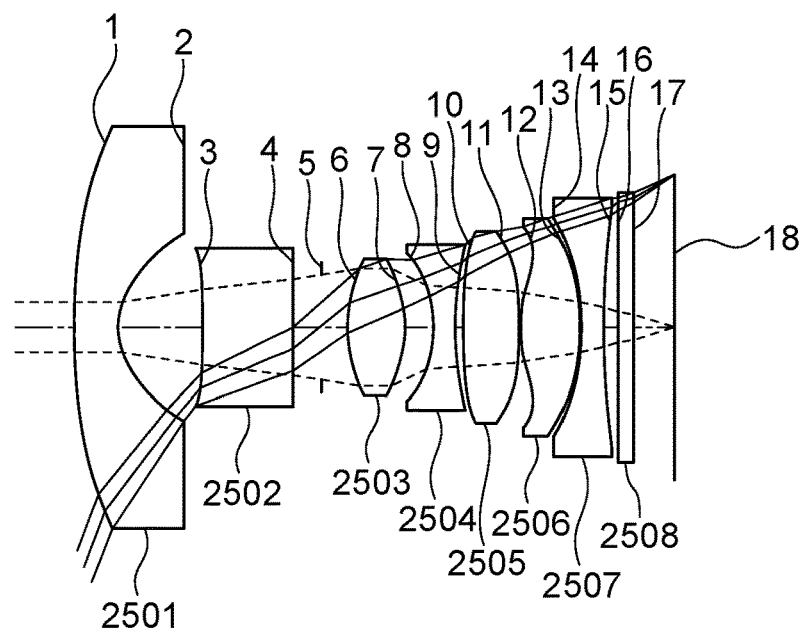
FIG. 97 shows a layout of an imaging optical system of Example 25.

FIG. 97 shows a layout of an imaging optical system of Example 25. The imaging optical system includes seven lenses and an infrared cut filter arranged from the object side to the image side. Each of the second lens 2502, the fifth lens 2505 and the seventh lens 2507 is an aspheric lens in which radius of curvature of each of both surfaces is infinity in the paraxial region and which has a power in the peripheral area. The first lens 2501 is a negative meniscus lens which is convex toward the object. The third lens 2503 is a biconvex lens. The fourth lens 2504 is a biconcave lens. The sixth lens 2506 is a biconvex lens. The aperture stop 5 is located between the second lens 2502 and the third lens 2503.

Table 49 shows positions of the optical elements and properties and values of focal length of the lenses of the imaging optical system of Example 25. The focal length f of the whole imaging optical system is given by f=1.121. The F-number Fno is given by Fno=1.8. HFOV representing a half value of angle of view is given by HFOV=70 (degrees). In Table 49 each of the seven lenses is represented respectively by lens 1 to lens 7 from the object side.

In the present example, the object distance from the object to the first lens is infinity.

TABLE 49

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 8.8325 | 0.600 | Plastic | 1.545 | 56 | −2.031 |
| 2 | | 0.9602 | 1.109 | | | | |
| 3 | Lens 2 | ∞ | 1.200 | Plastic | 1.645 | 23 | ∞ |
| 4 | | ∞ | 0.377 | | | | |
| 5 | Ape. Stop | Plano | 0.348 | | | | |
| 6 | Lens 3 | 1.6386 | 0.777 | Plastic | 1.545 | 56 | 1.431 |
| 7 | | −1.2393 | 0.371 | | | | |
| 8 | Lens 4 | −1.7278 | 0.300 | Plastic | 1.645 | 23 | −1.816 |
| 9 | | 3.8810 | 0.112 | | | | |
| 10 | Lens 5 | ∞ | 0.741 | Plastic | 1.545 | 56 | ∞ |
| 11 | | ∞ | 0.030 | | | | |
| 12 | Lens 6 | 1.3703 | 0.762 | Plastic | 1.545 | 56 | 2.298 |
| 13 | | −11.6812 | 0.030 | | | | |
| 14 | Lens 7 | ∞ | 0.300 | Plastic | 1.645 | 23 | ∞ |
| 15 | | ∞ | 0.183 | | | | |
| 16 | IR cut filter | Plano | 0.210 | Glass | 1.517 | 64.2 | |
| 17 | | Plano | 0.550 | | | | |
| 18 | Image | Plano | | | | | |

Table 50 shows conic constants and aspheric coefficients of each surface of each lens of Example 25.

TABLE 50

| Surface | K | A4 | A6 | A8 | A10 | A12 | A14 |
|---|---|---|---|---|---|---|---|
| 1 | −62.1851 | 1.1578E−02 | −1.7482E−03 | 1.4338E−04 | 1.2043E−05 | −2.9993E−06 | 1.9193E−07 |
| 2 | −0.8595 | 2.7584E−02 | −1.2104E−03 | 9.3217E−03 | −7.8443E−03 | −7.2914E−12 | 6.8248E−14 |
| 3 | 90.0000 | −6.6194E−02 | −3.3047E−02 | 2.4922E−02 | −2.8086E−03 | −3.6288E−10 | 3.8723E−11 |
| 4 | 90.0000 | −5.0447E−02 | 5.2246E−02 | −2.4305E−02 | 7.7680E−02 | 6.3161E−07 | −1.2222E−07 |
| 6 | 0.6247 | −5.7843E−02 | −2.2039E−03 | −1.5732E−03 | −3.5953E−03 | 0.0000E+00 | 0.0000E+00 |
| 7 | −1.0993 | 1.2624E−01 | −1.3191E−01 | 9.1858E−02 | −1.8369E−02 | 2.3023E−17 | −1.9789E−17 |
| 8 | 1.3775 | 3.7533E−02 | −9.7942E−02 | 1.8567E−02 | 7.2124E−02 | −1.0038E−17 | 1.9153E−16 |
| 9 | −87.1420 | 2.8680E−02 | 7.0359E−03 | −4.5752E−03 | 5.4945E−04 | −3.9845E−14 | 3.4170E−20 |
| 10 | −90.0000 | 7.6187E−02 | −4.4773E−03 | −1.9230E−03 | 9.2948E−04 | 6.6470E−16 | −1.7949E−17 |
| 11 | 90.0000 | −2.6213E−01 | 6.2158E−02 | 1.0068E−02 | 1.8447E−03 | −8.5952E−10 | 9.1092E−17 |
| 12 | −5.1094 | −6.8876E−02 | −1.4034E−02 | −2.5598E−02 | 8.0676E−03 | −4.0758E−15 | −1.8176E−18 |
| 13 | 25.1787 | −2.7162E−01 | 1.4226E−01 | −1.2974E−02 | −5.6001E−03 | 5.1584E−15 | 8.8842E−18 |
| 14 | 90.0000 | −3.4083E−01 | 1.6127E−01 | 9.8832E−03 | −1.3727E−02 | −7.9999E−15 | −7.5851E−18 |
| 15 | −90.0000 | 7.2680E−02 | −4.5030E−02 | 1.4669E−02 | −2.2568E−03 | 3.7270E−14 | 9.1726E−17 |

Figure 98:
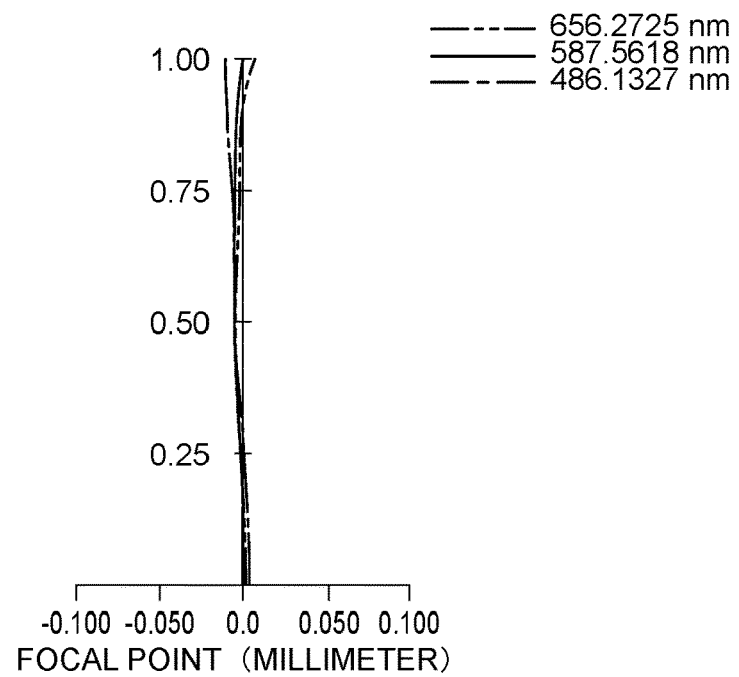
FIG. 98 shows spherical aberrations.

FIG. 98 shows spherical aberrations. The horizontal axis of FIG. 98 represents a position at which a ray that travels parallel to the optical axis and enters the imaging optical system intersects with the optical axis. The vertical axis of FIG. 98 represents distance of the above-described ray from the optical axis. The value of distance is normalized by the radius of the aperture. In other words, the value 1 on the vertical axis represents the radius of the aperture. In FIG. 98, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 99:
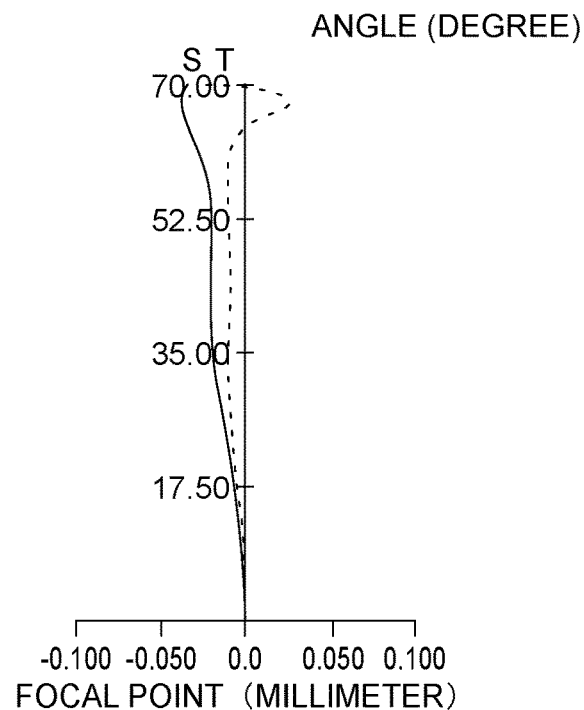
FIG. 99 shows astigmatism of the ray of wavelength of 587.5618 nanometers.

FIG. 99 shows astigmatism of the ray of wavelength of 587.5618 nanometers. The horizontal axis of FIG. 99 represents a position in the optical axis direction of the focal point. The vertical axis of FIG. 99 represents angle that a ray forms with the optical axis. The solid line in FIG. 99 represents the graph of the sagittal plane, and the broken line in FIG. 99 represents the graph of the tangential plane.

Figure 100:
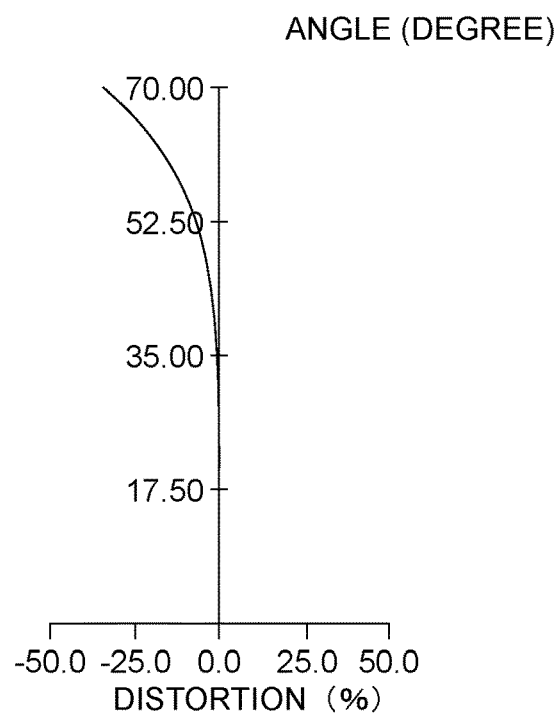
FIG. 100 shows distortion of the ray of wavelength of 587.5618 nanometers.

FIG. 100 shows distortion of the ray of wavelength of 587.5618 nanometers. The horizontal axis of FIG. 100 represents distortion expressed as a percent. The vertical axis of FIG. 100 represents angle that a ray forms with the optical axis.

Example 26

Figure 101:
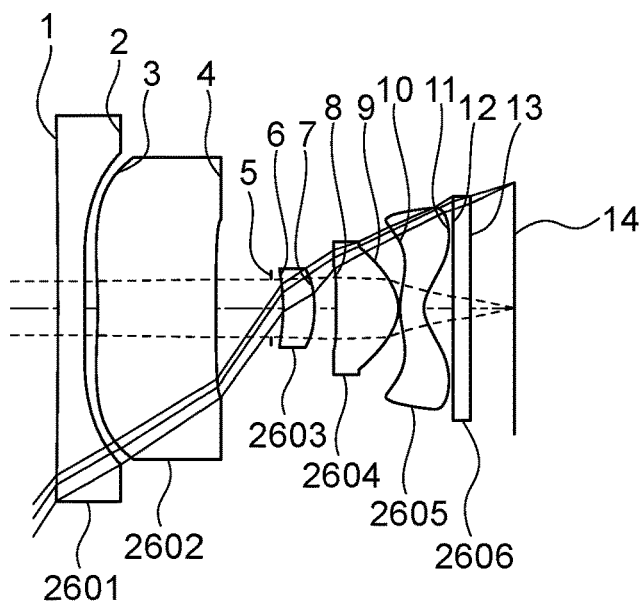
FIG. 101 shows a layout of an imaging optical system of Example 26.

FIG. 101 shows a layout of an imaging optical system of Example 26. The imaging optical system includes five lenses and an infrared cut filter arranged from the object side to the image side. The first lens 2601 is an aspheric lens in which radius of curvature of each of both surfaces is infinity in the paraxial region and which has a power in the peripheral area. The second lens 2602 is a negative meniscus lens which is convex toward the image. The third lens 2603 is a biconvex lens. The fourth lens 2604 is a positive meniscus lens which is convex toward the image. The fifth lens 2605 is a negative meniscus lens which is convex toward the object. The aperture stop 5 is located between the second lens 2602 and the third lens 263.

Table 51 shows positions of the optical elements and properties and values of focal length of the lenses of the imaging optical system of Example 26. The focal length f of the whole imaging optical system is given by f=1.68. The F-number Fno is given by Fno=2. HFOV representing a half value of angle of view is given by HFOV=60 (degrees). In Table 51 each of the five lenses is represented respectively by lens 1 to lens 5 from the object side.

In the present example, the object distance from the object to the first lens is infinity.

TABLE 51

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | ∞ | 0.349 | Plastic | 1.535 | 56 | ∞ |
| 2 | | ∞ | 0.162 | | | | |
| 3 | Lens 2 | −11.0207 | 1.500 | Plastic | 1.645 | 23 | −36.205 |
| 4 | | −21.9839 | 0.707 | | | | |
| 5 | Ape. Stop | Plano | 0.146 | | | | |
| 6 | Lens 3 | 90.0000 | 0.413 | Plastic | 1.545 | 56 | 4.847 |
| 7 | | −2.7170 | 0.276 | | | | |
| 8 | Lens 4 | −90.0000 | 0.786 | Plastic | 1.545 | 56 | 1.441 |
| 9 | | −0.7808 | 0.030 | | | | |
| 10 | Lens 5 | 1.0213 | 0.321 | Plastic | 1.645 | 23 | −1.984 |
| 11 | | 0.4980 | 0.364 | | | | |
| 12 | IR cut filter | Plano | 0.210 | Glass | 1.517 | 64.2 | |
| 13 | | Plano | 0.550 | | | | |
| 14 | Image | Plano | | | | | |

Table 52 shows conic constants and aspheric coefficients of each surface of each lens of Example 26.

TABLE 52

| Surface | K | A4 | A6 | A8 | A10 | A12 | A14 |
|---|---|---|---|---|---|---|---|
| 1 | −90.0000 | −6.9421E−05 | 5.4176E−06 | −1.7155E−08 | −6.3514E−10 | 2.5690E−11 | 8.6148E−13 |
| 2 | −90.0000 | 1.6774E−02 | −1.9926E−04 | −2.3671E−05 | −1.5105E−07 | 6.1920E−09 | 5.7725E−10 |
| 4 | 19.4646 | 3.7447E−02 | −6.7602E−03 | 1.8804E−03 | −2.1067E−04 | −6.7450E−08 | 1.7032E−06 |
| 5 | 42.1039 | 3.6939E−02 | −1.1820E−03 | −2.4221E−03 | 5.5674E−04 | 2.5456E−08 | 2.6071E−11 |
| 6 | 90.0000 | −3.3361E−01 | −5.2116E−01 | 1.4333E+00 | −8.9413E+00 | 0.0000E+00 | 0.0000E+00 |
| 7 | −75.0131 | −6.8534E−01 | 4.0029E−01 | −3.3535E−01 | −1.2449E+00 | −1.0724E−09 | −5.0522E−12 |
| 8 | −90.0000 | 4.6505E−02 | −7.4567E−01 | 1.1307E+00 | −4.3636E−01 | −2.2796E−10 | 8.2887E−11 |
| 9 | −1.2609 | 1.7910E−01 | −3.8024E−01 | 1.9266E−01 | 8.3726E−02 | 5.5889E−07 | −5.7100E−11 |
| 10 | −8.6118 | −3.6102E−01 | −1.3218E−01 | 5.5871E−01 | −4.0511E−01 | 9.3666E−02 | 4.1621E−04 |
| 11 | −3.2615 | −3.4608E−01 | 2.6230E−01 | −1.1036E−01 | 2.0355E−02 | −1.2958E−03 | 1.8258E−08 |

Figure 102:
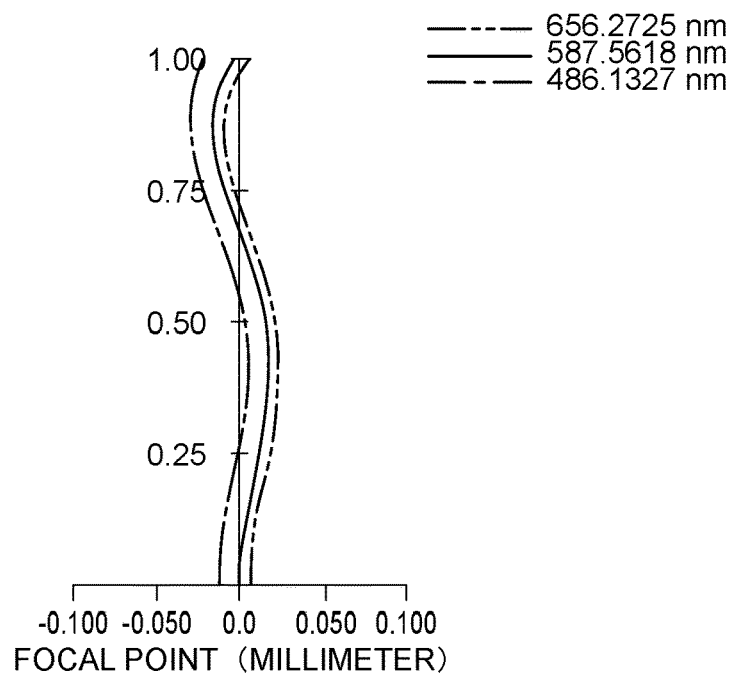
FIG. 102 shows spherical aberrations.

FIG. 102 shows spherical aberrations. The horizontal axis of FIG. 102 represents a position at which a ray that travels parallel to the optical axis and enters the imaging optical system intersects with the optical axis. The vertical axis of FIG. 102 represents distance of the above-described ray from the optical axis. The value of distance is normalized by the radius of the aperture. In other words, the value 1 on the vertical axis represents the radius of the aperture. In FIG. 102, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 103:
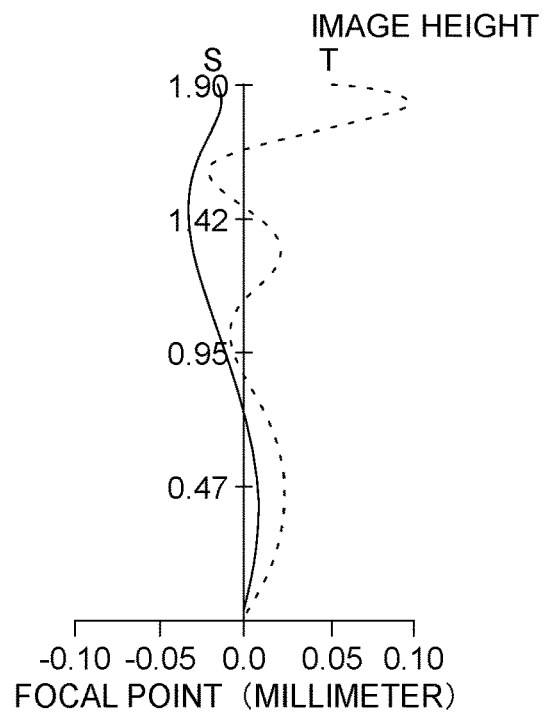
FIG. 103 shows astigmatism of the ray of wavelength of 587.5618 nanometers.

FIG. 103 shows astigmatism of the ray of wavelength of 587.5618 nanometers. The horizontal axis of FIG. 103 represents a position in the optical axis direction of the focal point. The vertical axis of FIG. 103 represents image height. The solid line in FIG. 103 represents the graph of the sagittal plane, and the broken line in FIG. 103 represents the graph of the tangential plane.

Figure 104:
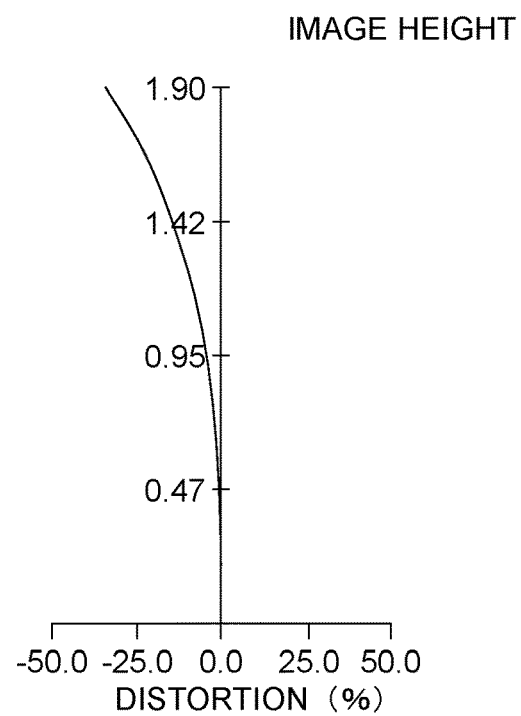
FIG. 104 shows distortion of the ray of wavelength of 587.5618 nanometers.

FIG. 104 shows distortion of the ray of wavelength of 587.5618 nanometers. The horizontal axis of FIG. 104 represents distortion expressed as a percent. The vertical axis of FIG. 104 represents image height.

Example 27

Figure 105:
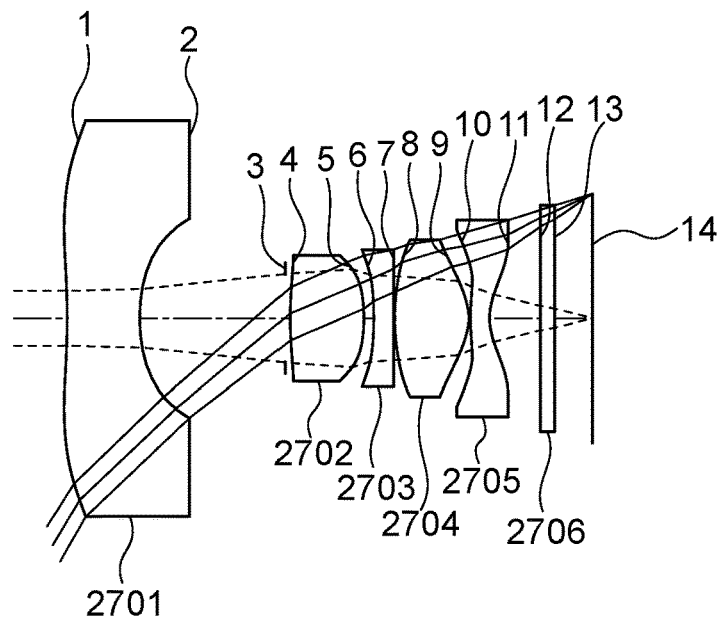
FIG. 105 shows a layout of an imaging optical system of Example 27.

FIG. 105 shows a layout of an imaging optical system of Example 27. The imaging optical system includes five lenses and an infrared cut filter arranged from the object side to the image side. The third lens 2703 is an aspheric lens in which radius of curvature of each of both surfaces is infinity in the paraxial region and which has a power in the peripheral area. The first lens 2701 is a biconcave lens. The second lens 2702 is a biconvex lens. The fourth lens 2704 is a biconvex lens. The fifth lens 2705 is a negative meniscus lens which is convex toward the object. The aperture stop 3 is located between the first lens 2701 and the second lens 2702.

Table 53 shows positions of the optical elements and properties and values of focal length of the lenses of the imaging optical system of Example 27. The focal length f of the whole imaging optical system is given by f=1.593. The F-number Fno is given by Fno=2. HFOV representing a half value of angle of view is given by HFOV=60 (degrees). In Table 53 each of the five lenses is represented respectively by lens 1 to lens 5 from the object side.

In the present example, the object distance from the object to the first lens is infinity.

TABLE 53

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | −7.3474 | 1.119 | Plastic | 1.535 | 56 | −3.907 |
| 2 | | 3.0785 | 2.218 | | | | |
| 3 | Ape. Stop | Plano | 0.068 | | | | |
| 4 | Lens 2 | 3.5524 | 1.123 | Plastic | 1.545 | 56 | 3.259 |
| 5 | | −3.1565 | 0.148 | | | | |
| 6 | Lens 3 | ∞ | 0.303 | Plastic | 1.645 | 23 | ∞ |
| 7 | | ∞ | 0.031 | | | | |
| 8 | Lens 4 | 5.1694 | 1.112 | Plastic | 1.545 | 56 | −3.907 |
| 9 | | −1.0432 | 0.031 | | | | |
| 10 | Lens 5 | 1.6992 | 0.308 | Plastic | 1.645 | 23 | −1.816 |
| 11 | | 0.6439 | 0.779 | | | | |
| 12 | IR cut filter | Plano | 0.210 | Glass | 1.517 | 64.2 | |
| 13 | | Plano | 0.550 | | | | |
| 14 | Image | Plano | | | | | |

Table 54 shows conic constants and aspheric coefficients of each surface of each lens of Example 27.

TABLE 54

| Surface | K | A4 | A6 | A8 | A10 | A12 | A14 |
|---|---|---|---|---|---|---|---|
| 1 | −89.9935 | 1.2336E−02 | −8.8661E−04 | 2.1372E−05 | 1.1545E−06 | −1.2507E−07 | 2.7471E−09 |
| 2 | 0.4012 | 6.1198E−02 | −1.1255E−02 | 8.5458E−03 | −7.4403E−04 | −1.0877E−04 | −4.0362E−05 |
| 4 | −8.0516 | −5.8089E−02 | −2.1122E−01 | 3.8412E−01 | −5.8736E−01 | 0.0000E+00 | 0.0000E+00 |
| 5 | −52.8548 | −5.5347E−01 | 3.5211E−01 | −1.0357E−01 | −3.6064E−02 | −1.5454E−06 | −1.0158E−06 |
| 6 | 90.0000 | −3.1642E−01 | 1.2904E−01 | 8.4157E−02 | −4.8897E−02 | −3.3547E−05 | 5.2301E−10 |
| 7 | −90.0000 | 1.3398E−01 | −1.4543E−01 | −5.7001E−02 | 1.6389E−01 | −6.3925E−02 | −4.3793E−07 |
| 8 | 3.0096 | 2.4128E−01 | −3.8457E−01 | 2.1809E−01 | −1.9767E−02 | −9.7866E−03 | −1.8437E−07 |
| 9 | −7.3806 | −1.9949E−01 | 1.5049E−01 | −5.8356E−02 | −8.4727E−03 | 2.8194E−02 | −5.8296E−03 |
| 10 | −19.4505 | −3.9405E−01 | 1.3640E−01 | 6.1328E−02 | −2.8385E−02 | −9.8266E−03 | 4.5107E−03 |
| 11 | −4.4970 | −2.6664E−01 | 1.9499E−01 | −6.9343E−02 | 9.0644E−03 | 7.1903E−04 | −2.7370E−04 |

Figure 106:
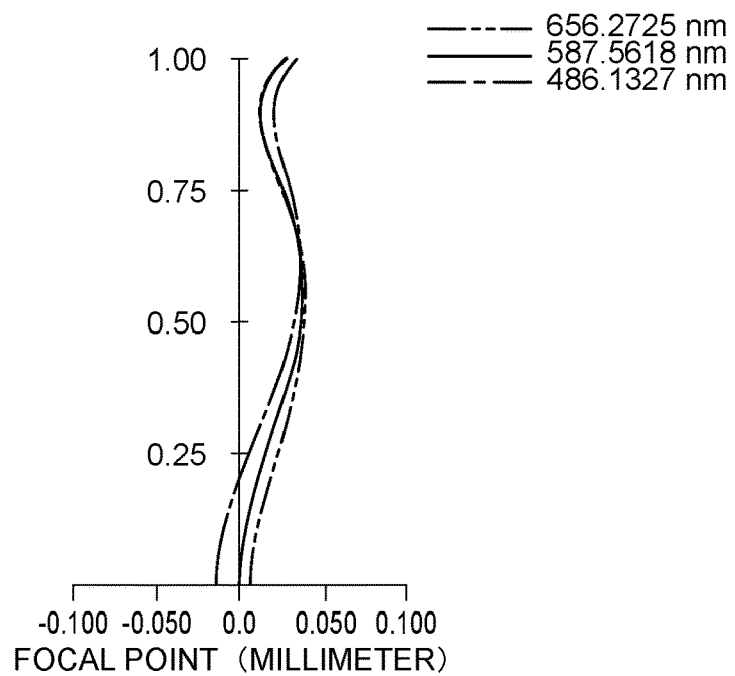
FIG. 106 shows spherical aberrations.

FIG. 106 shows spherical aberrations. The horizontal axis of FIG. 106 represents a position at which a ray that travels parallel to the optical axis and enters the imaging optical system intersects with the optical axis. The vertical axis of FIG. 106 represents distance of the above-described ray from the optical axis. The value of distance is normalized by the radius of the aperture. In other words, the value 1 on the vertical axis represents the radius of the aperture. In FIG. 106, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 107:
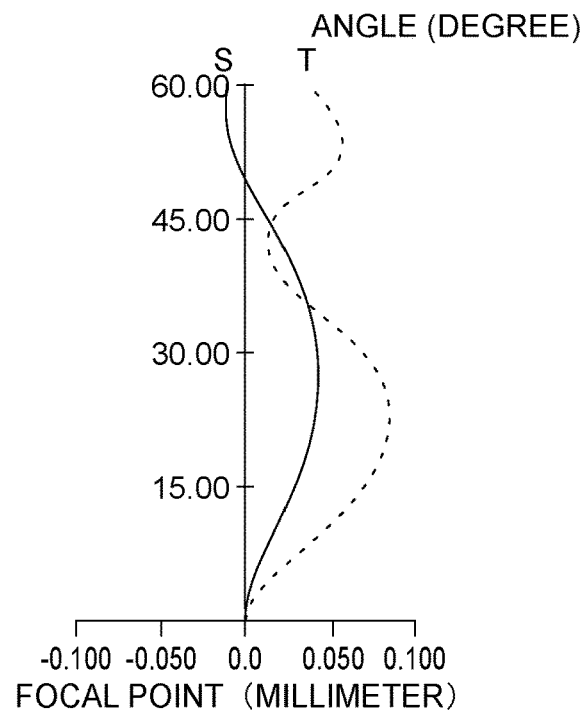
FIG. 107 shows astigmatism of the ray of wavelength of 587.5618 nanometers.

FIG. 107 shows astigmatism of the ray of wavelength of 587.5618 nanometers. The horizontal axis of FIG. 107 represents a position in the optical axis direction of the focal point. The vertical axis of FIG. 107 represents angle that a ray forms with the optical axis. The solid line in FIG. 107 represents the graph of the sagittal plane, and the broken line in FIG. 107 represents the graph of the tangential plane.

Figure 108:
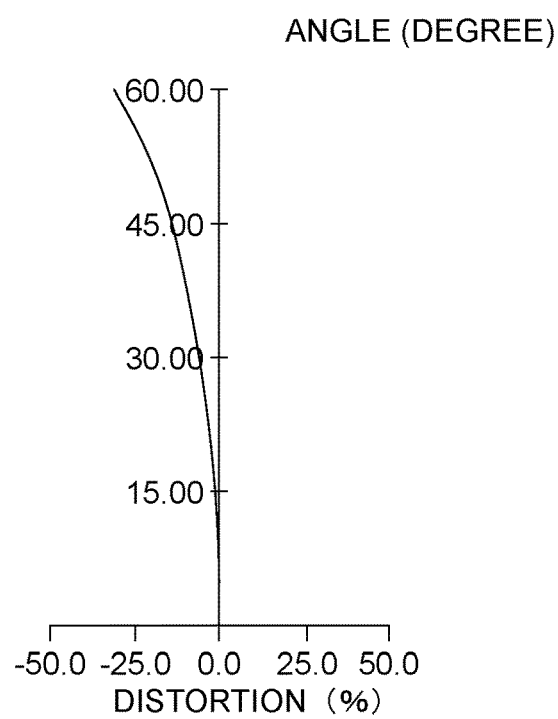
FIG. 108 shows distortion of the ray of wavelength of 587.5618 nanometers.

FIG. 108 shows distortion of the ray of wavelength of 587.5618 nanometers. The horizontal axis of FIG. 108 represents distortion expressed as a percent. The vertical axis of FIG. 108 represents angle that a ray forms with the optical axis.

Example 28

Figure 109:
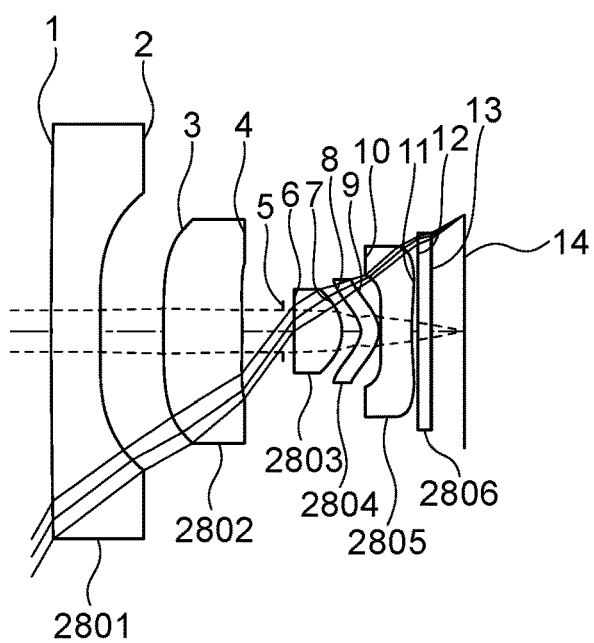
FIG. 109 shows a layout of an imaging optical system of Example 28.

FIG. 109 shows a layout of an imaging optical system of Example 28. The imaging optical system includes five lenses and an infrared cut filter arranged from the object side to the image side. Each of the first lens 2801 and the fifth lens 2805 is an aspheric lens in which radius of curvature of each of both surfaces is infinity in the paraxial region and which has a power in the peripheral area. The second lens 2802 is a positive meniscus lens which is convex toward the image. The third lens 2803 is a biconvex lens. The fourth lens 2804 is a negative meniscus lens which is convex toward the image. The aperture stop 5 is located between the second lens 2802 and the third lens 2803.

Table 55 shows positions of the optical elements and properties and values of focal length of the lenses of the imaging optical system of Example 28. The focal length f of the whole imaging optical system is given by f=1.686. The F-number Fno is given by Fno=2.4. HFOV representing a half value of angle of view is given by HFOV=60 (degrees). In Table 55 each of the five lenses is represented respectively by lens 1 to lens 5 from the object side.

In the present example, the object distance from the object to the first lens is infinity.

TABLE 55

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | ∞ | 0.813 | Plastic | 1.535 | 56 | ∞ |
| 2 | | ∞ | 1.109 | | | | |
| 3 | Lens 2 | −16.6867 | 1.300 | Plastic | 1.645 | 23 | 31.793 |
| 4 | | −9.4812 | 0.714 | | | | |
| 5 | Ape. Stop | Plano | 0.153 | | | | |
| 6 | Lens 3 | 4.9607 | 0.842 | Plastic | 1.545 | 56 | 1.135 |
| 7 | | −0.6644 | 0.321 | | | | |
| 8 | Lens 4 | −0.3277 | 0.312 | Plastic | 1.585 | 30.5 | −6.858 |
| 9 | | −0.4823 | 0.030 | | | | |
| 10 | Lens 5 | ∞ | 0.527 | Plastic | 1.645 | 23 | ∞ |
| 11 | | ∞ | 0.118 | | | | |
| 12 | IR cut filter | Plano | 0.210 | Glass | 1.517 | 64.2 | |
| 13 | | Plano | 0.550 | | | | |
| 14 | Image | Plano | | | | | |

Table 56 shows conic constants and aspheric coefficients of each surface of each lens of Example 28.

TABLE 56

| Surface | K | A4 | A6 | A8 | A10 | A12 | A14 |
|---|---|---|---|---|---|---|---|
| 1 | 90.0000 | −5.7906E−05 | 2.3564E−05 | 2.9899E−07 | 7.4044E−09 | 6.5110E−10 | −1.7470E−10 |
| 2 | 90.0000 | 2.9480E−02 | −3.9810E−04 | 3.9269E−05 | −1.6123E−05 | −2.2714E−07 | −1.0303E−08 |
| 4 | −90.0000 | 7.1455E−02 | −1.9224E−02 | 4.8573E−03 | −4.0292E−04 | 2.7357E−06 | −4.5066E−07 |
| 5 | 46.1900 | 6.3253E−02 | 5.2687E−03 | −3.1245E−04 | 3.8680E−04 | 2.3337E−07 | 9.4519E−12 |
| 6 | −89.4451 | −2.2481E−01 | 2.2863E−01 | −4.0789E+00 | 2.8437E+00 | −1.8611E−16 | −1.3071E−18 |
| 7 | −2.8995 | −5.3933E−01 | 7.2151E−01 | −7.2436E−01 | −8.5717E−01 | 1.9695E−10 | −1.4408E−11 |
| 8 | −1.3331 | 6.6071E−01 | 7.6459E−01 | −2.2978E+00 | 1.5370E+00 | −4.1494E−09 | −1.7849E−11 |
| 9 | −0.7974 | 5.4204E−01 | 1.0311E+00 | −1.3908E+00 | 8.3086E−01 | 5.2695E−06 | 7.2186E−12 |
| 10 | 90.0000 | −1.0702E−01 | 9.5251E−02 | −4.2831E−01 | 2.5332E−01 | −2.7214E−01 | 1.1210E−01 |
| 11 | 90.0000 | 2.5257E−01 | −3.3899E−01 | 1.4561E−01 | −3.3977E−02 | 2.9819E−03 | 8.5839E−08 |

Figure 110:
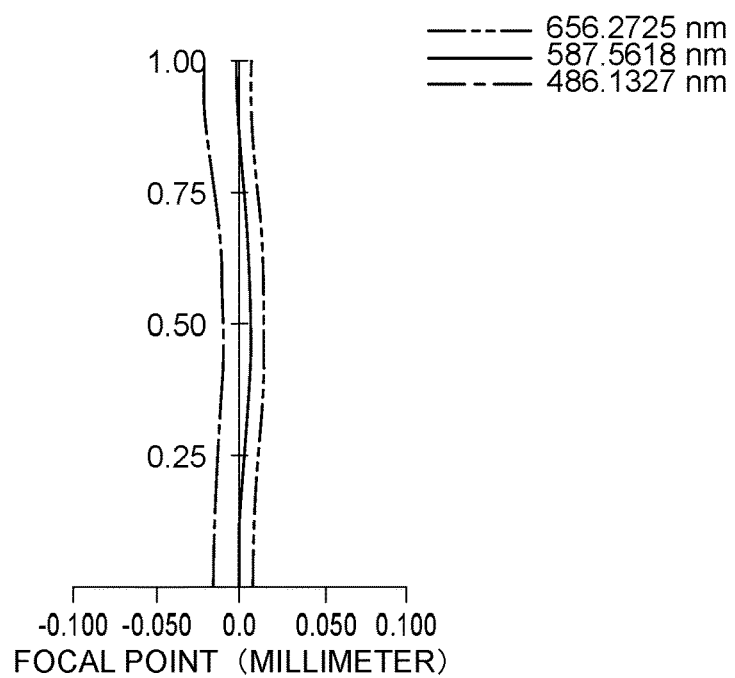
FIG. 110 shows spherical aberrations.

FIG. 110 shows spherical aberrations. The horizontal axis of FIG. 110 represents a position at which a ray that travels parallel to the optical axis and enters the imaging optical system intersects with the optical axis. The vertical axis of FIG. 110 represents distance of the above-described ray from the optical axis. The value of distance is normalized by the radius of the aperture. In other words, the value 1 on the vertical axis represents the radius of the aperture. In FIG. 110, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 111:
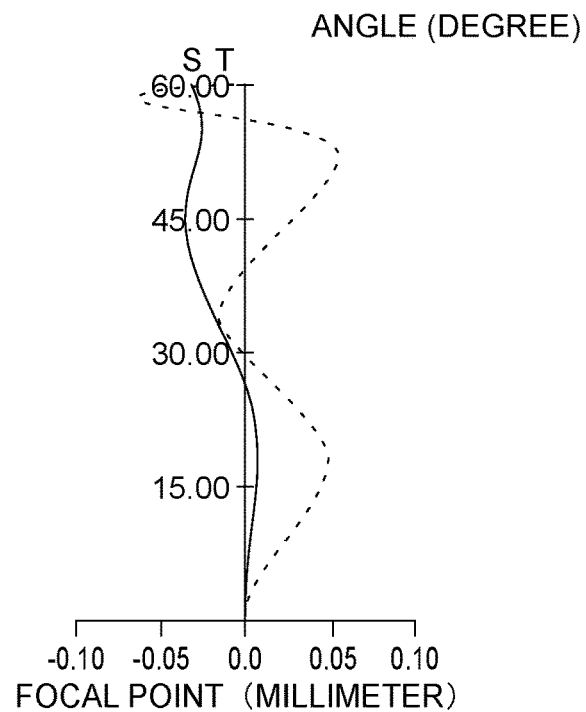
FIG. 111 shows astigmatism of the ray of wavelength of 587.5618 nanometers.

FIG. 111 shows astigmatism of the ray of wavelength of 587.5618 nanometers. The horizontal axis of FIG. 111 represents a position in the optical axis direction of the focal point. The vertical axis of FIG. 111 represents angle that a ray forms with the optical axis. The solid line in FIG. 111 represents the graph of the sagittal plane, and the broken line in FIG. 111 represents the graph of the tangential plane.

Figure 112:
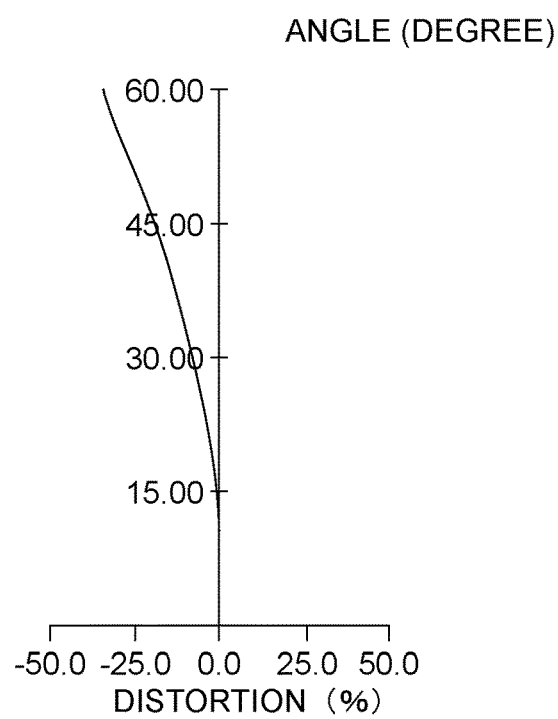
FIG. 112 shows distortion of the ray of wavelength of 587.5618 nanometers.

FIG. 112 shows distortion of the ray of wavelength of 587.5618 nanometers. The horizontal axis of FIG. 112 represents distortion expressed as a percent. The vertical axis of FIG. 112 represents angle that a ray forms with the optical axis.

Example 29

Figure 113:
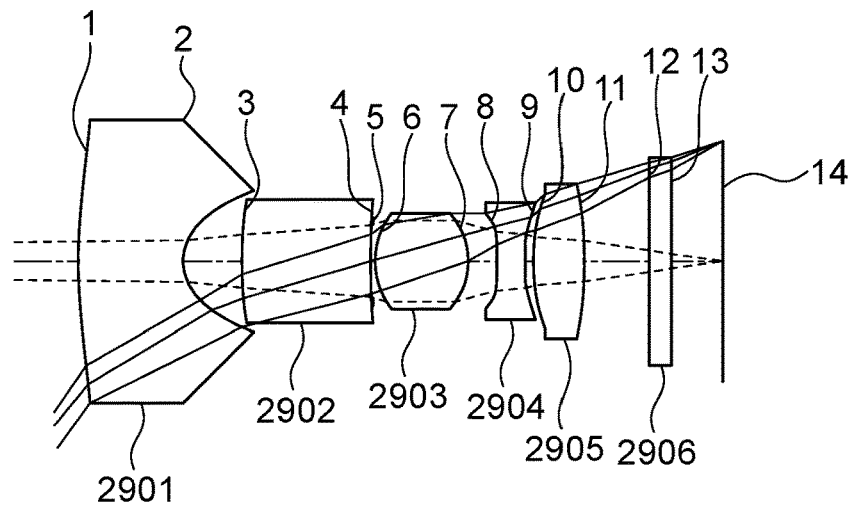
FIG. 113 shows a layout of an imaging optical system of Example 29.

FIG. 113 shows a layout of an imaging optical system of Example 29. The imaging optical system includes five lenses and an infrared cut filter arranged from the object side to the image side. Each of the second lens 2902, the fourth lens 2904 and the fifth lens 2905 is an aspheric lens in which radius of curvature of each of both surfaces is infinity in the paraxial region and which has a power in the peripheral area. The first lens 2901 is a negative meniscus lens which is convex toward the object. The third lens 2903 is a biconvex lens. The aperture stop 5 is located between the second lens 2902 and the third lens 2903.

Table 57 shows positions of the optical elements and properties and values of focal length of the lenses of the imaging optical system of Example 29. The focal length f of the whole imaging optical system is given by f=1.344. The F-number Fno is given by Fno=2.4. HFOV representing a half value of angle of view is given by HFOV=60 (degrees). In Table 57 each of the five lenses is represented respectively by lens 1 to lens 5 from the object side.

In the present example, the object distance from the object to the first lens is infinity.

TABLE 57

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 11.6968 | 1.075 | Plastic | 1.545 | 56 | −1.735 |
| 2 | | 0.8467 | 0.618 | | | | |
| 3 | Lens 2 | ∞ | 1.300 | Plastic | 1.645 | 23 | ∞ |
| 4 | | ∞ | 0.024 | | | | |
| 5 | Ape. Stop | Plano | 0.016 | | | | |
| 6 | Lens 3 | 1.2412 | 0.963 | Plastic | 1.545 | 56 | 1.494 |
| 7 | | −1.7202 | 0.286 | | | | |
| 8 | Lens 4 | ∞ | 0.300 | Plastic | 1.645 | 23 | ∞ |
| 9 | | ∞ | 0.089 | | | | |
| 10 | Lens 5 | ∞ | 0.507 | Plastic | 1.545 | 56 | ∞ |
| 11 | | ∞ | 0.678 | | | | |
| 12 | IR cut filter | Plano | 0.210 | Glass | 1.517 | 64.2 | |
| 13 | | Plano | 0.550 | | | | |
| 14 | Image | Plano | | | | | |

Table 58 shows conic constants and aspheric coefficients of each surface of each lens of Example 29.

TABLE 58

| Surface | K | A4 | A6 | A8 | A10 | A12 | A14 |
|---|---|---|---|---|---|---|---|
| 1 | −89.9666 | 6.7538E−03 | 9.7790E−05 | −8.7913E−04 | 1.0502E−04 | −3.0490E−09 | 3.0302E−11 |
| 2 | −0.6153 | 9.4207E−02 | −6.3609E−04 | −2.4053E−04 | 8.8881E−01 | −1.5323E+00 | 5.7131E−01 |
| 4 | −90.0000 | 4.2817E−02 | 1.0454E−01 | 2.7378E−04 | −6.5257E−02 | −2.7901E−06 | −9.8651E−07 |
| 5 | −90.0000 | 8.9904E−02 | 7.6270E−01 | −2.2175E+00 | 4.2625E+00 | −5.3689E−04 | −2.0968E−06 |
| 6 | −2.1499 | 3.4408E−02 | 4.5057E−01 | −1.5011E+00 | 1.0568E+00 | 0.0000E+00 | 0.0000E+00 |
| 7 | 3.7950 | −3.4425E−01 | 4.9600E−01 | −5.7475E−01 | 8.4095E−01 | −5.1927E−14 | −6.6951E−15 |
| 8 | −90.0000 | −2.8460E−01 | −5.6084E−01 | 3.1477E−01 | −1.6753E+00 | −5.8498E−14 | −6.6879E−15 |
| 9 | −90.0000 | 7.2489E−01 | −8.3696E−01 | −1.5535E−01 | 5.2613E−01 | 1.8775E−07 | −6.9233E−15 |
| 10 | −90.0000 | 4.6606E−01 | −4.2736E−01 | 7.3160E−02 | 3.8986E−02 | −6.8051E−05 | −2.9397E−07 |
| 11 | −90.0000 | −1.2101E−01 | 1.7564E−02 | 1.1749E−01 | −8.1409E−02 | 8.7988E−05 | 2.2678E−06 |

Figure 114:
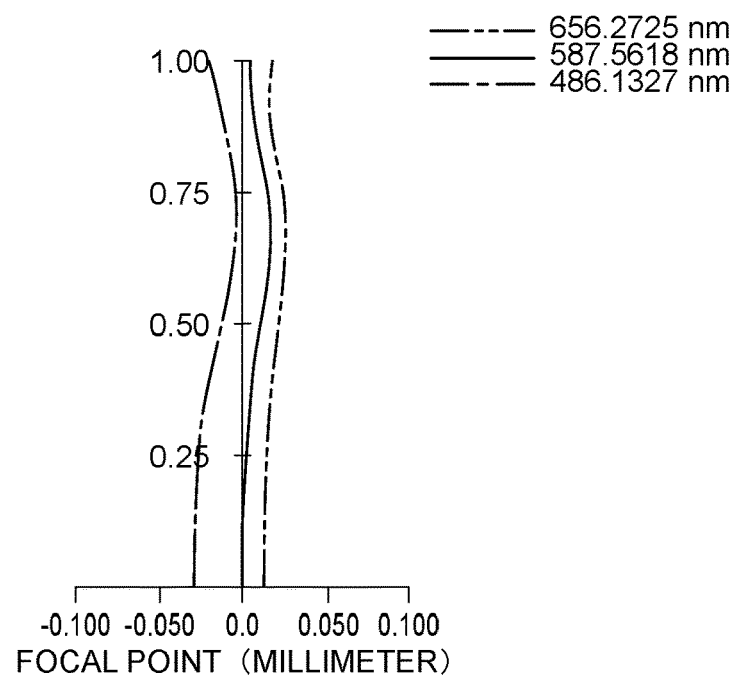
FIG. 114 shows spherical aberrations.

FIG. 114 shows spherical aberrations. The horizontal axis of FIG. 114 represents a position at which a ray that travels parallel to the optical axis and enters the imaging optical system intersects with the optical axis. The vertical axis of FIG. 114 represents distance of the above-described ray from the optical axis. The value of distance is normalized by the radius of the aperture. In other words, the value 1 on the vertical axis represents the radius of the aperture. In FIG. 114, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 115:
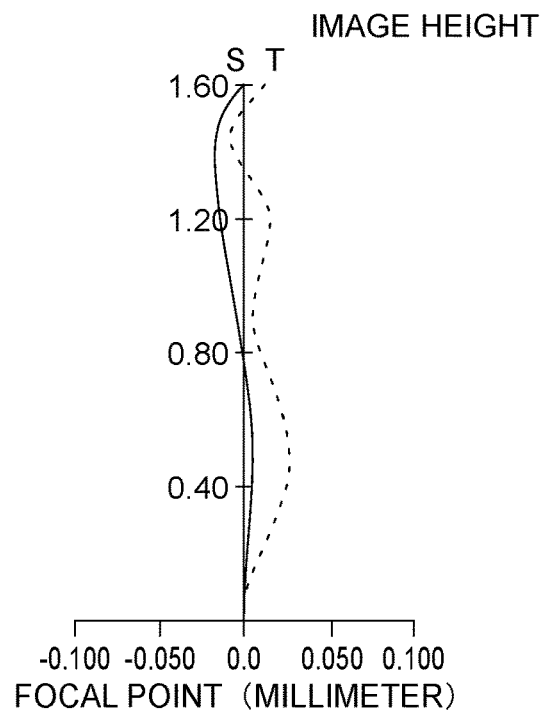
FIG. 115 shows astigmatism of the ray of wavelength of 587.5618 nanometers.

FIG. 115 shows astigmatism of the ray of wavelength of 587.5618 nanometers. The horizontal axis of FIG. 115 represents a position in the optical axis direction of the focal point. The vertical axis of FIG. 115 represents image height. The solid line in FIG. 115 represents the graph of the sagittal plane, and the broken line in FIG. 115 represents the graph of the tangential plane.

Figure 116:
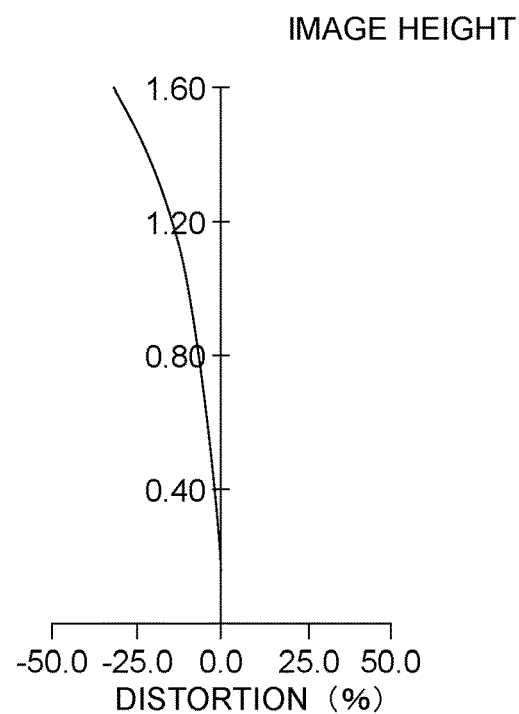
FIG. 116 shows distortion of the ray of wavelength of 587.5618 nanometers.

FIG. 116 shows distortion of the ray of wavelength of 587.5618 nanometers. The horizontal axis of FIG. 116 represents distortion expressed as a percent. The vertical axis of FIG. 116 represents image height.

Example 30

Figure 117:
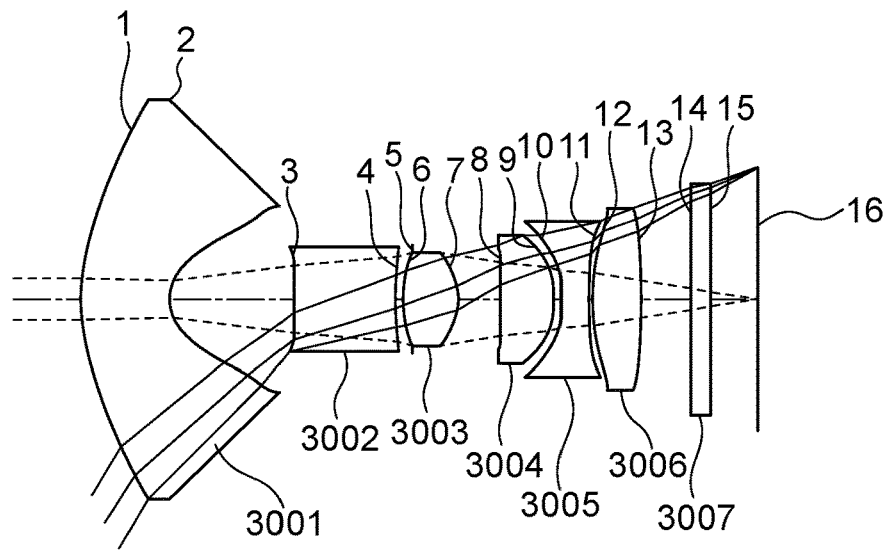
FIG. 117 shows a layout of an imaging optical system of Example 30.

FIG. 117 shows a layout of an imaging optical system of Example 30. The imaging optical system includes six lenses and an infrared cut filter arranged from the object side to the image side. Each of the second lens 3002, the fourth lens 3004, the fifth lens 3005 and the sixth lens 3006 is an aspheric lens in which radius of curvature of each of both surfaces is infinity in the paraxial region and which has a power in the peripheral area. The first lens 3001 is a negative meniscus lens which is convex toward the object. The third lens 2903 is a biconvex lens. The aperture stop 5 is located closer to the object than the object-side surface of the third lens 3003.

Table 59 shows positions of the optical elements and properties and values of focal length of the lenses of the imaging optical system of Example 30. The focal length f of the whole imaging optical system is given by f=1.358. The F-number Fno is given by Fno=2.2. HFOV representing a half value of angle of view is given by HFOV=65 (degrees). In Table 59 each of the six lenses is represented respectively by lens 1 to lens 6 from the object side.

In the present example, the object distance from the object to the first lens is infinity.

TABLE 59

| Surface | | Radius of curvature | Thickness or distance | Material | Refractive index | Abbe's number | Focal length |
|---|---|---|---|---|---|---|---|
| 0 | Object | Plano | ∞ | | | | |
| 1 | Lens 1 | 4.5604 | 1.041 | Plastic | 1.545 | 56 | −2.018 |
| 2 | | 0.8147 | 1.498 | | | | |
| 3 | Lens 2 | ∞ | 1.200 | Plastic | 1.645 | 23 | ∞ |
| 4 | | ∞ | 0.175 | | | | |
| 5 | Ape. Stop | Plano | −0.094 | | | | |
| 6 | Lens 3 | 4.1263 | 0.644 | Plastic | 1.545 | 56 | 1.81 |
| 7 | | −1.2250 | 0.504 | | | | |
| 8 | Lens 4 | ∞ | 0.623 | Plastic | 1.545 | 56 | ∞ |
| 9 | | ∞ | 0.094 | | | | |
| 10 | Lens 5 | ∞ | 0.308 | Plastic | 1.645 | 23 | ∞ |
| 11 | | ∞ | 0.074 | | | | |
| 12 | Lens 6 | ∞ | 0.553 | Plastic | 1.545 | 56 | ∞ |
| 13 | | ∞ | 0.621 | | | | |
| 14 | IR cut filter | Plano | 0.210 | Glass | 1.517 | 64.2 | |
| 15 | | Plano | 0.550 | | | | |
| 16 | Image | Plano | | | | | |

Table 60 shows conic constants and aspheric coefficients of each surface of each lens of Example 30.

TABLE 60

| Surface | K | A4 | A6 | A8 | A10 | A12 | A14 |
|---|---|---|---|---|---|---|---|
| 1 | −0.0958 | −3.4890E−04 | −1.6363E−03 | 1.7937E−04 | −2.0508E−06 | −4.0446E−07 | 1.2155E−08 |
| 2 | −0.6764 | 2.6051E−02 | −3.2352E−02 | 2.1232E−02 | −3.2363E−02 | 4.6616E−06 | 1.0008E−11 |
| 3 | −90.0000 | −9.6975E−02 | −2.1960E−02 | −1.0789E−01 | 5.7627E−02 | −4.7470E−05 | 5.1462E−11 |
| 4 | −90.0000 | 1.9281E−01 | −2.3082E−01 | 1.2813E−01 | 3.1655E−02 | 1.4254E−01 | 3.3458E−06 |
| 6 | 10.6218 | 2.3569E−01 | −2.9968E−01 | 1.4995E−01 | −9.6436E−03 | 0.0000E+00 | 0.0000E+00 |
| 7 | −2.5077 | −1.2524E−02 | −4.3304E−02 | 1.5998E−02 | 2.4884E−03 | −4.6294E−09 | −4.5032E−10 |
| 8 | −90.0000 | 6.4612E−02 | −1.0432E−01 | −5.2552E−02 | −1.0445E−01 | 3.9242E−09 | −2.0697E−10 |
| 9 | −90.0000 | −8.0701E−01 | 6.7962E−01 | −3.1213E−01 | 3.5730E−02 | 1.2097E−08 | −1.3875E−10 |
| 10 | −90.0000 | −7.6802E−01 | 3.4605E−01 | 2.7186E−01 | −1.8112E−01 | −4.3329E−09 | 1.3121E−11 |
| 11 | −90.0000 | 1.8963E−01 | −1.5778E−01 | 8.1097E−02 | −1.8312E−02 | 2.3829E−06 | −5.3906E−11 |
| 12 | −90.0000 | 1.9706E−01 | −1.4015E−01 | 5.2914E−02 | −1.1537E−02 | −4.7100E−07 | 3.9993E−07 |
| 13 | −90.0000 | −6.9507E−02 | 7.2518E−02 | −2.7911E−02 | 1.2120E−03 | 1.8366E−06 | 5.2889E−11 |

Figure 118:
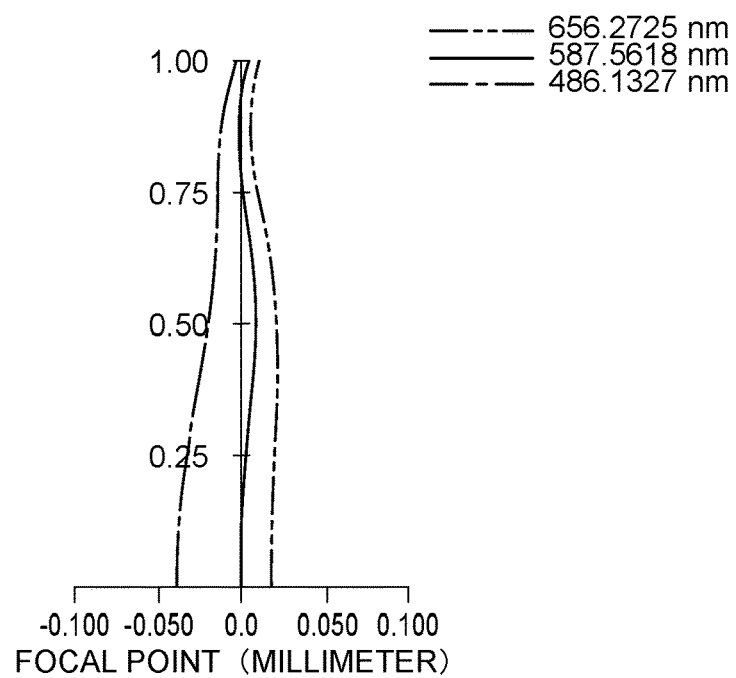
FIG. 118 shows spherical aberrations.

FIG. 118 shows spherical aberrations. The horizontal axis of FIG. 118 represents a position at which a ray that travels parallel to the optical axis and enters the imaging optical system intersects with the optical axis. The vertical axis of FIG. 118 represents distance of the above-described ray from the optical axis. The value of distance is normalized by the radius of the aperture. In other words, the value 1 on the vertical axis represents the radius of the aperture. In FIG. 118, the solid line represents the graph of the ray of wavelength of 587.5618 nanometers, the chain line represents the graph of the ray of wavelength of 486.1327 nanometers and the two-dot chain line represents the graph of the ray of wavelength of 656.2725 nanometers.

Figure 119:
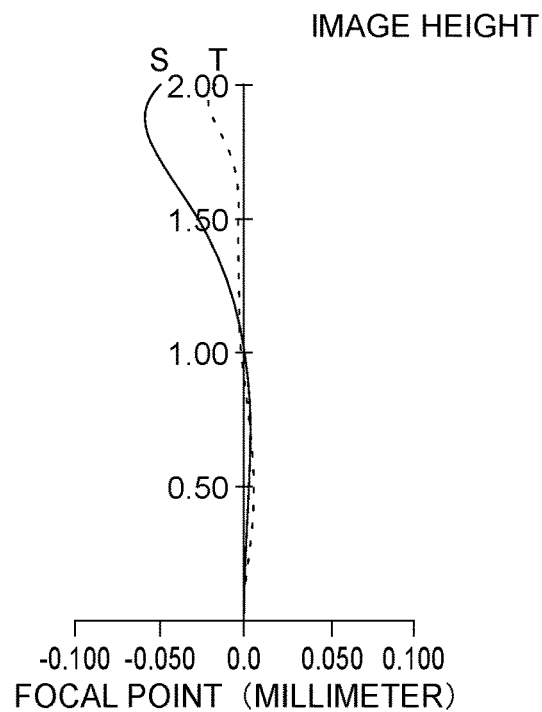
FIG. 119 shows astigmatism of the ray of wavelength of 587.5618 nanometers.

FIG. 119 shows astigmatism of the ray of wavelength of 587.5618 nanometers. The horizontal axis of FIG. 119 represents a position in the optical axis direction of the focal point. The vertical axis of FIG. 119 represents image height. The solid line in FIG. 119 represents the graph of the sagittal plane, and the broken line in FIG. 119 represents the graph of the tangential plane.

Figure 120:
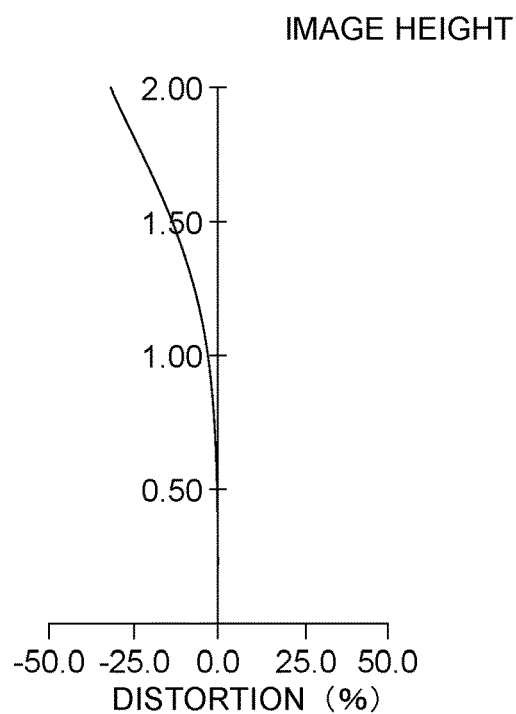
FIG. 120 shows distortion of the ray of wavelength of 587.5618 nanometers.

FIG. 120 shows distortion of the ray of wavelength of 587.5618 nanometers. The horizontal axis of FIG. 120 represents distortion expressed as a percent. The vertical axis of FIG. 120 represents image height.

$$\left(\sum_{i=1}^{i=n}\left|\frac{1}{f_i}\right|\right)\cdot\frac{f}{n}$$

TABLE 61

| Example | n | NAT | n-NAT | Image height | HFOV (degree) | Distortion at 90% of image height (%) |
|---|---|---|---|---|---|---|
| 1 | 4 | 2 (L1, L4) | 2 | 0.225 | 50 | −27.27 |
| 2 | 5 | 2 (L1, L5) | 3 | 0.225 | 50 | −26.84 |
| 3 | 5 | 2 (L2, L5) | 3 | 0.225 | 50 | −13.07 |
| 4 | 6 | 2 (L1, L6) | 4 | 0.225 | 50 | −28.03 |
| 5 | 6 | 2 (L2, L6) | 4 | 0.225 | 50 | −21.18 |
| 6 | 5 | 2 (L1, L5) | 3 | 1.9 | 60 | −30.2 |
| 7 | 6 | 2 (L2, L6) | 4 | 2 | 65 | −22.6 |
| 8 | 3 | 1 (L1) | 2 | 0.225 | 50 | −27.41 |
| 9 | 3 | 1 (L2) | 2 | 0.225 | 50 | −28.24 |
| 10 | 3 | 1 (L3) | 2 | 1.04 | 65 | −37.5 |

TABLE 62

| Example | f | Term | f1 | f2 | f3 | f4 | f5 | f6 | f7 |
|---|---|---|---|---|---|---|---|---|---|
| 1 | 0.2808 | 0.254 | ∞ | 1.04 | 0.376 | ∞ | | | |
| 2 | 0.264 | 0.224 | ∞ | 0.586 | −19.968 | 0.401 | ∞ | | |
| 3 | 0.206 | 0.269 | −0.458 | ∞ | 0.358 | 0.638 | ∞ | | |
| 4 | 0.275 | 0.345 | ∞ | −0.644 | 0.78 | 0.273 | −0.962 | ∞ | |
| 5 | 0.242 | 0.264 | −0.519 | ∞ | 0.999 | 0.428 | 0.788 | ∞ | |
| 6 | 1.68 | 0.503 | ∞ | 31.281 | 0.927 | −2.584 | ∞ | | |
| 7 | 1.388 | 0.414 | −2.084 | ∞ | 2.129 | 1.953 | −3.036 | ∞ | |
| 8 | 0.281 | 0.428 | ∞ | 0.643 | 0.332 | | | | |
| 9 | 0.271 | 0.507 | −0.425 | ∞ | 0.308 | | | | |
| 10 | 0.87 | 0.652 | −1.58 | 0.755 | ∞ | | | | |

Features of the Examples of the Present Invention

Tables 61-66 show features of the examples. In the tables, n, NAT, f and HFOV respectively represent the number of all lenses, the number of an aspheric lens or aspheric lenses in each of which radius of curvature of each of both surfaces is infinity in the paraxial region and each of which has a power in the peripheral area, the focal length of the whole optical system and a half value of angle of view (a half angle of view). In the column of NAT in the tables, for example, "2 (L1, L4)" represents that the number of aspheric lenses in each of which radius of curvature of each of both surfaces is infinity in the paraxial region and each of which has a power in the peripheral area is two, and the two lenses are the first and fourth lenses. "fi" represents focal length of the i-th lens from the object side (the i-th lens) where i represent an integer from 1 to n. "Distortion at 90% of image height" represents distortion at the position of 90% of the maximum value of image height. "Term" represents the value of the following term.

TABLE 63

| Example | n | NAT | n-NAT | Image height | HFOV (degree) | Distortion at 90% of image height (%) |
|---|---|---|---|---|---|---|
| 11 | 4 | 1 (L1) | 3 | 0.225 | 50 | −25.85 |
| 12 | 4 | 1 (L2) | 3 | 0.225 | 50 | −26.59 |
| (Reference example 1) | 4 | 1 (L3) | 3 | 0.225 | 50 | −16.26 |
| 14 | 4 | 1 (L4) | 3 | 0.225 | 50 | −17.39 |
| 15 | 5 | 1 (L1) | 4 | 1.9 | 60 | −24.1 |
| 16 | 5 | 1 (L2) | 4 | 1.9 | 60 | −10.9 |
| 17 | 5 | 1 (L3) | 4 | 1.9 | 60 | −17.9 |
| 18 | 5 | 1 (L4) | 4 | 1.9 | 60 | −15.4 |
| 19 | 5 | 1 (L5) | 4 | 1.9 | 60 | −14.9 |
| 20 | 5 | 1 (L5) | 4 | 1.9 | 60 | −19.6 |

TABLE 64

| Example | f | Term | f1 | f2 | f3 | f4 | f5 | f6 | f7 |
|---|---|---|---|---|---|---|---|---|---|
| 11 | 0.273 | 0.274 | ∞ | 1.238 | 0.41 | 1.313 | | | |
| 12 | 0.265 | 0.46 | −0.915 | ∞ | 0.263 | −0.49 | | | |
| (Reference example 1) | 0.24 | 0.468 | −0.355 | 0.48 | ∞ | 0.342 | | | |
| 14 | 0.244 | 0.53 | −0.295 | 0.363 | 0.394 | ∞ | | | |
| 15 | 1.69 | 0.855 | ∞ | 19.677 | 1.468 | −0.954 | 1.334 | | |
| 16 | 1.3 | 0.611 | −2.179 | ∞ | 1.552 | −1.365 | 1.944 | | |
| 17 | 1.55 | 0.641 | −3.262 | 2.98 | ∞ | 1.394 | −1.41 | | |
| 18 | 1.6 | 0.619 | −4.07 | 1.623 | −1.72 | ∞ | 2.031 | | |
| 19 | 1.4 | 0.625 | −2.557 | 1.589 | −1.43 | 1.933 | ∞ | | |
| 20 | 1.69 | 0.578 | −1.939 | 5.167 | 1.356 | −3.812 | ∞ | | |

TABLE 65

| Example | n | NAT | n-NAT | Image height | HFOV (degree) | Distortion at 90% of image height (%) |
|---|---|---|---|---|---|---|
| 21 | 5 | 3 (L1, L2, L5) | 2 | 0.225 | 50 | −28.08 |
| 22 | 5 | 3 (L1, L2, L5) | 2 | 0.225 | 50 | −29.74 |
| 23 | 5 | 3 (L1, L2, L5) | 2 | 0.225 | 50 | −29.97 |
| 24 | 5 | 3 (L1, L2, L5) | 2 | 0.225 | 50 | −29.97 |
| 25 | 7 | 3 (L2, L5, L7) | 4 | 2 | 70 | −22.4 |
| 26 | 5 | 1 (L1) | 4 | 1.9 | 60 | −24.8 |
| 27 | 5 | 1 (L 3) | 4 | 1.9 | 60 | −22.8 |
| 28 | 5 | 2 (L1, L5) | 3 | 1.9 | 60 | −31.3 |
| 29 | 5 | 3 (L2, L4, L5) | 2 | 1.6 | 60 | −22.7 |
| 30 | 6 | 4 (L2, L4, L5, L6) | 2 | 2 | 65 | −24.5 |

TABLE 66

| Example | f | Term | f1 | f2 | f3 | f4 | f5 | f6 | f7 |
|---|---|---|---|---|---|---|---|---|---|
| 21 | 0.264 | 0.724 | ∞ | ∞ | 0.102 | −0.258 | ∞ | | |
| 22 | 0.274 | 0.616 | ∞ | ∞ | 0.119 | −0.351 | ∞ | | |
| 23 | 0.278 | 0.503 | ∞ | ∞ | 0.135 | −0.6 | ∞ | | |
| 24 | 0.277 | 0.435 | ∞ | ∞ | 0.149 | −0.871 | ∞ | | |
| 25 | 1.121 | 0.349 | −2.031 | ∞ | 1.431 | −1.816 | ∞ | 2.298 | ∞ |
| 26 | 1.68 | 0.481 | ∞ | −36.205 | 4.847 | 1.441 | −1.984 | | |
| 27 | 1.593 | 0.436 | −3.907 | 3.259 | ∞ | 1.7 | −1.816 | | |
| 28 | 1.686 | 0.357 | ∞ | 31.793 | 1.135 | −6.858 | ∞ | | |
| 29 | 1.344 | 0.335 | −1.735 | ∞ | 1.494 | ∞ | ∞ | | |
| 30 | 1.358 | 0.237 | −2.018 | ∞ | 1.81 | ∞ | ∞ | ∞ | |

The power of an aspheric lens in which radius of curvature of each of both surfaces is infinity in the paraxial region and which has a power in the peripheral area will be described below. In Expression (1) which expresses each lens surface, R is infinity (R=∞). Accordingly, Expression (1) is expressed as below using terms up to the fourth-order of r.

$$z = A_4 r^4 \qquad (1)'$$

When coordinates of a point on a lens surface through which a ray passes is represented by (z, r) and a distance between the point at which z=r holds and the optical axis is represented by h, h=r holds at the point at which z=r holds. Accordingly, the following Expression holds from Expression (1)'.

$$h = A_4 h^4$$
$$h = \left(\frac{1}{A_4}\right)^{\frac{1}{3}} = r \qquad (2)$$

When the shape of the surface containing the point on the optical axis and the points at which z=r holds is represented by an approximate spherical surface, the radius of the approximate spherical surface is represented by z=r. Accordingly, the power can be obtained from radii (radii of curvature) of the approximate spherical surfaces of both surfaces of a lens.

In general, power φ of a lens can be obtained by the following expression.

$$\varphi = \frac{N-1}{r_a} + \frac{1-N}{r_b} - \frac{d}{N} \cdot \frac{N-1}{r_a} \cdot \frac{1-N}{r_b} \qquad (3)$$

By substituting Expression (2) into Expression (3), the power (of an aspheric lens in which radius of curvature of each of both surfaces is infinity in the paraxial region and which has a power in the peripheral area can be expressed by the following expression.

$$\varphi = \frac{N-1}{\left(\frac{1}{A_{4a}}\right)^{\frac{1}{3}}} + \frac{1-N}{\left(\frac{1}{A_{4b}}\right)^{\frac{1}{3}}} - \frac{d}{N} \cdot \frac{N-1}{\left(\frac{1}{A_{4a}}\right)^{\frac{1}{3}}} \cdot \frac{1-N}{\left(\frac{1}{A_{4b}}\right)^{\frac{1}{3}}} \qquad (4)$$

What are expressed by the symbols used in Expression (3) and Expression (4) given above are as below.

N refractive index of a lens d distance on the optical axis between the object-side surface and the image-side surface $r_a$ radius of curvature of the object-side surface of the lens $r_b$ radius of curvature of the image-side surface of the lens $A_{4a}$ Aspheric coefficient of the fourth-order term of Expression (1) of the object-side surface of the lens $A_{4b}$ Aspheric coefficient of the fourth-order term of Expression (1) of the object-side surface of the lens In other words, the power φ of an aspheric lens in which radius of curvature of each of both surfaces is infinity in the paraxial region and which has a power in the peripheral area can be obtained as below. The shape of each surface is expressed by an expression including terms up to the fourth-order of r in Expression (1). Then, the points at which z=r holds on the shape of each surface are obtained. An approximate spherical surface containing the point of z=0 and the points of z=r of the shape of each surface is obtained. Then, the power φ can be obtained using radii (radii of curvature) (z) of both surfaces. The power φ described above is referred to as a power of the third-order aberration region in the peripheral area of an aspheric lens in which radius of curvature of each of both surfaces is infinity in the paraxial region and which has a power in the peripheral area.

Table 67 shows values of (φ·f) which are normalized values of power φ in the periphery area expressed by Expression (4). The normalization is performed by dividing values of power φ by (1/f), which is the inverse of the focal length of the whole optical system. For example, in the line concerning Example 1, L1 and L4 respectively represent the first lens and the fourth lens, each of which is an aspheric lens in which radius of curvature of each of both surfaces is infinity in the paraxial region and which has a power in the peripheral area.

TABLE 67

| Example | | | | | | | | |
|---|---|---|---|---|---|---|---|---|
| 1 | −0.621 | L1 | 0.502 | L4 | | | | |
| 2 | −0.507 | L1 | −0.812 | L5 | | | | |
| 3 | 0.0489 | L2 | 0.0271 | L5 | | | | |
| 4 | −0.086 | L1 | −0.0313 | L6 | | | | |
| 5 | 0.431 | L2 | −1.0116 | L6 | | | | |
| 6 | −0.35 | L1 | 0.0607 | L5 | | | | |
| 7 | −0.652 | L2 | 0.5 | L6 | | | | |
| 8 | −0.161 | L1 | | | | | | |
| 9 | −0.0705 | L2 | | | | | | |
| 10 | −0.939 | L3 | | | | | | |
| 11 | −0.584 | L1 | | | | | | |
| 12 | −0.0352 | L2 | | | | | | |
| 13 | 0.315 | L3 | | | | | | |
| 14 | −0.19 | L4 | | | | | | |
| 15 | −0.138 | L1 | | | | | | |
| 16 | 0.185 | L2 | | | | | | |
| 17 | −1.151 | L3 | | | | | | |
| 18 | 0.797 | L4 | | | | | | |
| 19 | 0.079 | L5 | | | | | | |
| 20 | −0.173 | L5 | | | | | | |
| 21 | −0.89 | L1 | 0.346 | L2 | 0.0707 | L5 | | |
| 22 | −0.872 | L1 | 0.359 | L2 | 0.0238 | L5 | | |
| 23 | −0.825 | L1 | 0.324 | L2 | −0.000942 | L5 | | |
| 24 | −0.845 | L1 | 0.31 | L2 | 0.0138 | L5 | | |
| 25 | 0.0255 | L2 | 0.607 | L5 | −0.832 | L7 | | |
| 26 | −0.268 | L1 | | | | | | |
| 27 | −1.268 | L3 | | | | | | |
| 28 | −0.317 | L1 | −1.271 | L5 | | | | |
| 29 | −0.0158 | L2 | −1.409 | L4 | 0.88 | L5 | | |
| 30 | −1.0178 | L2 | 0.925 | L4 | −1.361 | L5 | 0.7 | L6 |

The value of $|\varphi \cdot f|$ which is the absolute value of (φ·f) must be greater than 0.0007. When the absolute value is greater than 0.0007, also coefficients of the terms of the sixth or more order of r must be used to control aberrations in some cases. However, when the value of $|\varphi \cdot f|$ is greater than 0.007, aberrations can be controlled mainly using coefficients of the terms of the fourth order of r.

According to Tables 61-66, all the examples of the present invention have the following features.

The number of the lenses of an imaging optical system is three to seven. The aperture stop is located within the imaging optical system. The imaging optical system includes one to four lenses, each of which is an aspheric lens in which radius of curvature of each of both surfaces is infinity in the paraxial region and which has a power in the peripheral area. The first lens is a negative lens or an aspheric lens in which radius of curvature of each of both surfaces is infinity in the paraxial region and which has a negative power in the peripheral area. The lens adjacent to the aperture stop on the image side of the aperture stop is a positive lens. The imaging optical system includes two or more lenses, each of which is not an aspheric lens in which radius of curvature of each of both surfaces is infinity in the paraxial region and which has a power in the peripheral area. The half angle of view of the imaging optical system is greater than 40 degrees and smaller than 80 degrees. Concerning the imaging optical system, the following relationship is satisfied.

$$0.18 < \left( \sum_{i=1}^{i=n} \left| \frac{1}{f_i} \right| \right) \cdot \frac{f}{n} < 0.9$$

According to paths of rays shown in FIG. 1 and other drawings, the bundle of rays that enters an imaging optical system and reaches the maximum value of image height (the bundle of rays being referred to as an off-axis bundle of rays hereinafter) and the bundle of rays that enters the imaging optical system and has the principal ray parallel to the optical axis (the bundle of rays being referred to as an axial bundle of rays hereinafter) do not intersect with each other within the first lens.

Examples 1-7, 21-25 and 28-30 further have the following features.

The number of the lenses of an imaging optical system is four to seven. The aperture stop is located between the second lens and the fourth lens. The imaging optical system includes at least one aspheric lens in which radius of curvature of each of both surfaces is infinity in the paraxial region and which has a power in the peripheral area respectively on the object side and on the image side of the aperture stop. When the aperture stop is located on the image side of the image-side surface of a lens, the lens is defined as being located on the object side of the aperture stop, and when the aperture stop is located on the object side of the object-side surface of a lens, the lens is defined as being located on the image side of the aperture stop. The first lens and/or the second lens is an aspheric lens in which radius of curvature of each of both surfaces is infinity in the paraxial region and which has a power in the peripheral area. The lens closest to the image is an aspheric lens in which radius of curvature of each of both surfaces is infinity in the paraxial region and which has a power in the peripheral area. Concerning the imaging optical system, the following relationship is satisfied.

$$0.18 < \left( \sum_{i=1}^{i=n} \left| \frac{1}{f_i} \right| \right) \cdot \frac{f}{n} < 0.82$$

The off-axis bundle of rays and the axial bundle of rays do not intersect with each other within the lens closest to the image.

In general, aberration coefficients of lens surfaces will be described below. The value of the aberration coefficient of an optical system is given as an algebraic sum of aberration coefficients of respective lens surfaces that form the optical system. In the case of an aspheric lens in which radius of curvature of each of both surfaces is infinity in the paraxial region and which has a power in the peripheral area, the curvature at the center of each lens surface is zero, and therefore aberration coefficients of spherical aberration, curvature of field and distortion can be expressed by the following approximation formulas that include aspheric coefficients alone as variables (Yoshiya Matsui, Lens design method, Kyoritsu Shuppan Co., Ltd. pp 87 etc.).

Spherical Aberration $$A \cdot A^4 \cdot h^4$$

Curvature of Field $$A \cdot A_4 \cdot h^2 \cdot \bar{h}^2$$

Distortion $$A \cdot A_4 \cdot h \cdot \bar{h}^3$$

In the approximation formulas, A represents a number determined by refractive index and constants alone, $A_4$ represents an aspheric coefficient of the fourth-order term of r of Expression (1) that represents each lens surface, and h represents height at which a ray of the axial bundle of rays passes through and
$\bar{h}$
represents height at which a ray of the off-axis bundle of rays passes through.

Thus, aberrations can be expressed using an aspheric coefficient $A_4$ of the fourth-order term of r of Expression (1) that represents each lens surface. This means that the aberrations can be corrected by the power φ expressed by Expression (4) in the peripheral area of an aspheric lens in which radius of curvature of each of both surfaces is infinity in the paraxial region and which has a power in the peripheral area.

The sign of h is positive, and the sign of
$\bar{h}$
is negative when a surface is located on the object side of the aperture stop and positive when a surface is located on the image side of the aperture stop.

Accordingly, by locating at least one aspheric lens in which radius of curvature of each of both surfaces is infinity in the paraxial region and which has a power in the peripheral area at an appropriate position in an imaging optical system and by determining an appropriate value of $A_4$ of each lens surface in consideration of the value of h and the value of
$\bar{h}$,
the aberrations of the imaging optical system can be reduced without using a great number of lenses that have great powers in the paraxial region.

The design principals of an imaging optical system of the present invention are below. First, at a position where h is relatively great, a lens that have a great power in the paraxial region is located so as to determine values concerning the paraxial region such as the value of focal length and further to correct spheric aberrations using aspheric surfaces. Secondly, at a position where h is relatively small and the absolute value of
$\bar{h}$
is relatively great, an aspheric lens in which radius of curvature of each of both surfaces is infinity in the paraxial region and which has a power in the peripheral area is located so as to correct curvature of field and distortion.

When an aspheric lens in which radius of curvature of each of both surfaces is infinity in the paraxial region and which has a power in the peripheral area is located on the image side of the aperture stop, the sign of h and the sign of
$\bar{h}$
are identical with each other, and therefore both curvature of field and distortion can be simultaneously corrected. However, when an aspheric lens in which radius of curvature of each of both surfaces is infinity in the paraxial region and which has a power in the peripheral area is located on the object side of the aperture stop, the sign of h and the sign of
$\bar{h}$
are different from each other, and therefore curvature of field and distortion cannot be simultaneously corrected.

In practical applications, that is, in Examples 1-7, Examples 21-25 and Examples 28-30, the off-axis bundle of rays and the axial bundle of rays do not intersect with each other either within the first lens closest to the object or within the lens closest to the image, and each of the first and/or the second lens and the lens closest to the image is an aspheric lens in which radius of curvature of each of both surfaces is infinity in the paraxial region and which has a power in the peripheral area. The reason why an aspheric lens in which radius of curvature of each of both surfaces is infinity in the paraxial region and which has a power in the peripheral area is located on the object-side of the aperture stop is to reduce lens diameters and the whole length particularly of a wide-angle-of-view imaging optical system. In this case, off-axis aberrations generated in lenses on the object side of the aperture stop can be effectively corrected by an aspheric lens in which radius of curvature of each of both surfaces is infinity in the paraxial region and which has a power in the peripheral area located on the image side of the aperture stop.

In most of the other examples, an aspheric lens in which radius of curvature of each of both surfaces is infinity in the paraxial region and which has a power in the peripheral area is located at a position where the off-axis bundle of rays and the axial bundle of rays do not intersect with each other or at a position where an overlapping area of the off-axis bundle of rays and the axial bundle of rays is relatively small.

In general, in an imaging optical system used for any application other than measurement of a measuring instrument or the like, if distortion that does not directly affect resolution is corrected such that the distortion is not completely eliminated and a negative distortion remains, other aberrations than distortion that affect resolution can be advantageously corrected. Further, even if the aperture efficiency is great, the illuminance ratio at the periphery on the image plane decreases according to the cosine fourth law and remarkably decreases particularly in the case that the angle of view is great. The decrease in the illuminance ratio is, however, advantageously relieved by the negative distortion. Further, distortion of an imaging optical system can be corrected also by image processing. Values of distortion of the above-described examples are in the range from −10% to −40% at the position of 90% of the maximum value of image height.

According to the present invention, by appropriately using an aspheric lens in which radius of curvature of each of both surfaces is infinity in the paraxial region and which has a power in the peripheral area, axial aberrations and off-axis aberrations can be separately and efficiently corrected. Further, the present invention is advantageously applied particularly to wide-angle-of-view imaging optical systems.

What is claimed is:

1. An imaging optical system wherein the number of lenses is three to seven, an aperture stop is located within the imaging optical system, one to four lenses each of which is an aspheric lens in which radius of curvature of each of both surfaces is infinity in the paraxial region and which has a power of the third-order aberration region in the peripheral area are provided, the first lens from the object side is a negative lens or an aspheric lens in which radius of curvature of each of both surfaces is infinity in the paraxial region and which has a negative power of the third-order aberration region in the peripheral area, the lens adjacent to the aperture stop on the image side is a positive lens, the relationship $$0.18 < \left(\sum_{i=1}^{i=n}\left|\frac{1}{f_i}\right|\right) \cdot \frac{f}{n} < 0.9$$

is satisfied where i represents a natural number, fi represents focal length of the i-th lens from the object side, f represents focal length of the whole system and n represents the number of the lenses, a bundle of rays that enters the imaging optical system and reaches the maximum value of image height and a bundle of rays that enters the imaging optical system and has the principal ray parallel to the optical axis do not intersect with each other within the first lens from the object side, and the relationship

40°<HFOV<80° is satisfied where HFOV represents angle that the principal ray of bundle of rays that enters the imaging optical system and reaches the maximum value of image height forms with the optical axis.

2. The imaging optical system according to 1 wherein the number offenses is four to seven, the aperture stop is located between the second lens and the fourth lens from the object side, at least one aspheric lens in which radius of curvature of each of both surfaces is infinity in the paraxial region and which has a power of the third-order aberration region in the peripheral area is provided respectively on the object side and on the image side of the aperture stop, each of the first lens and/or the second lens from the object side and the lens closest to the image is an aspheric lens in which radius of curvature of each of both surfaces is infinity in the paraxial region and which has a power of the third-order aberration region in the peripheral area, the relationship $$0.18 < \left(\sum_{i=1}^{i=n}\left|\frac{1}{f_i}\right|\right) \cdot \frac{f}{n} < 0.82$$

is satisfied, and the bundle of rays that enters the imaging optical system and reaches the maximum value of image height and the bundle of rays that enters the imaging optical system and has the principal ray parallel to the optical axis do not intersect with each other within the lens closest to the image.

3. The imaging optical system according to 2 wherein the number of lenses is four, the aperture stop is located between the second lens and the third lens from the object side, and each of the first lens and the fourth lens from the object side is an aspheric lens in which radius of curvature of each of both surfaces is infinity in the paraxial region and which has a power of the third-order aberration region in the peripheral area.

4. The imaging optical system according to 2 wherein the number of lenses is five, the aperture stop is located between the second lens and the fourth lens from the object side, each of the first lens or the second lens from the object side and the fifth lens from the object side is an aspheric lens in which radius of curvature of each of both surfaces is infinity in the paraxial region and which has a power of the third-order aberration region in the peripheral area, and the relationship $$0.18 < \left(\sum_{i=1}^{i=n}\left|\frac{1}{f_i}\right|\right) \cdot \frac{f}{n} < 0.65$$

is satisfied.

5. The imaging optical system according to 2 wherein the number of lenses is five, the aperture stop is located between the second lens and the third lens from the object side, each of the first lens, the second lens and the fifth lens from the object side or each of the second lens, the fourth lens and the fifth from the object is an aspheric lens in which radius of curvature of each of both surfaces is infinity in the paraxial region and which has a power of the third-order aberration region in the peripheral area, and the relationship $$0.25 < \left(\sum_{i=1}^{i=n}\left|\frac{1}{f_i}\right|\right) \cdot \frac{f}{n} < 0.82$$

is satisfied.

6. The imaging optical system according to 2 wherein the number of lenses is six, the aperture stop is located between the second lens and the fourth lens from the object side, each of the first lens or the second lens from the object side and the sixth lens from the object side is an aspheric lens in which radius of curvature of each of both surfaces is infinity in the paraxial region and which has a power of the third-order aberration region in the peripheral area, and the relationship $$0.18 < \left(\sum_{i=1}^{i=n}\left|\frac{1}{f_i}\right|\right) \cdot \frac{f}{n} < 0.6$$

is satisfied.

7. The imaging optical system according to 2 wherein the number of lenses is six, the aperture stop is located between the second lens and the third lens from the object side, and each of the second lens, the fourth lens, the fifth lens and the sixth lens from the object side is an aspheric lens in which radius of curvature of each of both surfaces is infinity in the paraxial region and which has a power of the third-order aberration region in the peripheral area.

8. The imaging optical system according to 2 wherein the number of lenses is seven, the aperture stop is located between the second lens and the third lens from the object side, and each of the second lens, the fifth lens and the seventh lens from the object side is an aspheric lens in which radius of curvature of each of both surfaces is infinity in the paraxial region and which has a power of the third-order aberration region in the peripheral area.

9. The imaging optical system according to 1 wherein the number of lenses is three to five, and any one of the lenses is an aspheric lens in which radius of curvature of each of both surfaces is infinity in the paraxial region and which has a power of the third-order aberration region in the peripheral area.

10. The imaging optical system according to claim 9 wherein the first lens from the object side is an aspheric lens in which radius of curvature of each of both surfaces is infinity in the paraxial region and which has a power of the third-order aberration region in the peripheral area.

11. The imaging optical system according to claim 9 wherein the lens closest to the image is an aspheric lens in which radius of curvature of each of both surfaces is infinity in the paraxial region and which has a power of the third-order aberration region in the peripheral area, and the bundle of rays that enters the imaging optical system and reaches the maximum value of image height and the bundle of rays that enters the imaging optical system and has the principal ray parallel to the optical axis do not intersect with each other within the lens closest to the image.

12. The imaging optical system according to claim 9 wherein the number of lenses is three, and any one of the lenses is an aspheric lens in which radius of curvature of each of both surfaces is infinity in the paraxial region and which has a negative power of the third-order aberration region in the peripheral area.

13. The imaging optical system according to claim 2 wherein the number of lenses is five, each of the first lens, the second lens and the fifth lens from the object side is an aspheric lens in which radius of curvature of each of both surfaces is infinity in the paraxial region and which has a power of the third-order aberration region in the peripheral area, and the second lens is an aspheric lens in which radius of curvature of each of both surfaces is infinity in the paraxial region and which has a positive power of the third-order aberration region in the peripheral area.

\* \* \* \* \*